(12) United States Patent
Mizuno et al.

(10) Patent No.: US 6,510,835 B1
(45) Date of Patent: Jan. 28, 2003

(54) DEVICE AND METHOD FOR CONTROLLING ENGINES

(75) Inventors: Hiroyuki Mizuno, Toyota (JP); Noboru Takagi, Toyota (JP); Naohide Fuwa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/889,446

(22) PCT Filed: Jan. 11, 2000

(86) PCT No.: PCT/JP00/00067

§ 371 (c)(1),
(2), (4) Date: Aug. 20, 2001

(87) PCT Pub. No.: WO00/42306

PCT Pub. Date: Jul. 20, 2000

(30) Foreign Application Priority Data

| Jan. 12, 1999 | (JP) | 11-005362 |
| Feb. 10, 1999 | (JP) | 11-032894 |
| May 25, 1999 | (JP) | 11-145492 |

(51) Int. Cl.[7] .............................................. F02B 17/00
(52) U.S. Cl. ....................... 123/295; 123/305; 123/443; 701/103
(58) Field of Search ................................ 123/295, 305, 123/436, 443, 492; 701/103, 110, 115

(56) References Cited

U.S. PATENT DOCUMENTS 6,178,943 B1 * 1/2001 Taga et al. ................... 123/295

FOREIGN PATENT DOCUMENTS

| EP | 0 849 458 B1 | 6/1998 | |
| EP | 1143130 | * 10/2001 | F02D/41/02 |
| JP | 05-288098 | 2/1993 | |
| JP | 09-324672 | 12/1997 | |
| JP | 10-047111 | 2/1998 | |
| JP | 10-231746 | 9/1998 | |
| JP | 10-331752 | 12/1998 | |
| JP | 11-036920 | 2/1999 | |
| JP | 11-036926 | 2/1999 | |
| JP | 11-287143 | 10/1999 | |
| JP | 297688 | * 10/2000 | F02D/45/00 |

OTHER PUBLICATIONS

The Patent Office of the People's Republic of China –Notification of the First Office Action dated Aug. 30, 2002 in Application No. 0802705.6 (3 pages).

* cited by examiner

Primary Examiner—Tony M. Argenbright
Assistant Examiner—Hai H. Huynh
(74) Attorney, Agent, or Firm—Kenyon & Kenyon

(57) ABSTRACT

An engine can switch a combustion mode between homogeneous charge combustion and stratified charge combustion. The engine is controlled in accordance with a load acting on the engine. When homogeneous charge combustion is executed, an intake pressure, or a parameter representing the amount of intake air, is used as a value representing an engine load. When stratified charge combustion is executed, a value equivalent to the intake pressure presuming homogeneous charge combustion is executed with the amount of manipulation of an acceleration pedal at that time is computed as a virtual intake pressure, and the virtual intake pressure is used as a value representing the engine load. In either combustion mode, therefore, the intake pressure, or a common parameter, is used as a value representing the engine load to control the engine. This simplifies matching of engine power torques between both combustion modes.

17 Claims, 27 Drawing Sheets

Fig.1

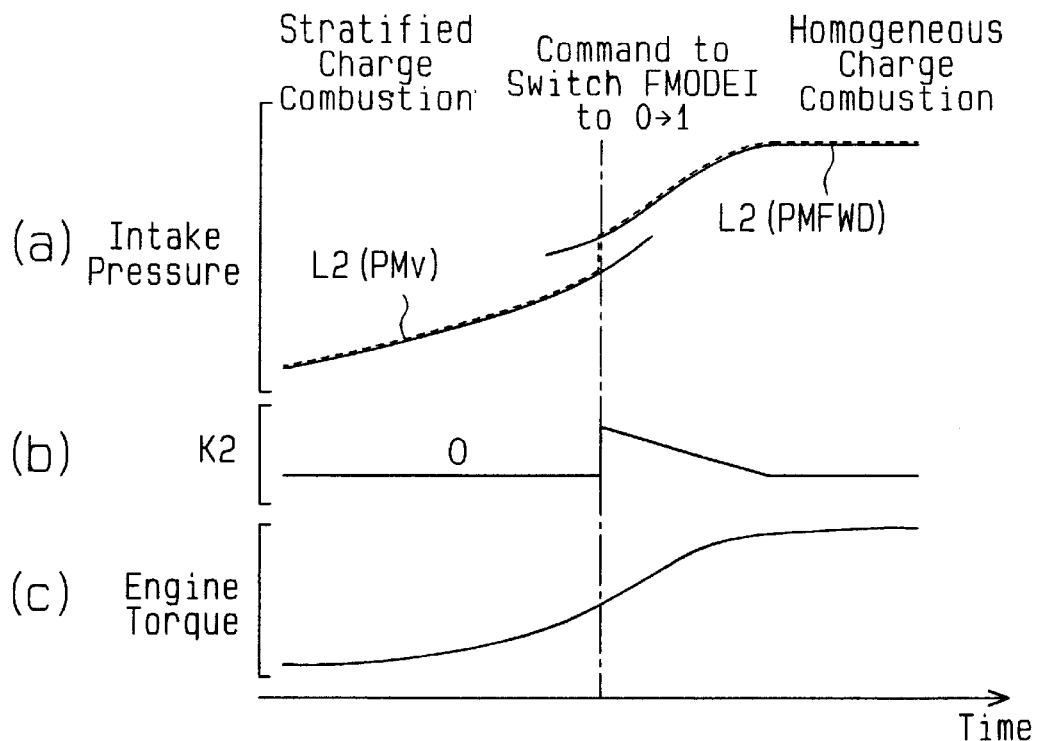
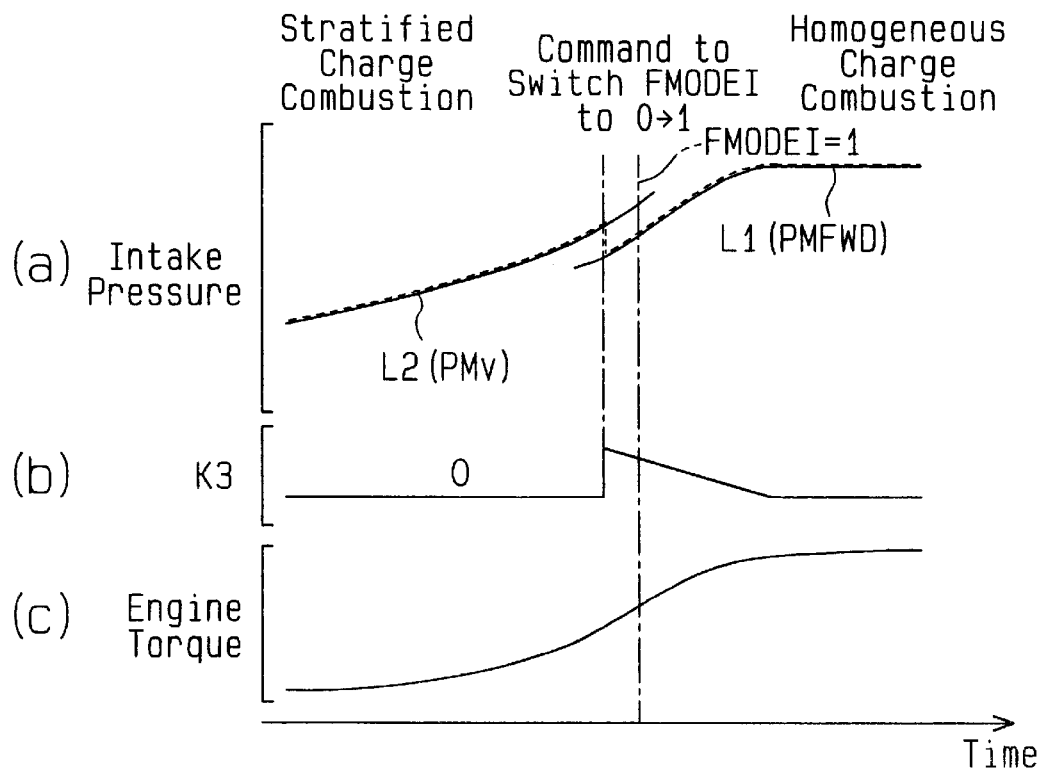

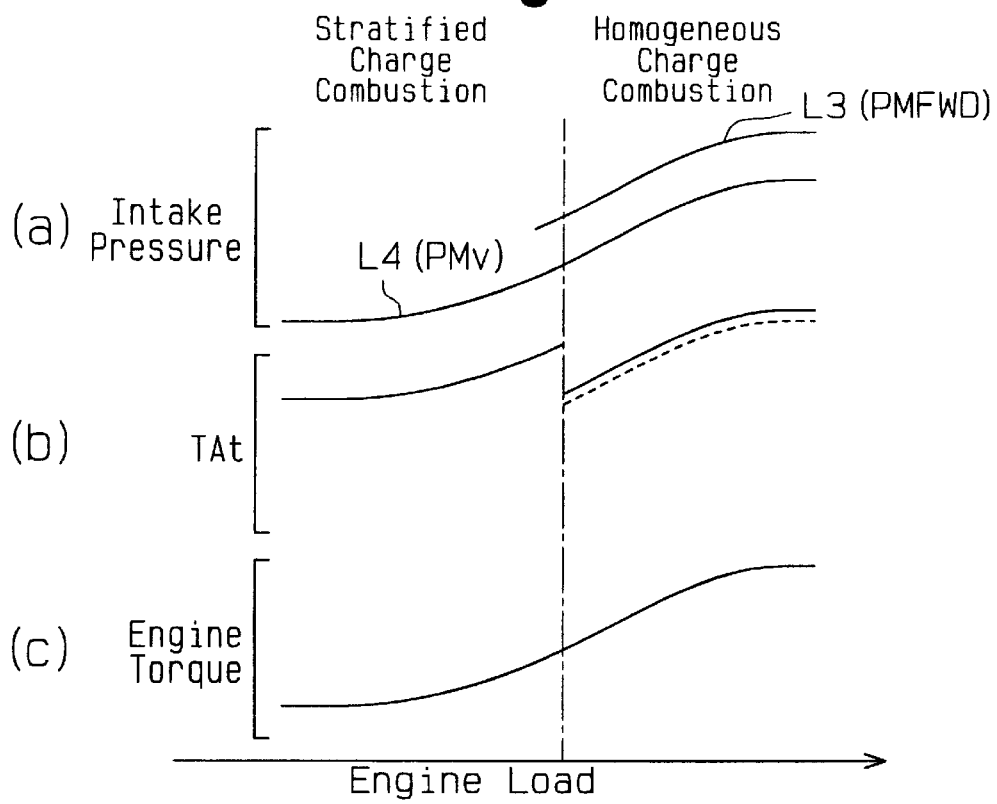
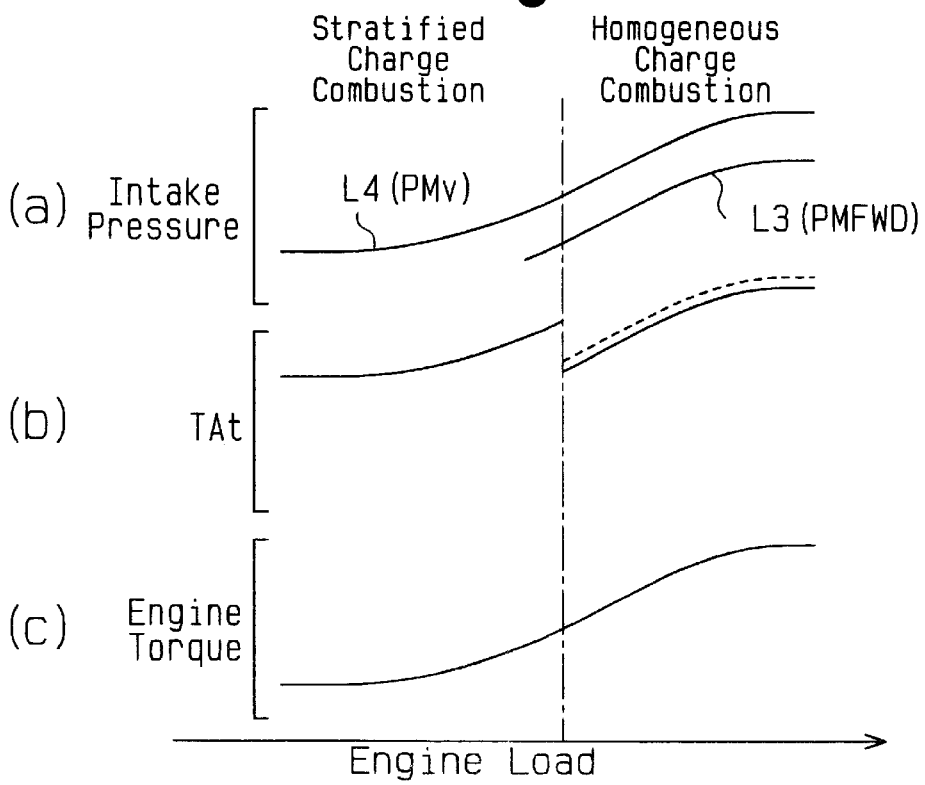

DEVICE AND METHOD FOR CONTROLLING ENGINES

BACKGROUND OF THE INVENTION

The present invention relates to an engine of the type that switches the combustion mode, and, more particularly, to a control device and control method that control an engine in accordance with a load acting on the engine.

In an ordinary vehicular engine, air drawn into a combustion chamber via an intake passage and fuel to be injected from a fuel injection valve are blended to form an air-fuel mixture. The engine acquires drive power by burning the air-fuel mixture in the combustion chambers. A throttle valve for regulating the amount of air to be led into the combustion chambers is provided in the intake passage. As the amount of air to be led into the combustion chambers is regulated by adjusting the degree of opening of the throttle valve, the amount of the air-fuel mixture to be filled in the combustion chambers changes, thereby adjusting the power of the engine.

Recently, engines of the type that switch the combustion mode in accordance with the running state of the engine have been proposed and made into practical use to improve fuel efficiency and to produce sufficient engine power at the same time. Such an engine is disclosed in, for example, Japanese Unexamined Patent Publication (KOKAI) No. Hei 5-288098.

The engine disclosed in the publication has a fuel injection valve that directly injects fuel into the combustion chambers. In high engine speed mode or high load mode, combustion takes place with fuel evenly mixed with air to produce sufficient engine power. Such a combustion mode is called homogeneous charge combustion. To execute homogeneous charge combustion, fuel is injected into a combustion chamber in the suction stroke of the engine. The injected fuel is evenly mixed with air in the combustion chamber and the homogeneous mixture of air and fuel is ignited by an ignition plug.

In low engine speed mode or low load mode, on the other hand, stratified charge combustion is executed in order to improve the fuel efficiency. In stratified charge combustion mode, the fuel concentration around the ignition plug is increased to improve ignition, and combustion is carried out while the average air-fuel ratio of the mixture in the combustion chamber is greater than the stoichiometric air-fuel ratio. To execute stratified charge combustion, fuel is injected into the combustion chamber in the compression stroke of the engine. The injected fuel strikes a dent provided at the top of the piston and is gathered around the ignition plug. The mixture of the gathered fuel and the air in the combustion chamber is ignited by the ignition plug.

In stratified charge combustion, the degree of opening of the throttle valve is greater than that in homogeneous charge combustion mode. As a result, the pumping loss is reduced.

As the combustion mode for an engine is switched between homogeneous charge combustion and stratified charge combustion in accordance with the running state of the engine in the manner described above, the fuel efficiency can be improved and sufficient engine power is produced.

Normally, engines are controlled in accordance with the load. One example of control according to the engine load is fuel injection amount control. For the engine in which the combustion mode is switched, a parameter representing the amount of intake air, e.g., the amount of intake air itself or the intake pressure, is used as a value representing the engine load in homogeneous charge combustion mode. In accordance with the value of that parameter, the fuel injection amount is controlled.

In stratified charge combustion, the throttle angle is greater than that in homogeneous charge combustion mode. If a parameter representing the amount of intake air is used to control the fuel injection amount in stratified charge combustion mode, the fuel injection amount is inadequate for the engine load. In stratified charge combustion mode, therefore, the amount of manipulation of the acceleration is used to represent the engine load and the fuel injection amount is controlled in accordance with the position of the acceleration pedal.

As apparent from the above, fuel injection amount control according to the engine load is executed adequately by switching the value that is used to represent the engine load, in accordance with the combustion mode of the engine.

That the value to be used to represent the engine load differs in accordance with the combustion mode of the engine means that controls executed in accordance with the engine load in homogeneous charge combustion and stratified charge combustion are independent.

The control that is performed in accordance with the engine load generally affects the power torque of the engine. If controls that take place in accordance with the engine load in homogeneous charge combustion and stratified charge combustion are independent, however, it is difficult to match the engine power torque characteristics between the combustion modes. In particular, fuel injection amount control significantly influences the engine power torque characteristics including the response characteristic in the transient state of the engine power torque characteristics. It therefore is difficult to match the engine power torque characteristics between homogeneous charge combustion and stratified charge combustion.

BRIEF SUMMARY OF THE INVENTION

The present invention has been made in view of such situation, and the object of the present invention is to provide a control device and control method for an engine that can easily match the engine output torque characteristics between homogeneous charge combustion and stratified charge combustion during engine control that depends on engine load.

To achieve the object, the present invention provides a control device for an engine that acquires power by burning a mixture of air and fuel in a combustion chamber. The engine has an acceleration pedal and a throttle valve for adjusting an amount of intake air to the combustion chamber. The engine switches a combustion mode between homogeneous charge combustion and stratified charge combustion. The control device has control means that controls the engine in accordance with a load acting on the engine. When homogeneous charge combustion is executed, the control means uses a parameter representing the amount of intake air as a value representing the engine load. The control device further has computation means for computing, as a virtual parameter, a value equivalent to the parameter presuming homogeneous charge combustion is executed with an amount of manipulation of the acceleration pedal when executing stratified charge combustion. When stratified charge combustion is executed, the control means uses the virtual parameter as a value representing the engine load.

The present invention also provides a control method for an engine that acquires power by burning a mixture of air and fuel in a combustion chamber. The engine has an acceleration pedal and a throttle valve for adjusting an amount of intake air to the combustion chamber. The engine switches a combustion mode between homogeneous charge combustion and stratified charge combustion. The control method includes the steps of controlling the engine in accordance with a load acting on the engine; using a parameter representing the amount of intake air as a value representing an engine load when homogeneous charge combustion is executed; computing, as a virtual parameter, a value equivalent to the parameter presuming homogeneous charge combustion is executed with an amount of manipulation of the acceleration pedal when executing stratified charge combustion; and using the virtual parameter as a value representing the engine load when stratified charge combustion is executed.

In either combustion mode, homogeneous charge combustion or stratified charge combustion, a common parameter representing the amount of intake air is used as a value representing the engine load in controlling the engine. This associates engine control according to the engine load in homogeneous charge combustion with that in stratified charge combustion, thus ensuring easy matching of the engine output torque characteristics between the combustion modes.

BRIEF DESCRIPTION OF THE DRAWINGS

FIG. 1 is a cross-sectional view illustrating an engine according to a first embodiment of the present invention;

FIG. 21 is a time chart showing the transitions of a predicted intake pressure, a virtual intake pressure, an ignition-timing-delay-angle correcting amount and an engine torque when stratified charge combustion is switched to homogeneous charge combustion;

FIG. 22 is a time chart showing the transitions of a predicted intake pressure, a virtual intake pressure, a throttle-angle correcting amount and an engine torque when stratified charge combustion is switched to homogeneous charge combustion;

FIG. 32 is a graph showing the transitions of a predicted intake pressure, a virtual intake pressure, a target throttle angle and an engine torque in accordance with a change in engine load at stratified charge combustion and homogeneous charge combustion;

FIG. 33 is a graph showing the transitions of a predicted intake pressure, a virtual intake pressure, a target throttle angle and an engine torque in accordance with a change in engine load at stratified charge combustion and homogeneous charge combustion;

Figure 2:
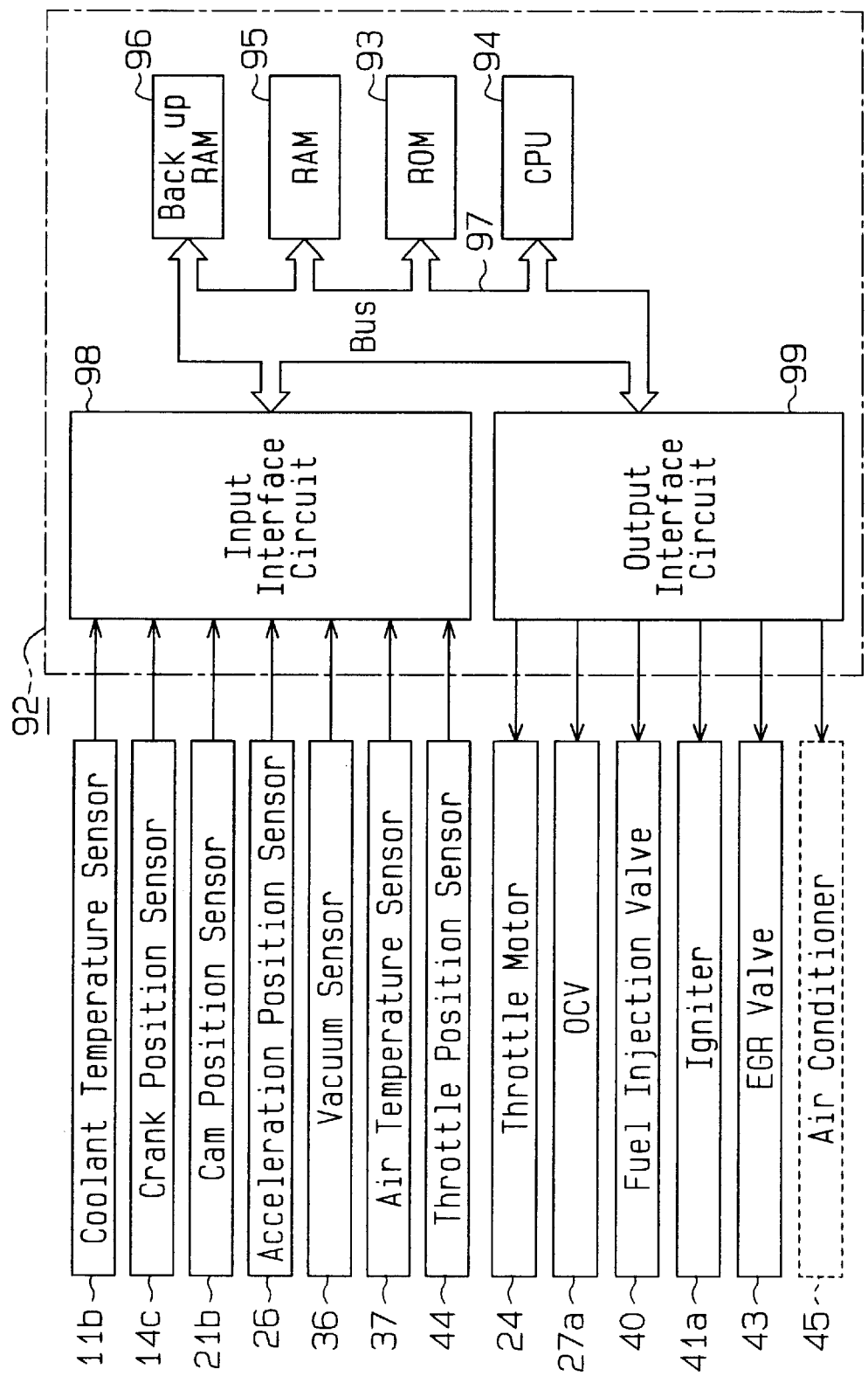
FIG. 2 is a block diagram showing the electric structure of a control device with which the engine in FIG. 1 is equipped.

DETAILED DESCRIPTION OF THE PREFERRED EMBODIMENTS (First Embodiment)

A description will be given below of a first embodiment in which the present invention is adapted to a four-cylinder in-line vehicular gasoline engine with reference to FIGS. 1 to 16.

Figure 1:
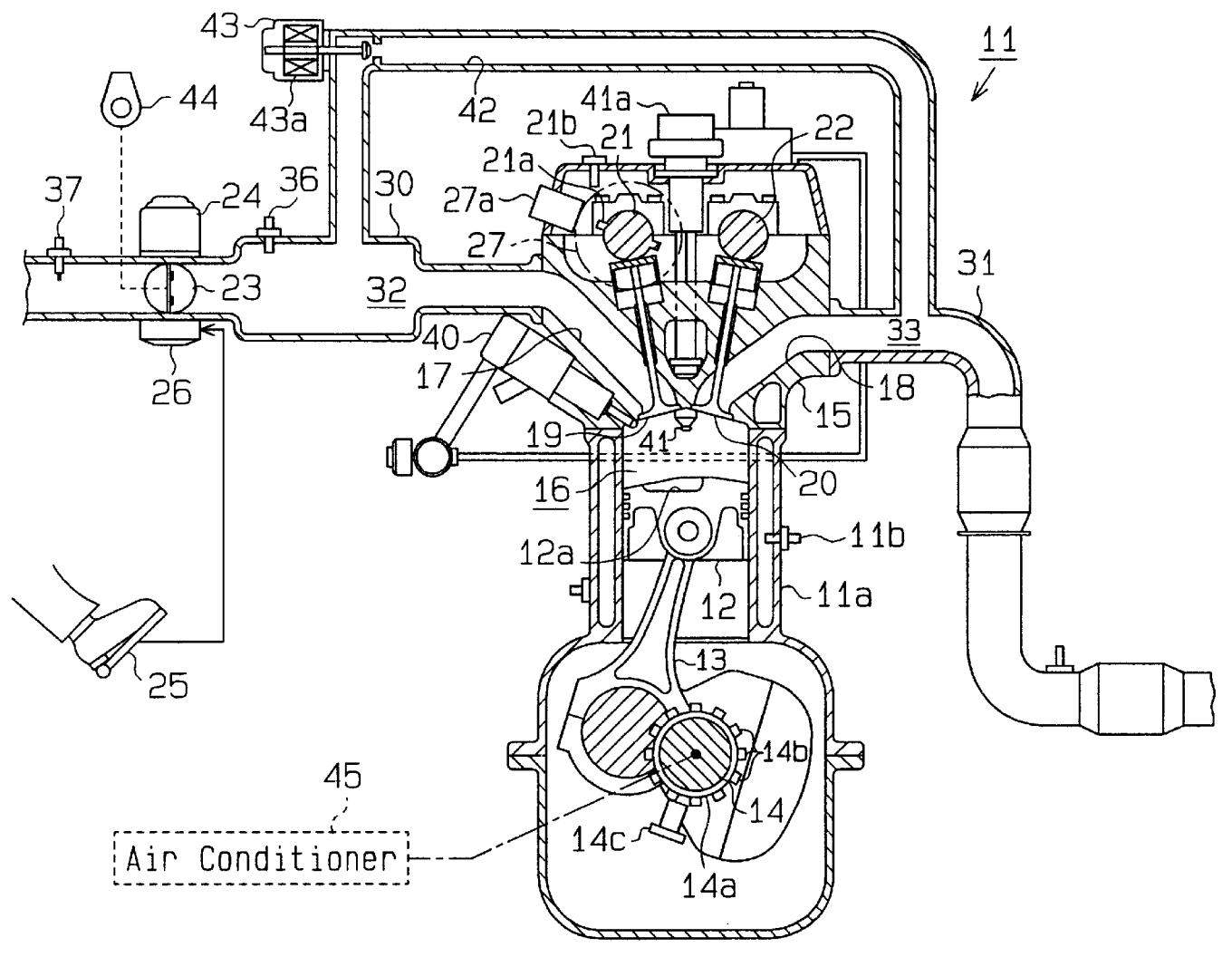

As shown in FIG. 1, an engine 11 has a cylinder block 11a having four cylinders (only one shown). Pistons 12, which are provided in association with the respective cylinders, reciprocate in the cylinder block 11a. Each piston 12 is coupled to a crankshaft or an output shaft 14 via a connecting rod 13. The reciprocal motion of the piston 12 is converted to rotary motion of the crankshaft 14 by the connecting rod 13. Formed in the top surface of the piston 12 is a dent 12a, which is needed to carry out stratified charge combustion.

A signal rotor 14a is attached to one end of the crankshaft 14. A plurality of projections 14b are provided on the outer surface of the signal rotor 14a at equal angular positions around the axis of the crankshaft 14. A crank position sensor 14c is provided to face the outer surface of the signal rotor 14a. As the crankshaft 14 rotates, the individual projections 14b on the signal rotor 14a pass, one by one, the position that faces the crank position sensor 14c. The crank position sensor 14c outputs a pulse-like detection signal in accordance with the passage of the projections 14b.

The cylinder block 11a is provided with a coolant temperature sensor 11b, which detects the temperature, THW, of the coolant flowing in the engine 11 as the temperature of the engine 11.

A cylinder head 15 is attached to the top of the cylinder block 11a. A combustion chamber 16 is formed between the cylinder head 15 and each piston 12. Intake ports 17 and exhaust ports 18, provided in the cylinder head 15, are connected to each combustion chamber 16. Intake valves 19 are provided in association with the intake ports 17. Likewise, exhaust valves 20 are provided in association with the exhaust ports 18.

As shown in FIG. 1, an intake cam shaft 21 for driving the intake valves 19 is rotatably supported on the cylinder head 15. An exhaust cam shaft 22 for driving the exhaust valves 20 is also rotatably supported on the cylinder head 15. The intake and exhaust cam shafts 21 and 22 are coupled to the crankshaft 14 via a drive and transmission mechanism, which includes a timing belt and gears (neither shown). As the intake cam shaft 21 is turned by the crankshaft 14, the intake valves 19 are driven in such a way as to selectively connect and disconnect the intake ports 17 to and from the combustion chamber 16. As the exhaust cam shaft 22 is turned by the crankshaft 14, the exhaust valves 20 are driven to selectively connect and disconnect the exhaust ports 18 to and from the combustion chamber 16.

The transmission of the rotation to the intake cam shaft 21 from the crankshaft 14 is carried out via a valve timing varying mechanism 27 provided on the intake cam shaft 21. The valve timing varying mechanism 27 varies the valve timing of the intake valves 19 by changing the rotational phase of the intake cam shaft 21 with respect to the crankshaft 14. The valve timing varying mechanism 27 is driven by oil that is supplied via an oil control valve (OCV) 27a. The valve timing of the intake valves 19 is adjusted by controlling hydraulic pressure for actuating the valve timing varying mechanism 27 by controlling the OCV 27a. Adjusting the valve timing optimizes the valve timing of the intake valves 19, which improves engine power and reduces specific fuel consumption.

A cam position sensor 21b is provided on the cylinder head 15 to face the outer surface of one end of the intake cam shaft 21. One or plural (two in FIG. 1) projections 21a are provided on the outer surface of one end of the intake cam shaft 21. As the intake cam shaft 21 rotates, the projections 21a pass the position that faces the cam position sensor 21b. The cam position sensor 21b outputs a pulse-like detection signal in accordance with the passage of the projections 21a.

An intake manifold 30 is connected to the intake ports 17. An exhaust manifold 31 is connected to the exhaust ports 18. The intake manifold 30 and the intake ports 17 constitute an intake passage 32, and the exhaust manifold 31 and the exhaust ports 18 constitute an exhaust passage 33. A throttle valve 23 is located in the intake passage 32. The throttle valve 23 is driven by a throttle motor 24 comprised of a DC motor to regulate the amount of opening of the intake passage 32. The degree of opening of the throttle valve 23 is detected by a throttle position sensor 44.

The throttle motor 24 is controlled based on the depression amount of an acceleration pedal 25 provided in the passenger compartment of a car. As the driver of the car steps on the acceleration pedal 25, the depression amount of the acceleration pedal 25 is detected by an acceleration position sensor 26 and the throttle motor 24 is controlled based on the result of that detection. The throttle motor 24 adjusts the degree of opening of the throttle valve 23. In accordance with the degree of opening of the throttle valve 23, the amount of air that is supplied into the combustion chamber 16 from the intake passage 32 is regulated.

Provided at the downstream of the throttle valve 23 is a vacuum sensor 36, which detects the internal pressure of the intake passage 32. The vacuum sensor 36 outputs a detection signal corresponding to the internal pressure of the intake passage 32. Provided at the upstream of the throttle valve 23 is an air temperature sensor 37, which detects the temperature of air that passes through the intake passage 32. The air temperature sensor 37 outputs a detection signal corresponding to the detected air temperature (intake air temperature) THA.

As shown in FIG. 1, fuel injection valves 40, which directly inject fuel in the combustion chambers 16, are provided in the cylinder head 15 in association with the respective combustion chambers 16. Ignition plugs 41, which ignite the mixture of fuel and air in the combustion chambers 16, are provided in association with the respective combustion chambers 16. The timing at which the ignition plug 41 performs ignition is adjusted by an igniter 41a provided above the ignition plug 41.

The fuel that is injected into the combustion chamber 16 from the fuel injection valve 40 is mixed with the air that is taken into the combustion chamber 16 from the intake passage 32, thus yielding the mixture of air and fuel in the combustion chamber 16. The mixture in the combustion chamber 16 is ignited by the ignition plug 41 and burned, and the gas that is produced by combustion is sent as an exhaust gas to the exhaust passage 33.

A portion of the intake passage 32 downstream of the throttle valve 23 is connected to the exhaust passage 33 via an exhaust gas recirculation passage (EGR passage) 42. An EGR valve 43 having a step motor 43a is located in the EGR passage 42. The degree of opening of the EGR valve 43 is regulated by the step motor 43a. The adjustment of the degree of opening of the EGR valve 43 regulates the amount of the exhaust (EGR amount) that recirculates to the intake passage 32 from the exhaust passage 33. The recirculation of the exhaust to the intake passage 32 lowers the temperature of the combustion chamber 16, which suppresses the generation of a nitrogen oxide (NOx), thus leading to reduction in emission.

The electric structure of the control device for the engine 11 will now be described referring to FIG. 2. The control device has an electronic control unit (hereinafter called "ECU") 92, which performs engine controls, such as fuel injection amount control, fuel injection timing control, ignition timing control, throttle angle control and EGR control. The ECU 92 is constructed as an arithmetic logic circuit, which includes a ROM 93, CPU 94, RAM 95, backup RAM 96, etc.

The ROM 93 stores various control programs and maps or the like, which are referred to when running the various control programs. The CPU 94 performs arithmetic operations based on the various control programs and maps stored in the ROM 93. The RAM 95 temporarily stores the results of operations in the CPU 94 and data or the like input from individual sensors. The backup RAM 96 is a non-volatile memory which stores data to be saved at the time the engine 11 is stopped. The ROM 93, CPU 94, RAM 95 and backup RAM 96 are connected to one another and are connected to an input interface circuit 98 and an output interface circuit 99, by a bus 97.

Connected to the input interface circuit 98 are the coolant temperature sensor 11b, the crank position sensor 14c, the cam position sensor 21b, the acceleration position sensor 26, the vacuum sensor 36, the air temperature sensor 37, the throttle position sensor 44, and the like. Connected to the output interface circuit 99 are the throttle motor 24, the OCV 27a, the fuel injection valves 40, the igniters 41a, the EGR valve 43, etc.

The ECU 92 switches the combustion mode between stratified charge combustion and homogeneous charge combustion in accordance with the running state of the engine 11. The ECU 92 sets the combustion mode to homogeneous charge combustion when the engine 11 is in the high speed or high load state. When the engine 11 is in the low speed or low load state, the ECU 92 sets the combustion mode to stratified charge combustion. In the high engine speed or high load state, homogeneous charge combustion is performed so that the air-fuel ratio of the mixture is made relatively smaller, thus enhancing the engine power. In the low engine speed or low load state, stratified charge combustion is executed so that the air-fuel ratio of the mixture is made relatively larger, thus improving the fuel efficiency.

When homogeneous charge combustion is to be executed, the ECU 92 injects fuel from the fuel injection valve 40 in the suction stroke of the engine 11. At this time, the air-fuel ratio of the mixture in the combustion chamber 16 becomes the stoichiometric air-fuel ratio or larger. The ECU 92 controls the driving of the throttle motor 24 in such a way that the real throttle angle approaches the target throttle angle based on the acceleration depression amount, and controls the igniter 41a, the EGR valve 43, etc. in such a manner that the ignition timing, the EGR amount and so forth become suitable values for homogeneous charge combustion.

When stratified charge combustion is to be executed, the ECU 92 injects fuel from the fuel injection valve 40 in the compression stroke of the engine 11. At this time, the air-fuel ratio of the mixture in the combustion chamber 16 becomes larger than the air-fuel ratio in the homogeneous charge combustion mode. The ECU 92 controls the driving of the throttle motor 24 in such a way that the real throttle angle approaches the target throttle angle based on the basic fuel injection amount that is computed from the acceleration depression amount to be discussed later, and controls the igniter 41a, the EGR valve 43, etc. in such a way that the ignition timing, the EGR amount and so forth become suitable values for stratified charge combustion.

When stratified charge combustion is performed, the fuel injected from the fuel injection valve 40 enters the dent 12a (see FIG. 1) provided in the top of the piston 12 and is gathered around the ignition plug 41 by the movement of the piston 12. Even if the average air-fuel ratio of the mixture in the combustion chamber 16 is greater than that in homogeneous charge combustion mode, therefore, the air-fuel ratio of the mixture around the ignition plug 41 becomes a value suitable for ignition. As a result, the mixture is ignited well. To make the average air-fuel ratio of the entire air-fuel mixture in the combustion chamber 16 greater than that in homogeneous charge combustion, the throttle angle is made relatively large, increasing the amount of intake air. In stratified charge combustion mode, therefore, the pumping loss of the engine 11 is reduced.

For the engine 11, various controls, such as fuel injection amount control, ignition timing control, throttle angle control and EGR control, are executed through the ECU 92. In fuel injection amount control in homogeneous charge combustion mode, for example, the intake pressure or a parameter representing the amount of intake air is used as a value representing the engine load and the fuel injection amount is controlled in accordance with the intake pressure.

In stratified charge combustion mode, in contrast, the throttle angle when the depression amount of the acceleration pedal 25 has a certain value is larger than that in homogeneous charge combustion mode, and the intake pressure is higher than that in homogeneous charge combustion mode. In stratified charge combustion mode, therefore, even if fuel injection amount control is executed based on the intake pressure, the fuel injection amount is not suitable for the engine load. In this respect, the depression amount of the acceleration pedal 25 is used as a value representing the engine load in stratified charge combustion mode, and the fuel injection amount is controlled according to that acceleration depression amount.

As the parameter used as a value representing the engine load is switched in accordance with the combustion mode of the engine as described above, the fuel injection amount control according to the engine load is performed properly. If the parameter used as a value representing the engine load differs in accordance with the combustion mode of the engine, however, controls that are executed in accordance with the engine load in homogeneous charge combustion mode and stratified charge combustion mode become independent. This makes it difficult to match the engine power torque characteristics between the combustion modes.

According to the present embodiment, the intake pressure when executing homogeneous charge combustion with the acceleration depression amount in stratified charge combustion mode is computed as a virtual intake pressure, which is used as a value representing the engine load in executing various controls according to the engine load. As the intake pressure is used as a value representing the engine load in both stratified charge combustion and homogeneous charge combustion, the control that is carried out according to the engine load in homogeneous charge combustion is associated with one in stratified charge combustion. This simplifies the matching of the engine power torque characteristics between the combustion modes.

Figure 3:
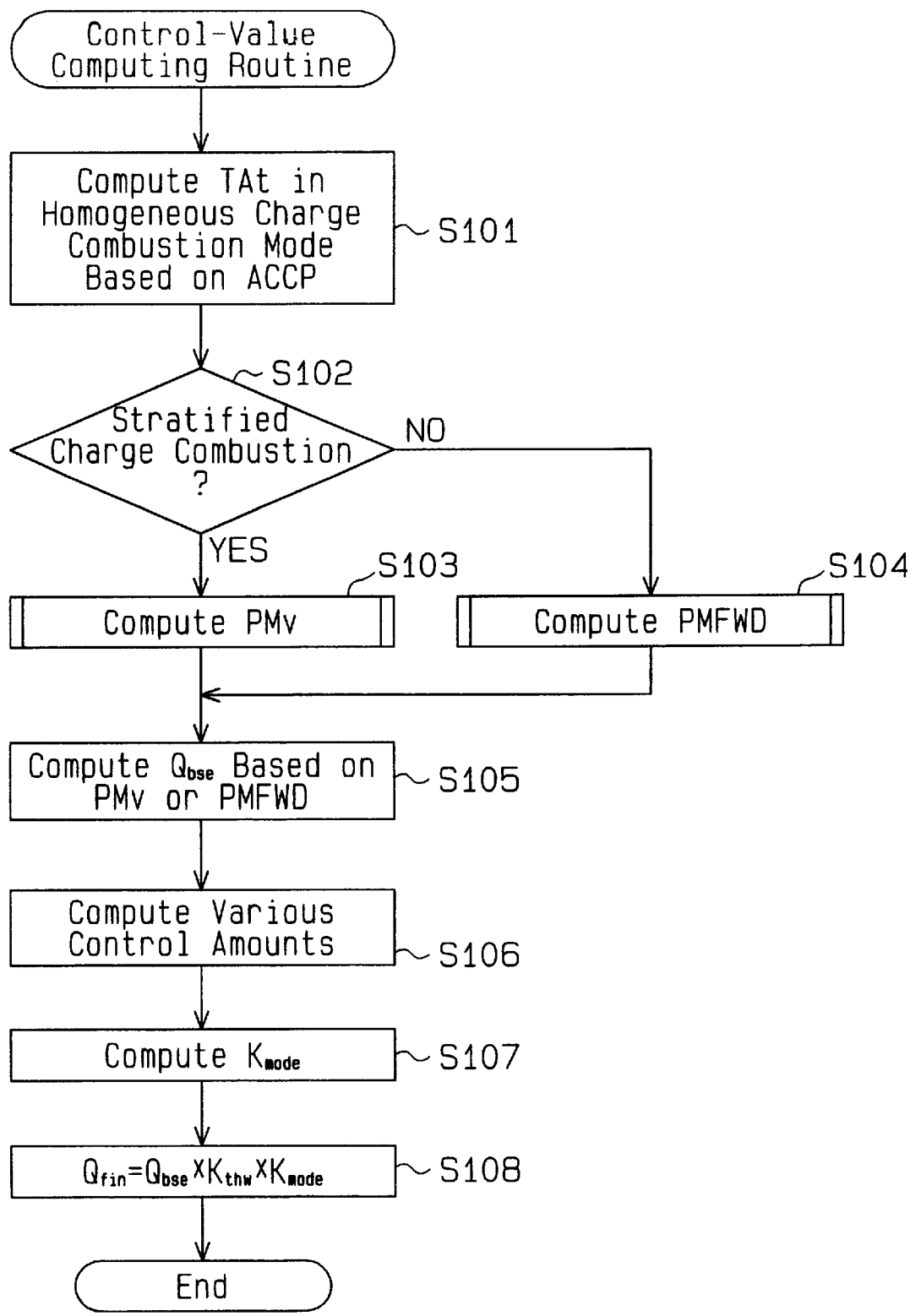
FIG. 3 is a flowchart illustrating procedures of computing various control values of the engine.
Figure 4:
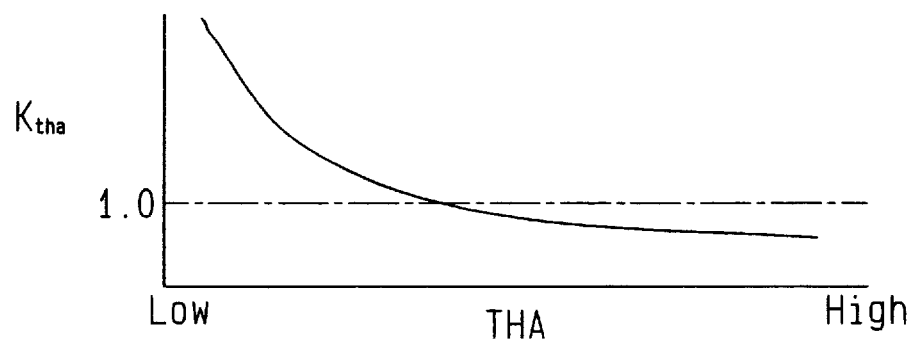
FIG. 4 is a map that is referred to at the time of computing an intake-air-temperature correcting coefficient.
Figure 5:
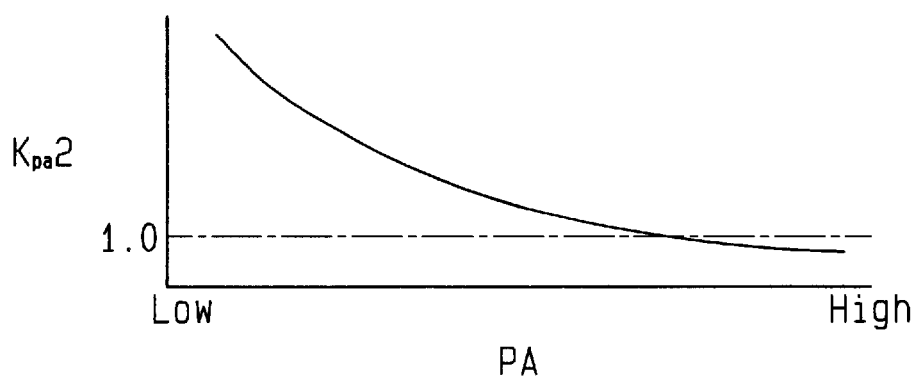
FIG. 5 is a map that is referred to at the time of computing an atmospheric-pressure correcting coefficient.
Figure 6:
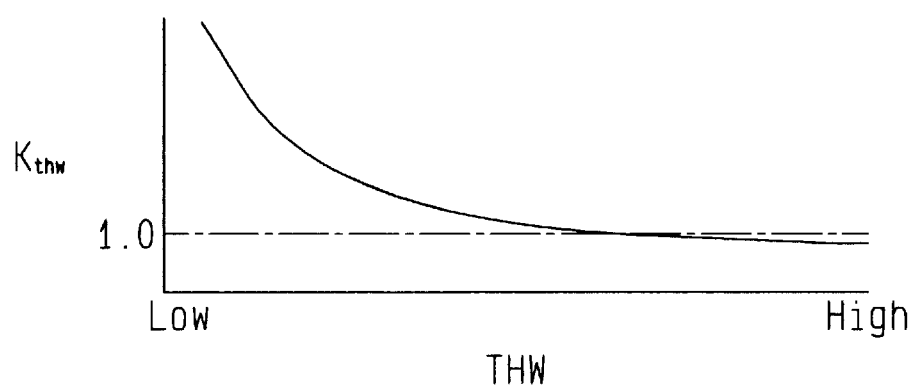
FIG. 6 is a map that is referred to at the time of computing a water-temperature correcting coefficient.

With reference to FIG. 3, a description will now be given of procedures of computing various control values that are used in controlling the engine 11. FIG. 3 shows a control-value computing routine for computing various control values of the engine 11. The control-value computing routine is executed in an interruption that occurs at predetermined time intervals (e.g., 8 ms) through the ECU 92.

In the process of step S101, the ECU 92 acquires an acceleration depression amount ACCP based on the detection signal from the acceleration position sensor 26 and computes a target throttle angle TAt in homogeneous charge combustion mode by referring to a well-known map based on the acceleration depression amount ACCP. Subsequently, in the process of step S102, the ECU 92 determines whether stratified charge combustion is currently in progress or not. When it is determined that stratified charge combustion is not in progress at present, i.e., that homogeneous charge combustion is being executed, the flow goes to step S104.

In homogeneous charge combustion mode, the ECU 92 controls the throttle motor 24 in such a manner that the real throttle angle TAr which is acquired based on the detection signal from the throttle position sensor 44 approaches the previously obtained target throttle angle TAt. In such a homogeneous charge combustion mode, the ECU 92 computes a predicted intake pressure PMFWD in the process of step S104. The predicted intake pressure PMFWD is the value that predicts the intake pressure when the intake valve 19 is closed and is a parameter representing the amount of intake air.

When the intake pressure is used in the fuel injection amount control and ignition timing control as a value representing the engine load, it is preferable to use the intake pressure around the time at which the amount of intake air in the engine 11 is settled or the time of closing the intake valve 19. In this case, the intake pressure around the time of closing the intake valve 19 is actually measured and the driving of the fuel injection valve 40 and the igniter 41a is controlled based on the fuel injection amount and the ignition timing that are computed from the measured value. By the time the fuel injection valve 40 and the igniter 41a are controlled based on those control values, however, the optimal timing to execute the control has already passed.

In the process of step S104, therefore, the predicted intake pressure PMFWD at the time of closing the intake valve 19 is computed before closing the intake valve 19, and control values for the aforementioned various controls are computed by using the predicted intake pressure PMFWD as a value representing the engine load. In the process of step S104, the predicted intake pressure PMFWD is computed based on the real intake pressure PMr, the real throttle angle TAr, the engine speed NE and so forth. The real intake pressure PMr is obtained based on the detection signal from the vacuum sensor 36, and the engine speed NE is obtained based on the detection signal from the crank position sensor 14c.

When it is determined in the process of step S102 that stratified charge combustion is currently underway, the flow proceeds to step S103. In the process of step S103, the ECU 92 computes a virtual intake pressure PMv. The virtual intake pressure PMv is a value equivalent to the predicted intake pressure PMFWD at the time of executing homogeneous charge combustion with the acceleration depression amount ACCP in stratified charge combustion mode, and is a virtual value which is computed based on the target throttle angle TAt in the homogeneous charge combustion mode. In the process of step S103, the real throttle angle at the time of executing homogeneous charge combustion with the present (stratified charge combustion mode) acceleration depression amount ACCP is computed as a virtual throttle angle TAv based on the target throttle angle TAt in the homogeneous charge combustion mode. Further, the virtual intake pressure PMv is computed based on the virtual throttle angle TAv, etc.

After the process of either step S103 or step S104 is executed to compute the virtual intake pressure PMv or the predicted intake pressure PMFWD in the above-described manner, the flow then proceeds to the next step S105. In the process of step S105, the ECU 92 uses the virtual intake pressure PMv or the predicted intake pressure PMFWD as the intake pressure PM and computes the basic fuel injection amount Qbse from the following equation (1). That is, the basic fuel injection amount Qbse is calculated by multiplying the intake pressure PM by a volumetric efficiency $\eta v$ computed referring to a map based on the intake pressure PM and the engine speed NE, an intake-air-temperature correcting coefficient Ktha and a constant K.

$$Qbse = PM \times \eta v \times Ktha \times K \tag{1}$$

The intake-air-temperature correcting coefficient Ktha is a correcting coefficient for compensating for a change in the volumetric efficiency $\eta v$ which is caused by a change in intake air temperature THA. The ECU 92 acquires the intake air temperature THA based on the detection signal from the air temperature sensor 37 and computes the intake-air-temperature correcting coefficient Ktha based on the intake air temperature THA referring to the map in FIG. 4. As the intake air temperature THA gets higher, the intake-air-temperature correcting coefficient Ktha becomes smaller and approaches 1.0. The lower the intake air temperature THA becomes, therefore, the greater the basic fuel injection amount Qbse after correction becomes.

Figure 7:
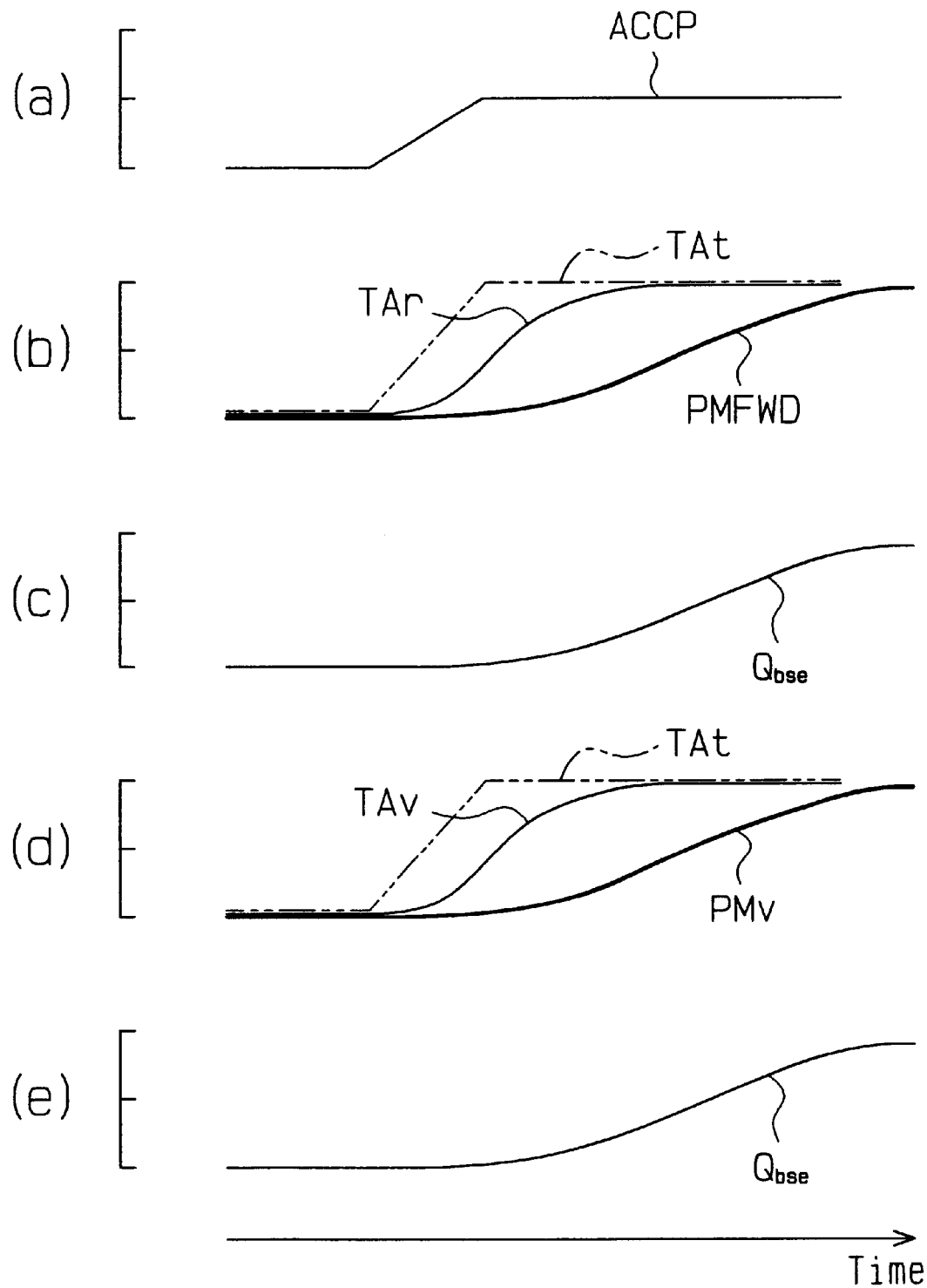
FIG. 7 is a time chart showing the transitions of a target throttle angle, a real throttle angle, a predicted intake pressure and a basic fuel injection amount in homogeneous charge combustion mode and the transitions of a virtual throttle angle, a virtual intake pressure and a basic fuel injection amount in stratified charge combustion mode, with respect to a change in an acceleration depression amount.

(a) to (e) in FIG. 7 show how the target throttle angle TAt, the real throttle angle TAr, the predicted intake pressure PMFWD and the basic fuel injection amount Qbse in homogeneous charge combustion mode change and how the virtual throttle angle TAv, the virtual intake pressure PMv and the basic fuel injection amount Qbse in stratified charge combustion mode change, with respect to a change in a predetermined acceleration depression amount ACCP.

The graph (a) in FIG. 7 shows one example of a change in acceleration depression amount ACCP. When the acceleration depression amount ACCP changes as shown in the graph (a), the target throttle angle TAt in homogeneous charge combustion mode changes as indicated by the two-dashed chain lines in the graphs (b) and (d). With respect to such a change in the target throttle angle TAt, the real throttle angle TAr changes with a predetermined response delay as indicated by the thin solid line in the graph (b) in homogeneous charge combustion mode. Such a response delay is given to prevent so-called overshooting or an excessive change in the real throttle angle TAr with respect to a change in target throttle angle TAt. With respect to the transition of the real throttle angle TAr, the predicted intake pressure PMFWD in homogeneous charge combustion mode changes with a predetermined response delay as indicated by the thick solid line in the graph (b). Further, with respect to the transition of the predicted intake pressure PMFWD, the basic fuel injection amount Qbse in homogeneous charge combustion mode changes as shown in the graph (c).

With respect to the target throttle angle TAt in homogeneous charge combustion mode shown in the graph (d), the virtual throttle angle TAv changes with a predetermined response delay as indicated by the thin solid line in the graph (d) in stratified charge combustion mode. The transitional tendency of the virtual throttle angle TAv in stratified charge combustion mode becomes equal to the transitional tendency of the real throttle angle TAr in homogeneous charge combustion mode as shown in the graph (b). That is, the ECU 92 computes the virtual throttle angle TAv based on the target throttle angle TAt so as to change the virtual throttle angle TAv in the aforementioned manner.

With respect to the transition of the virtual throttle angle TAv, the virtual intake pressure PMv in stratified charge combustion mode changes with a predetermined response delay as indicated by the solid line in the graph (d). The transitional tendency of the virtual intake pressure PMv in stratified charge combustion mode becomes equal to the transitional tendency of the predicted intake pressure PMFWD in homogeneous charge combustion mode as shown in the graph (b). That is, the ECU 92 computes the virtual intake pressure PMv based on the virtual throttle angle TAv, etc. so as to change the virtual intake pressure PMv in the aforementioned manner.

Further, with respect to the transition of the virtual intake pressure PMv, the basic fuel injection amount Qbse in stratified charge combustion mode changes as shown in the graph (e). The transitional tendency of the basic fuel injection amount Qbse in stratified charge combustion mode becomes equal to the transitional tendency of the basic fuel injection amount Qbse in homogeneous charge combustion shown in the graph (c) because the transitional tendencies of the virtual intake pressure PMv and the predicted intake pressure PMFWD become equal.

The description will be given again of the control-value computing routine in FIG. 3. After the basic fuel injection amount Qbse is computed in the process of step S105, the ECU 92 then executes the process of step S106. In the process of step S106, the ECU 92 calculates control values for various operation controls of the engine 11, such as ignition timing control, throttle angle control and EGR control, based on the predicted intake pressure PMFWD or the basic fuel injection amount Qbse. As the engine 11 is controlled based on those various control values, the engine 11 is controlled in accordance with the engine load.

Specifically, in homogeneous charge combustion mode, the ECU 92 computes the target ignition timing, the target EGR amount, and the like in homogeneous charge combustion mode by referring to a map based on the predicted intake pressure PMFWD and the engine speed NE. In stratified charge combustion mode, the ECU 92 computes the target ignition timing, the target EGR amount, the target throttle angle, and the like in stratified charge combustion mode by referring to a map based on the basic fuel injection amount Qbse and the engine speed NE.

As the target ignition timing, the target EGR amount and the target throttle angle are computed, the ECU 92 controls the igniter 41a in a separate routine such that the ignition timing becomes the target ignition timing and controls the EGR valve 43 and the throttle motor 24 to cause the real EGR amount and the real throttle angle TAr to approach the target EGR amount and the target throttle angle.

The basic fuel injection amount Qbse is computed using the same parameter or intake pressure (virtual intake pressure PMv or predicted intake pressure PMFWD) in either of the stratified charge combustion mode and the homogeneous charge combustion mode. Therefore, various controls, such as fuel injection amount control, ignition timing control and EGR control, which are controlled in accordance with the engine load using the basic fuel injection amount Qbse in stratified charge combustion mode, are associated with various controls, such as fuel injection amount control, ignition timing control and EGR control, which are controlled in accordance with the engine load using the predicted intake pressure PMFWD in homogeneous charge combustion mode. This results in easy matching of the engine power torque characteristics between homogeneous charge combustion and stratified charge combustion.

In the process of step S107, the ECU 92 computes a mode correcting coefficient Kmode. The mode correcting coefficient Kmode is a correcting coefficient for compensating for a difference in demanded fuel injection amount that originates from a difference in combustion efficiency between homogeneous charge combustion and stratified charge combustion. The ECU 92 computes the mode correcting coefficient Kmode according to the current combustion mode. The mode correcting coefficient Kmode is set to 1.0 in homogeneous charge combustion mode where the combustion efficiency becomes lower than that in stratified charge combustion. The combustion efficiency becomes lower in homogeneous charge combustion mode than in stratified charge combustion mode because the pumping loss or the cooling loss is greater in homogeneous charge combustion than in stratified charge combustion.

In stratified charge combustion mode, where the combustion efficiency becomes higher, the ECU 92 calculates the final mode correcting coefficient Kmode by multiplying, for example, the basic mode correcting coefficient Kmode of 0.8 by an atmospheric-pressure correcting coefficient Kpa2. The pumping loss of the engine 11 changes according to the atmospheric pressure PA and as the atmospheric pressure PA falls, the difference in pumping loss between homogeneous charge combustion and stratified charge combustion becomes smaller. Thus, the ECU 92 computes the atmospheric-pressure correcting coefficient Kpa2 by referring to the map in FIG. 5 based on the atmospheric pressure PA. The atmospheric pressure PA is acquired based on the detection signal from the vacuum sensor 36 when the engine 11 is activated. The lower the atmospheric pressure PA becomes, the greater the atmospheric-pressure correcting coefficient Kpa2 becomes, and the higher the atmospheric pressure PA becomes, the closer to 1.0 the atmospheric-pressure correcting coefficient Kpa2 becomes. As the basic mode correcting coefficient Kmode of 0.8 is multiplied by the atmospheric-pressure correcting coefficient Kpa2, the final mode correcting coefficient Kmode is set to a large value, e.g., 0.85, when the atmospheric pressure PA is low.

When computing the mode correcting coefficient Kmode in step S107 in the above manner, the ECU 92 computes a final fuel injection amount Qfin by multiplying the basic fuel injection amount Qbse by a coolant-temperature correcting coefficient Kthw and the mode correcting coefficient Kmode and then temporarily terminates this control-value computing routine. Then, the ECU 92 controls the actuation of the fuel injection valve 40 in a separate routine to inject the fuel whose amount corresponds to the final fuel injection amount Qfin into the combustion chamber 16. The coolant-temperature correcting coefficient Kthw is a correcting coefficient for compensating for a change in combustion efficiency, such as a frictional loss originated from a change in coolant temperature THW. The ECU 92 acquires the coolant temperature THW based on the detection signal from the coolant temperature sensor 11b and computes the coolant-temperature correcting coefficient Kthw by referring to the map in FIG. 6 based on the coolant temperature THW. As the coolant temperature THW becomes higher, the coolant-temperature correcting coefficient Kthw becomes smaller and approaches 1.0. As the coolant temperature THW becomes lower, therefore, the final fuel injection amount Qfin is further increased.

As the basic fuel injection amount Qbse is corrected by the mode correcting coefficient Kmode in the above-described manner, the final fuel injection amount Qfin is adjusted in accordance with a difference in combustion efficiency for each combustion mode. In stratified charge combustion mode where the combustion efficiency is high, the final fuel injection amount Qfin is decreased more than in homogeneous charge combustion mode. As fuel injection control is executed based on the final fuel injection amount Qfin that is computed in consideration of the difference in combustion efficiency for each combustion mode, the precision of the engine power torque control based on fuel injection control is improved when either combustion mode is carried out.

Further, the pumping loss of the engine 11 differs between stratified charge combustion and homogeneous charge combustion, and the difference in pumping loss between the combustion modes varies according to the atmospheric pressure PA. Because the mode correcting coefficient Kmode that is used in computing the final fuel injection amount Qfin is corrected by the atmospheric-pressure correcting coefficient Kpa2, however, reduction in the precision of the engine power torque control caused by a change in the difference in pumping loss according to the atmospheric pressure PA is prevented.

Figure 8:
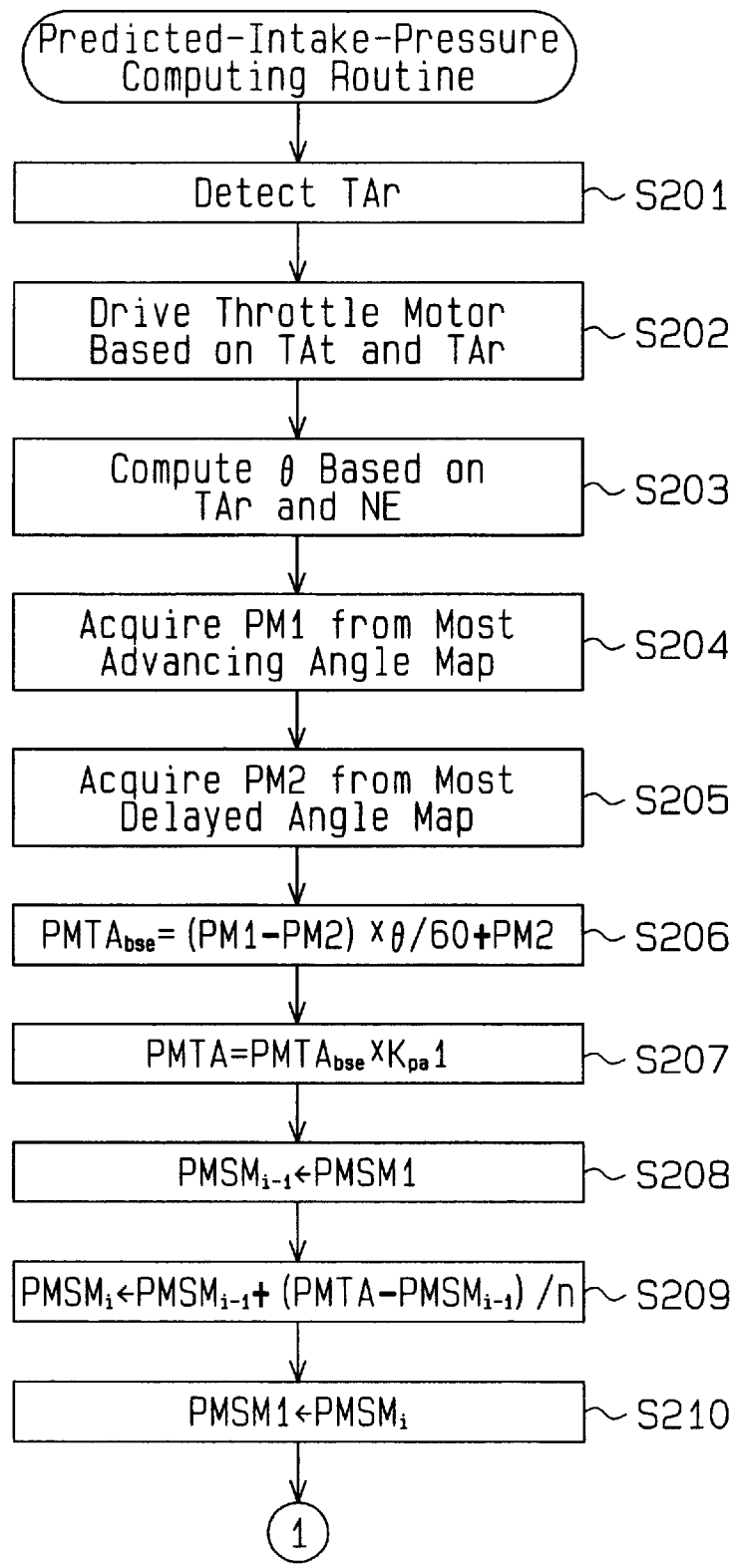
FIG. 8 is a flowchart illustrating procedures of computing the predicted intake pressure.
Figure 9:
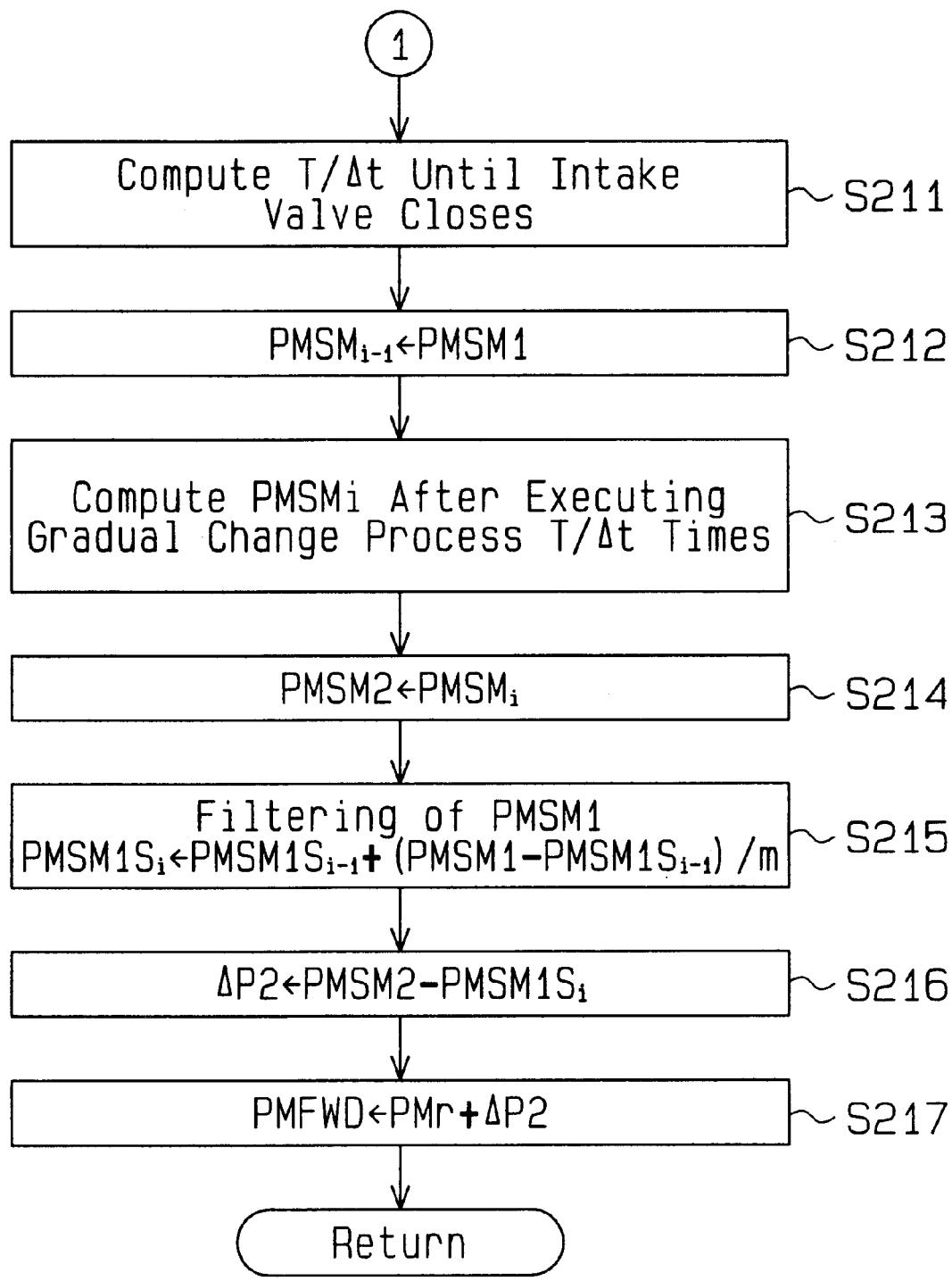
FIG. 9 is a flowchart illustrating procedures of computing the predicted intake pressure.

The process of step S104 in the control-value computing routine will now be described in detail by referring to FIGS. 8 and 9. FIGS. 8 and 9 are flowcharts illustrating a predicted-intake-pressure computing routine of computing the predicted intake pressure PMFWD in homogeneous charge combustion. This predicted-intake-pressure computing routine illustrates the details of the process of step S104 in FIG. 3.

As shown in FIG. 8, the ECU 92 computes the real throttle angle TAr based on the detection signal from the throttle position sensor 44. Subsequently, in the process of step S202, the ECU 92 drives the throttle motor 24 to control the degree of opening of the throttle valve 23 based on the real throttle angle TAr and the target throttle angle TAt in homogeneous charge combustion.

At the time of driving the throttle motor 24, the ECU 92 computes a compensation value TAh for compensating for the control of the throttle motor 24 based on the following equation (2).

$$TAh = TAr + Kd \times (dTAr/dt) \tag{2}$$

In the equation (2), the dTAr/dt is a value obtained by differentiating the real throttle angle TAr with respect to time t. The compensation value TAh that is computed based on the equation (2) is closer to the target throttle angle TAt than to the real throttle angle TAr while the target throttle angle TAt is changing.

The ECU 92 computes a difference e2 between the target throttle angle TAt and the compensation value TAh by the following equation (3). The ECU 92 controls the driving of the throttle motor 24 such that the difference e2 approaches zero, i.e., the compensation value TAh approaches the target throttle angle TAt.

$$TAt - TAh = e2 \tag{3}$$

Figure 10:
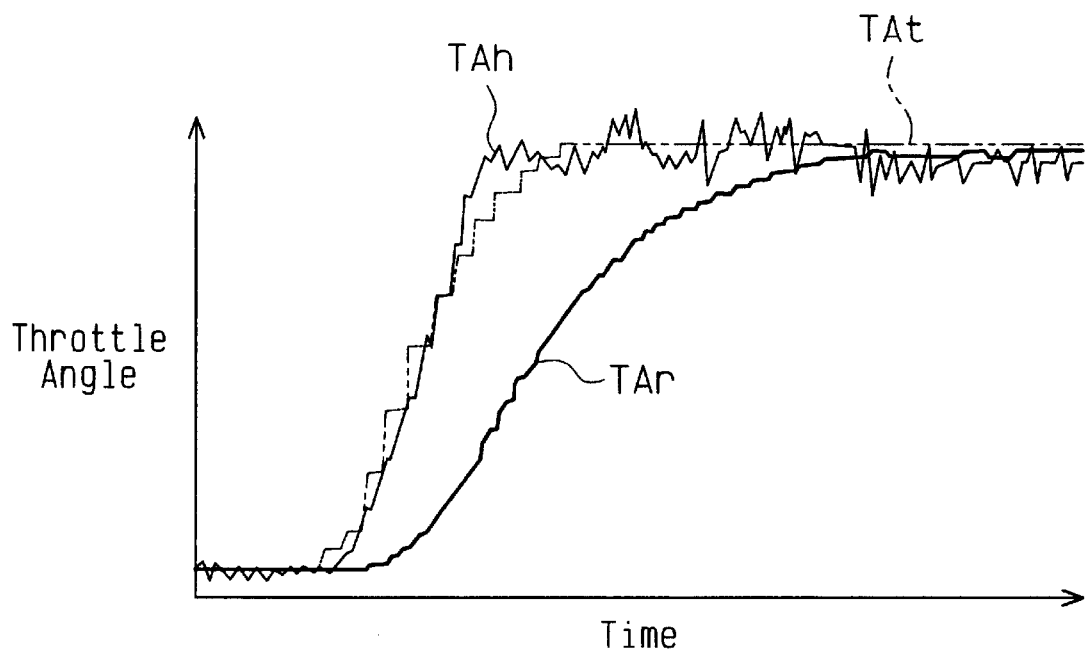
FIG. 10 is a time chart showing the transitions of a throttle angle after phase advance compensation and a real throttle angle with respect to a change in a target throttle angle.

FIG. 10 shows how the compensation value TAh and the real throttle angle TAr change when the target throttle angle TAt changes with the passage of time.

When the target throttle angle TAt changes as indicated by the two-dashed chain line in FIG. 10, the compensation value TAh changes accordingly in the vicinity of the target throttle angle TAt as indicated by the thin solid line. By controlling the throttle motor 24 in such a way that the difference e2 between the compensation value TAh and the target throttle angle TAt approaches zero, the real throttle angle TAr changes with a predetermined response delay as indicated by the thick solid line with respect to a change in the target throttle angle TAt. Providing the real throttle angle TAr with such a response delay is to prevent the overshooting of the real throttle angle TAr.

After the throttle angle control is executed in the above-described manner, the flow proceeds to step S203. The process following the step S203 inclusive predicts the intake pressure at the time of closing the intake valve 19 based on the real throttle angle TAr and real intake pressure PMr, engine speed NE and so forth at the present time, and computes the predicted intake pressure as the predicted intake pressure PMFWD. The process of steps S203 to S206 is for computing a basic intake pressure PMTAbse which is used in computing the predicted intake pressure PMFWD. The basic intake pressure PMTAbse is computed in consideration of the valve timing of the intake valve 19 which is varied by the valve timing varying mechanism 27 based on the real throttle angle TAr, etc.

Figure 11:
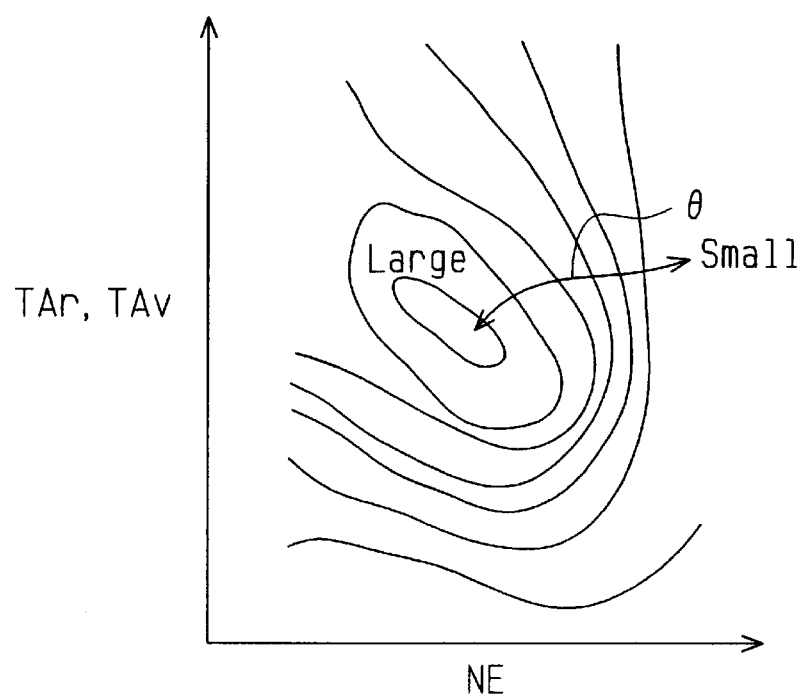
FIG. 11 is a map that is referred to at the time of computing a target amount of an advancing angle.

The valve timing of the intake valve 19 is adjusted by using the target advancing angle θ to be computed from the map in FIG. 11. In homogeneous charge combustion mode, the target advancing angle θ is acquired based on the real throttle angle TAr and the engine speed NE. The ECU 92 controls the OCV 27a to drive the valve timing varying mechanism 27 in such a way that the actual advancing angle of the intake valve 19 to be acquired based on the detection signal from the cam position sensor 21b approaches the target advancing angle θ computed from the map. The valve timing adjusted this way affects the amount of intake air too.

In the step S203, the ECU 92 computes the target advancing angle θ by referring to the map in FIG. 11 based on the real throttle angle TAr and the engine speed NE. In the process of step S204, the ECU 92 computes a normal intake pressure PM1 when the valve timing of the intake valve 19 is set to the most advancing angle with the current real throttle angle TAr and the engine speed NE, from the map for the most advancing angle shown in FIG. 12 based on those throttle angle TAr and engine speed NE. In the process of step S205, the ECU 92 computes a normal intake pressure PM2 when the valve timing of the intake valve 19 is set to the most delayed angle with the current real throttle angle TAr and the engine speed NE, from the map for the most delayed angle shown in FIG. 13 based on those throttle angle TAr and engine speed NE. The two maps are set beforehand through experiments or the like under the standard atmospheric pressure.

Subsequently, in the process of step S206, the ECU 92 computes the basic intake pressure PMTAbse corresponding to the target advancing angle θ based on the following equation (4).

$$PMTAbse = (PM1 - PM2) \times \theta/60 + PM2 \tag{4}$$

In the equation (4), 60 represents the most advancing angle of the valve timing of the intake valve 19 and is determined by the valve timing varying mechanism 27. By computing the basic intake pressure PMTAbse based on the equation (4), the accurate basic intake pressure PMTAbse corresponding to the target advancing angle θ is computed. After the basic intake pressure PMTAbse is computed, the flow goes to step S207. The process of step S207 is for correcting the basic intake pressure PMTAbse and computing a post-correction intake pressure PMTA.

Figure 16:
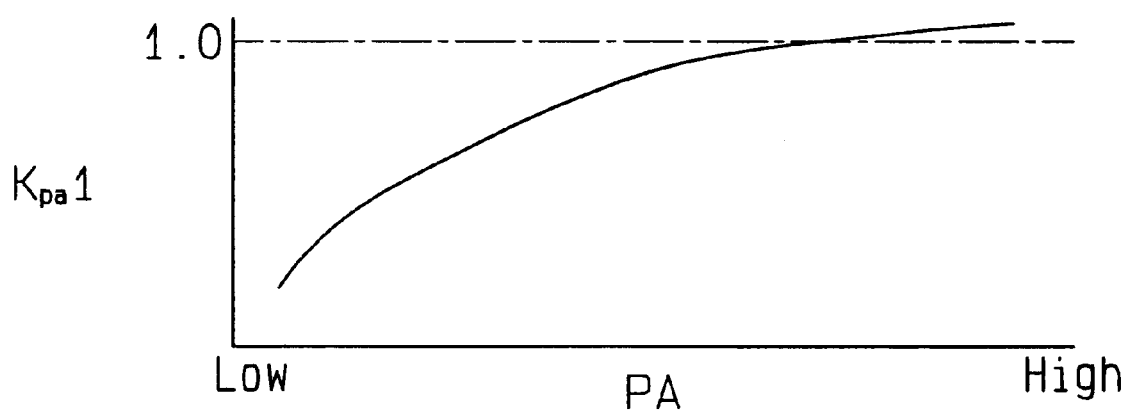
FIG. 16 is a map that is referred to at the time of computing an atmospheric-pressure correcting coefficient.

In the process of step S207, the ECU 92 computes an atmospheric-pressure correcting coefficient Kpal by referring to the map in FIG. 16 based on the atmospheric pressure PA, and computes the post-correction intake pressure PMTA by multiplying the basic intake pressure PMTAbse by the atmospheric-pressure correcting coefficient Kpal. The higher the atmospheric pressure PA becomes, the greater and closer to 1.0 the atmospheric-pressure correcting coefficient Kpal becomes. The higher the atmospheric pressure becomes, therefore, the greater the post-correction intake pressure PMTA becomes. After the computation of the post-correction intake pressure PMTA, the flow proceeds to step S208.

The process of step S208 is associated with the processes of steps S209 and S210. That is, in the process of step S209, a gradual change value PMSM is computed by subjecting the post-correction intake pressure PMTA to a gradual change process, and in the process of step S210, the gradual change value PMSM is stored as an intake-pressure stored value PMSM1. In the process of step S208, the ECU 92 sets the first intake-pressure stored value PMSM1 stored in the previous process of step S210 as a previous gradual change value PMSMi−1.

The reason for temporarily storing the gradual change value PMSM computed in the gradual change process of step S209 as the first intake-pressure stored value PMSM1 in step S210 is that another process is executed using the gradual change value PMSM in the process of step S213 in FIG. 9 to be discussed later and the gradual change value PMSM is changed by that process. Even in this case, the gradual change process in step S209 can be performed adequately by setting the first intake-pressure stored value PMSM1 to the previous gradual change value PMSMi−1 in the process of step S208.

After executing the process of step S208, the ECU 92 computes a current gradual change value PMSMi based on the following equation (5) in the process of step S209. Specifically, the previous gradual change value PMSMi−1 is subtracted from the post-correction intake pressure PMTA in normal mode, division by a predetermined value n is then performed and the result of the division is added to the previous gradual change value PMSMi−1 to compute the current gradual change value PMSMi.

$$PMSMi = PMSMi-1 + (PMTA - PMSMi-1)/n \quad (5)$$

Figure 14:
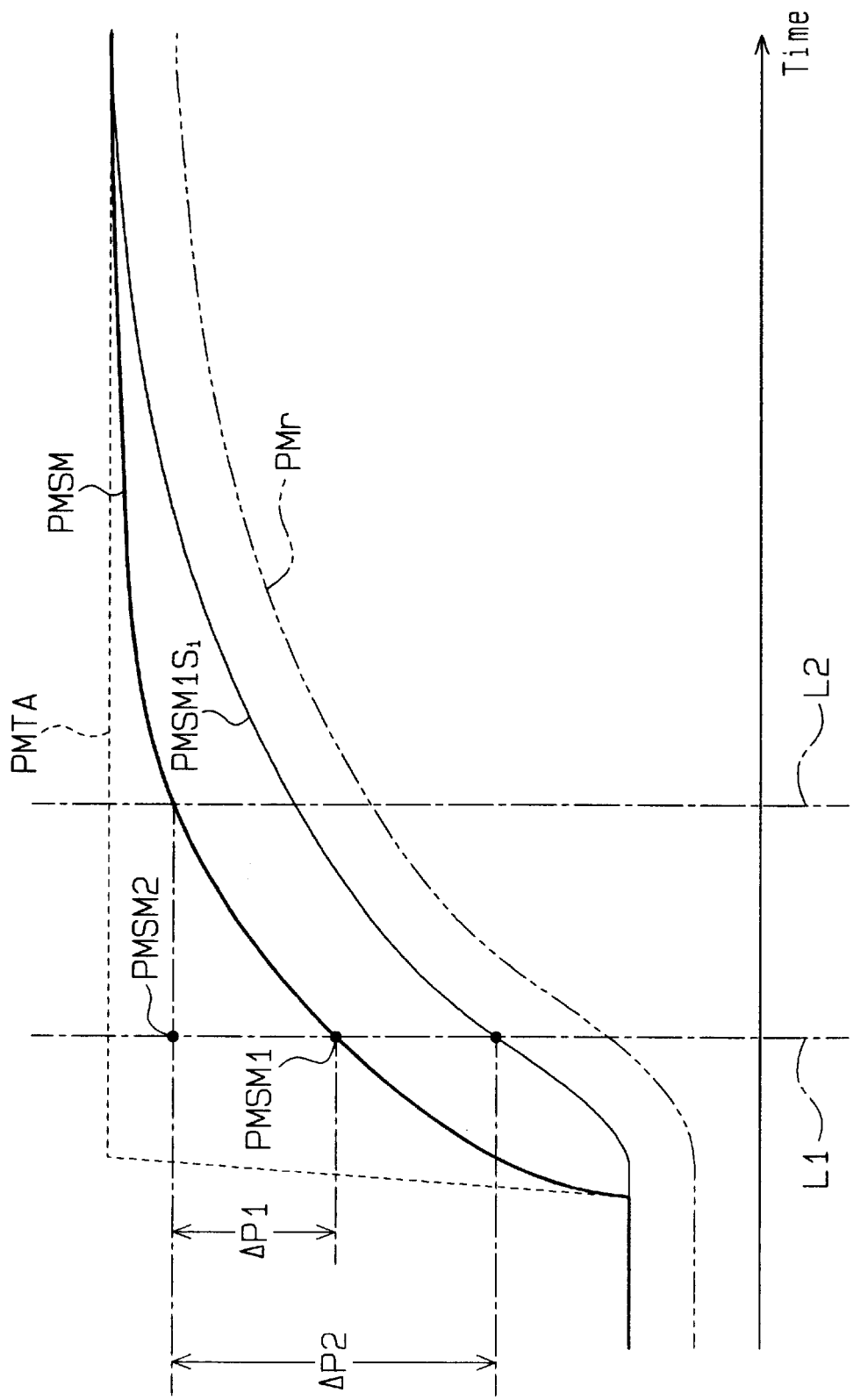
FIG. 14 is a time chart showing the transitions of an intake pressure PMTA after correction, a gradual change value PMSM, a filter output PMSM1Si and a real intake pressure PMr.

FIG. 14 shows the transitional tendency of the gradual change value PMSM with respect to a change in the post-correction intake pressure PMTA. In the diagram, the transition of the post-correction intake pressure PMTA is indicated by the broken line and the transition of the gradual change value PMSM by the thick solid line. The two-dashed chain line shows how the real intake pressure PMr changes whereas the post-correction intake pressure PMTA which is computed from a map or the like changes as indicated by the broken line.

As apparent from the diagram, when the post-correction intake pressure PMTA changes as indicated by the broken line in accordance with a change in, for example, the acceleration depression amount ACCP, the gradual change value PMSM gently changes as indicated by the thick solid line with respect to a change in the post-correction intake pressure PMTA. How gently the gradual change value PMSM changes with respect to a change in the post-correction intake pressure PMTA is determined by the predetermined value n in the equation (5). The predetermined value n is computed based on the post-correction intake pressure PMTA and the engine speed NE by referring to an unillustrated map which is preset through experiments or the like.

When the gradual change value PMSM is computed in the process of step S209 and the first intake-pressure stored value PMSM1 is stored in the process of step S210, the flow proceeds to step S211 in FIG. 9. The processes of steps S211 to S213 are for predicting and computing the gradual change value PMSM at the time of closing the intake valve 19 at present.

In the process of step S211, the ECU 92 computes the number of times, T/Δt, the gradual change process in the step S209 is performed (the number of gradual change processes) since the present time until the intake valve 19 is closed. That is, the number of gradual change processes T/Δt is computed by acquiring a time T from the present time to the time at which the intake valve 19 is closed and dividing the time T by an execution period Δt (8 ms in this embodiment) of the control-value computing routine.

Next, in the process of step S212, the ECU 92 sets the first intake-pressure stored value PMSM1 currently stored or the latest gradual change value PMSM as the previous gradual change value PMSMi−1. Further, in the process of step S213, the ECU 92 performs the gradual change process according to the equation (5) by the number of gradual change processes T/Δt to compute the gradual change value PMSMi after executing the gradual change process T/Δt times or the current gradual change value PMSMi when closing the intake valve 19. Thereafter, the ECU 92 stores the current gradual change value PMSMi as a second intake-pressure stored value PMSM2 in the process of step S214.

Assuming that the process of step S209 (FIG. 8) has been executed at the time indicated by a one-dashed chain line L1 in FIG. 14, the current gradual change value PMSMi to be computed in that process is stored as the first intake-pressure stored value PMSM1. When the process of step S213 is executed next, the gradual change value PMSMi at the time of closing the intake valve 19 indicated by a two-dashed chain line L2 is computed and the gradual change value PMSMi is stored as the second intake-pressure stored value PMSM2 at the time nearly indicated by the one-dashed chain line L1.

After the first and second intake-pressure stored values PMSM1 and PMSM2 are stored, the intake pressure at the time of closing the intake valve 19 can be predicted and computed by using a difference ΔP1 (PMSM2−PMSM1) between the stored values PMSMi and PMSM2. That is, the intake pressure at the time of closing the intake valve 19 is acquired by adding the difference ΔP1 between the first and second intake-pressure stored values PMSM1 and PMSM2 to the real intake pressure PMr that is detected by the vacuum sensor 36 at the present time (one-dashed chain line L1).

As the output of the vacuum sensor 36 is affected by the pulsation of the air flowing in the intake passage 32, the output of the vacuum sensor 36 is normally subjected to a filtering process by a CR filter or the like in order to cancel the influence. Therefore, the real intake pressure PMr actually deviates from the proper value by the time constant of the CR filter or the like in the filtering process and the predicted intake pressure at the time of closing the intake valve 19 becomes inaccurate accordingly.

The process following step S215 inclusive in the predicted-intake-pressure computing routine is to filter the first intake-pressure stored value PMSM1 in consideration of the deviation of the real intake pressure PMr and accurately predict the intake pressure at the time of closing the intake valve 19 by using the filter output PMSM1Si.

In the process of step S215, the ECU 92 performs a filtering process on the first intake-pressure stored value PMSM1 based on the following equation (6). In the equation (6), PMSM1Si is the filter output of the first intake-pressure stored value PMSM1 and a predetermined value m is set in such a way that the time constant of the filtering process becomes equal to the time constant of the CR filter in the filtering process.

$$PMSM1Si=PMSM1Si-1+(PMSM1-PMSM1Si-1)/m \qquad (6)$$

The filter output PMSM1Si obtained based on the equation (6) changes as indicated by the thin solid line in FIG. 14 when the gradual change value PMSM (first intake-pressure stored value PMSM1) changes as indicated by the thick solid line in FIG. 14.

Subsequently, in the process of step S216, the ECU 92 subtracts the filter output PMSM1Si from the second intake-pressure stored value PMSM2 to compute a difference ΔP2 between them. Further, the ECU 92 computes the difference ΔP2 added to the real intake pressure PMr as the predicted intake pressure PMFWD or the intake pressure at the time of closing the intake valve 19 in the process of step S217, then terminates the predicted-intake-pressure computing routine and returns to the control-value computing routine (FIG. 3).

When the process of storing the first and second intake-pressure stored value PMSM1 and PMSM2 is executed at the time indicated by the one-dashed chain line L1 in FIG. 14, therefore, the filter output PMSM1Si of the first intake-pressure stored value PMSM1 at that time is used in computing the predicted intake pressure PMFWD. That is, the predicted intake pressure PMFWD is computed by adding the difference ΔP2 between the second intake-pressure stored value PMSM2 and the filter output PMSM1Si at the time indicated by the one-dashed chain line L1 to the real intake pressure PMr.

As the difference ΔP2 is computed using the filter output PMSM1Si in place of the first intake-pressure stored value PMSM1 and the predicted intake pressure PMFWD is acquired from the difference ΔP2, etc., the predicted intake pressure PMFWD can be computed as the accurate intake pressure at the time of closing the intake valve 19 even if a deviation according to the time constant of the CR filter occurs in the intake pressure PMr.

Figure 15:
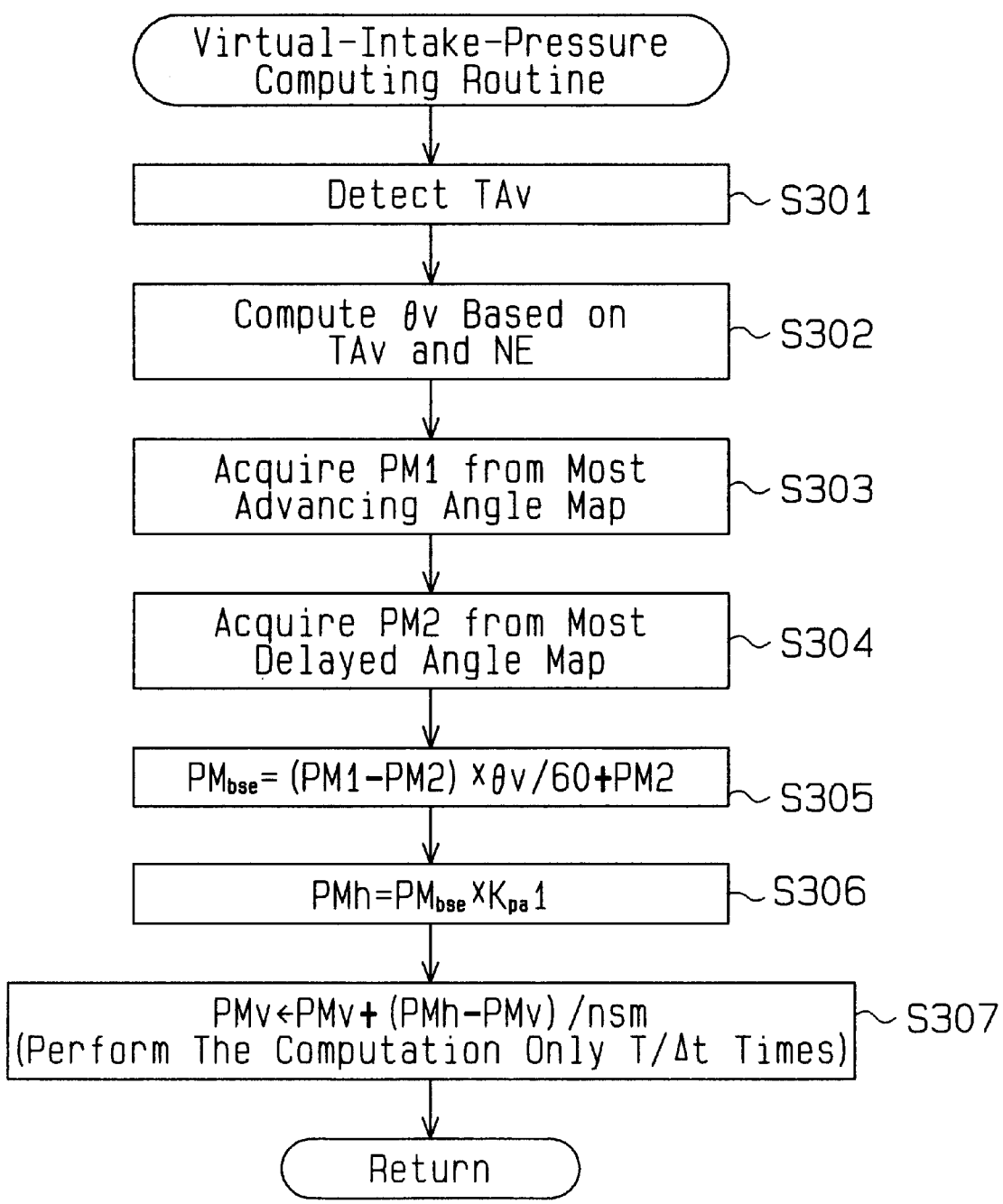
FIG. 15 is a flowchart illustrating procedures of computing a virtual intake pressure.

Next, the process of step S103 in the control-value computing routine will be described specifically by referring to FIG. 15. FIG. 15 is a flowchart illustrating a virtual-intake-pressure computing routine for computing the virtual intake pressure PMv that is used as a value representing the engine load in stratified charge combustion mode. This virtual-intake-pressure computing routine illustrates the details of the process of step S103 in FIG. 3.

In the process of step S301, the ECU 92 computes, as the virtual throttle angle TAv, the throttle angle at the time of executing homogeneous charge combustion with the acceleration depression amount ACCP in stratified charge combustion mode. That is, as shown in FIG. 10, because the transition of the target throttle angle TAt in homogeneous charge combustion mode with respect to a change in acceleration depression amount ACCP nearly equals to the transition of the compensation value TAh, it is first assumed that TAh=TAt. Under this assumption, the real throttle angle TAr is computed from the target throttle angle TAt through procedures opposite to the procedures of computing the compensation value TAh based on the equation (2), and the like, and the throttle angle TAr is treated as the virtual throttle angle TAv.

If the target throttle angle TAt in homogeneous charge combustion mode changes as indicated by the two-dashed chain line in the graph (d) in FIG. 7, the virtual throttle angle TAv computed this way changes with a predetermined response delay as indicated by the thin solid line with respect to that change. The transition of the virtual throttle angle TAv corresponds to the transition of the real throttle angle TAr in homogeneous charge combustion mode which has a response delay as indicated by the thin solid line in the graph (b) in FIG. 7 with respect to the change in target throttle angle TAt in homogeneous charge combustion mode.

After the virtual throttle angle TAv is computed in the above manner, the flow goes to step S302. The processes of steps S302 to S305 correspond to the processes of steps S203 to S206 in the predicted-intake-pressure computing routine and for computing a basic intake pressure PMbse that is used in computing the virtual intake pressure PMv. The basic intake pressure PMbse is computed in consideration of the valve timing of the intake valve 19 that is changed by the valve timing varying mechanism 27 based on the virtual throttle angle TAv, etc. This is done because when the valve timing of the intake valve 19 is adjusted, the adjustment also affects the amount of intake air to the engine 11.

In the step S302, the ECU 92 sets the target advancing angle θ, which is computed by referring to the map in FIG. 11 based on the virtual throttle angle TAv and the engine speed NE, to a virtual advancing angle θv. The virtual advancing angle θv computed using the virtual throttle angle TAv is a virtual value corresponding to the target advancing angle θ when homogeneous charge combustion is executed with the acceleration depression amount ACCP in stratified charge combustion.

Figure 12:
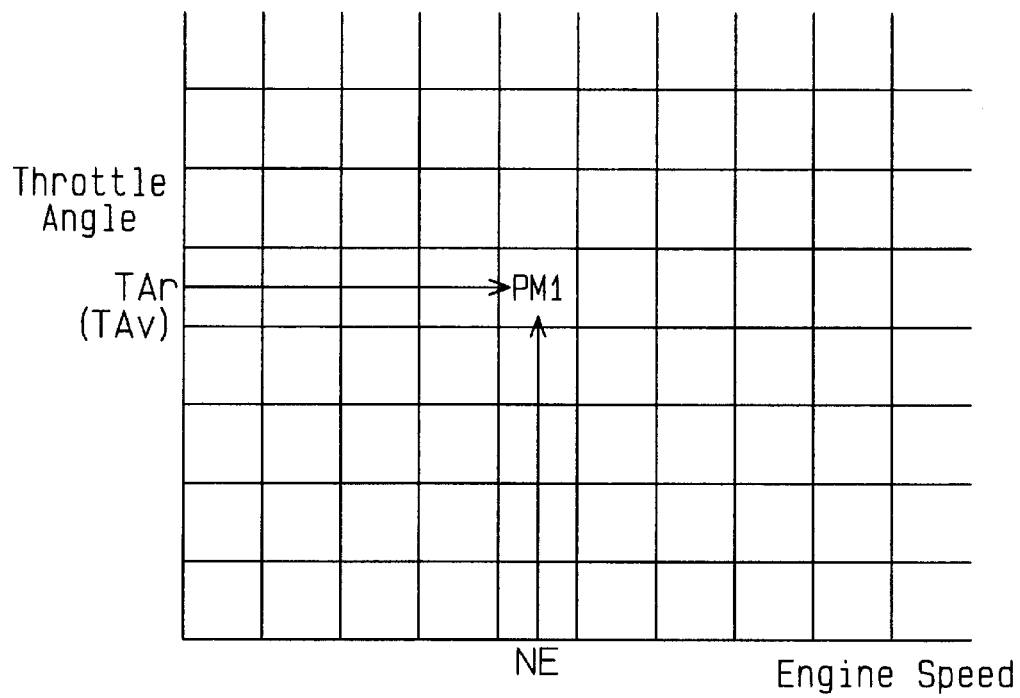
FIG. 12 is a map that is referred to at the time of computing an intake pressure in normal mode when the valve timing of an intake valve is the most advancing angle.
Figure 13:
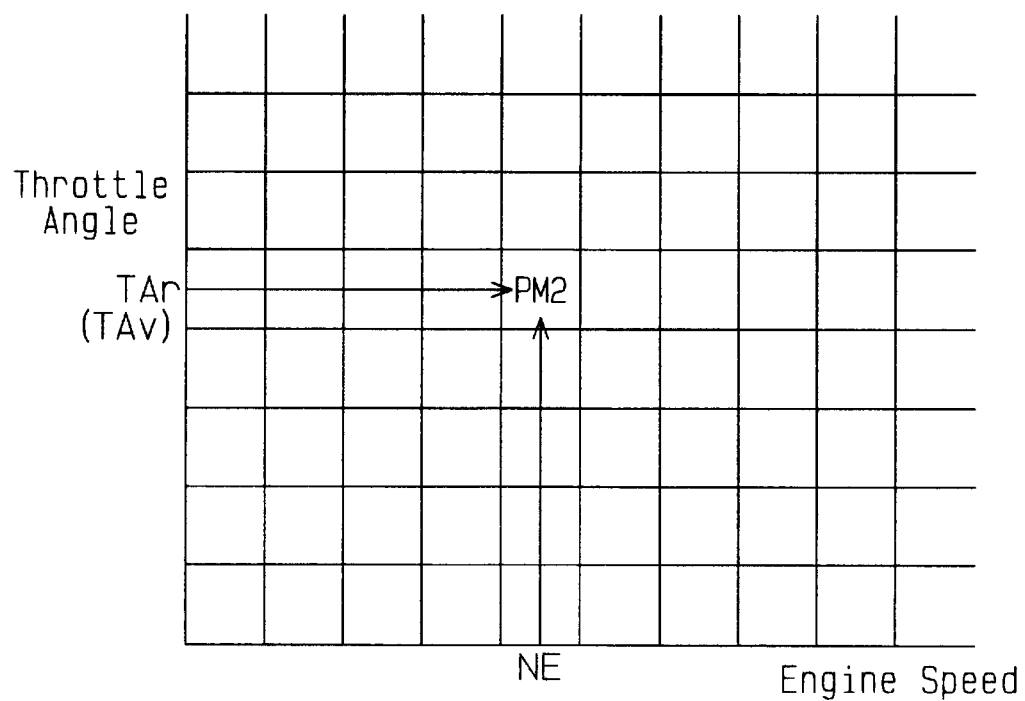
FIG. 13 is a map that is referred to at the time of computing an intake pressure in normal mode when the valve timing of the intake valve is the most delayed angle.

In the process of the next step S303, the ECU 92 computes the normal intake pressure PM1 when the valve timing of the intake valve 19 is set to the most advancing angle with the current virtual throttle angle TAv and the engine speed NE, from the map for the most advancing angle shown in FIG. 12 based on those virtual throttle angle TAv and engine speed NE. In the process of step S304, the ECU 92 computes the normal intake pressure PM2 when the valve timing of the intake valve 19 is set to the most delayed angle with the current virtual throttle angle TAv and the engine speed NE, from the map for the most delayed angle shown in FIG. 13 based on those virtual throttle angle TAv and engine speed NE. The maps in FIGS. 12 and 13 are the same as those used in steps S204 and S205 (FIG. 8) in the predicted-intake-pressure computing routine.

Subsequently, in the process of step S305, the ECU 92 computes the basic intake pressure PMbse corresponding to the virtual advancing angle θv based on the following equation (7).

$$PMbse=(PM1-PM2)\times\theta/60+PM2 \qquad (7)$$

In the equation (7), 60 represents the most advancing angle of the valve timing of the intake valve 19 as in the equation (6). By computing the basic intake pressure PMbse based on the equation (7), the accurate basic intake pressure PMbse corresponding to the virtual advancing angle θv is computed. After the basic intake pressure PMbse is computed, the flow goes to step S306. The process of step S306 corresponds to the process of step S207 (FIG. 8) in the predicted-intake-pressure computing routine and is for computing a post-correction intake pressure PMh by subjecting the basic intake pressure PMbse to atmospheric pressure correction.

In the process of step S306, the ECU 92 computes the post-correction intake pressure PMh by multiplying the basic intake pressure PMbse by the atmospheric-pressure correcting coefficient Kpal. The atmospheric-pressure correcting coefficient Kpal is the same as the one used in step S207 (FIG. 8) in the predicted-intake-pressure computing routine and is computed by referring to the map in FIG. 16 based on the atmospheric pressure PA. Therefore, the higher the atmospheric pressure PA becomes, the greater the post-correction intake pressure PMh becomes.

In the process of the next step S307, the ECU 92 computes the virtual intake pressure PMv based on the following equation (8). Specifically, the current virtual intake pressure PMv is computed by dividing the result of subtracting the previous virtual intake pressure PMv from the post-correction intake pressure PMh by a predetermined value nsm and adding the result of the division to the previous virtual intake pressure PMv. Further, such computation is repeatedly executed by T/Δt times so that the virtual intake pressure PMv to be computed is made to correspond to the one at the time of closing the intake valve 19 as in the case of the predicted intake pressure PMFWD.

$$PMv=PMv+(PMh-PMv)/nsm \qquad (8)$$

When the virtual throttle angle TAv changes as indicated by the thin solid line in the graph (d) in FIG. 7, for example, the virtual intake pressure PMv computed in the above-described manner changes with a predetermined response delay as indicated by the thick solid line with respect to that change. This response delay is determined by the predetermined value nsm in the equation (8). The predetermined value nsm is computed by referring to a map based on, for example, the post-correction intake pressure PMh and the engine speed NE, in such a manner that in response to a predetermined acceleration depressing operation, the virtual intake pressure PMv changes in association with the transition (response delay) of the predicted intake pressure PMFWD with respect to the real throttle angle TAr in homogeneous charge combustion mode as indicated by the thick solid line in the graph (b) in FIG. 7. The map that is used in the map computation is preset through experiments or the like.

In the engine 11 in which the valve timing varying mechanism 27 adjusts the valve timing of the intake valve 19, the valve timing changes the intake pressure. However, the target advancing angle θ at the time of executing homogeneous charge combustion with the acceleration depression amount ACCP in stratified charge combustion mode is computed as the virtual advancing angle θv and the basic intake pressure PMbse that is used in computing the virtual intake pressure PMv is computed in consideration of the virtual advancing angle θv. Even in the engine 11 in which the valve timing of the intake valve 19 is adjusted, therefore, the virtual intake pressure PMv can be accurately computed as a value corresponding to the predicted intake pressure PMFWD.

When the virtual intake pressure PMv is computed in the above manner, the virtual-intake-pressure computing routine is temporarily terminated to return to the control-value computing routine (FIG. 3) and the processes of steps S105 to S108 are executed. As mentioned earlier, through the processes of steps S105 to S108, the basic fuel injection amount Qbse is computed using the same parameter or the intake pressure (the predicted intake pressure PMFWD or the virtual intake pressure PMv) in either one of the stratified charge combustion mode and the homogeneous charge combustion mode. Based on the basic fuel injection amount Qbse, various control values, such as the target ignition timing, the target EGR amount and the final fuel injection amount Qfin, are computed and the engine 11 is controlled based on those control values.

The embodiment discussed in detail has the following advantages.

In stratified charge combustion mode, the throttle angle at the time of executing homogeneous charge combustion with the acceleration depression amount ACCP at that time is computed as the virtual throttle angle TAv and the intake pressure at the time of executing stratified charge combustion with the acceleration depression amount ACCP is computed as the virtual intake pressure PMv based on the virtual throttle angle TAv. In stratified charge combustion mode, various operational controls of the engine 11 are carried out by using the virtual intake pressure PMv as a value representing the engine load.

As a result, in either one of the stratified charge combustion mode and the homogeneous charge combustion mode, the intake pressure or the common parameter representing the amount of intake air to the engine is used as a value representing the engine load in executing various operational controls of the engine 11, such as fuel injection amount control, ignition timing control and EGR control. Therefore, various operational controls of the engine 11 according to the engine load in homogeneous charge combustion are associated with those in stratified charge combustion and the matching of the engine power torque characteristics between those combustion modes become easy.

In homogeneous charge combustion mode, a response delay occurs in the transition of the real throttle angle TAr with respect to a change in a predetermined acceleration depression amount ACCP and a response delay also occurs in the transition of the predicted intake pressure PMFWD with respect to a change in the real throttle angle TAr. In stratified charge combustion mode, by way of contrast, a response delay occurs in the transition of the virtual throttle angle TAv with respect to a change in a predetermined acceleration depression amount ACCP in association with the response delay of the real throttle angle TAr. Further, a response delay also occurs in the transition of the virtual intake pressure PMv with respect to a change in the virtual throttle angle TAv in association with the response delay of the predicted intake pressure PMFWD. Therefore, the virtual throttle angle TAv and the virtual intake pressure PMv ate computed in consideration of the response delays of the real throttle angle TAr and the predicted intake pressure PMFWD, and the precision of various operational controls of the engine 11 based on those virtual values is improved.

A change in final fuel injection amount Qfin significantly influences the engine output torque characteristic including the response characteristic at the transient time of the engine torque of the engine 11. The final fuel injection amount Qfin is also computed using the intake pressure as a value representing the engine load, regardless of the combustion mode. Therefore, the engine output torque characteristic in the transient state of the engine 11 does not change between homogeneous charge combustion and stratified charge combustion. This makes it possible to match the engine output torque characteristics between those combustion modes. Because the final fuel injection amount Qfin according to the engine load is computed based on the intake pressure regardless of the combustion mode, the experiment for optimizing the final fuel injection amount Qfin to be computed becomes simpler. That is, because the final fuel injection amount Qfin has only to be optimized with respect to one parameter or the intake pressure, the experiment need not be performed for each parameter as in the case where the parameter used as the engine load differs combustion mode by combustion mode and the experiment becomes simpler accordingly.

At the time of computing the final fuel injection amount Qfin, the mode correcting coefficient Kmode for compensating for the difference in combustion efficiency between both combustion modes is used. At the time of executing fuel injection amount control based on the final fuel injection amount Qfin in stratified charge combustion mode, therefore, the precision of the engine power torque control based on the fuel injection amount control can be improved.

The pumping loss of the engine 11 differs between stratified charge combustion and homogeneous charge combustion and the difference in pumping loss between those combustion modes is changed by the atmospheric pressure. At the time of computing the final fuel injection amount Qfin, however, the mode correcting coefficient Kmode that is determined by the combustion mode is used and is corrected by the atmospheric-pressure correcting coefficient Kpa2 that changes in accordance with the atmospheric pressure PA. Even if the difference in pumping loss changes in accordance with the atmospheric pressure PA, therefore, the engine power torque control is always executed accurately.

The intake pressure of the engine 11 is also changed by the valve timing of the intake valve 19. In stratified charge combustion mode, however, the target advancing angle $\theta$ of the valve timing when homogeneous charge combustion is executed with the acceleration depression amount ACCP at that time is computed as the virtual advancing angle $\theta v$ and the basic intake pressure PMbse for computing the virtual intake pressure PMv is acquired in consideration of the virtual advancing angle $\theta v$. Even in the engine 11 in which the valve timing of the intake valve 19 changes, therefore, the virtual intake pressure PMv can be accurately computed in stratified charge combustion mode and various operational controls are carried out by using the virtual intake pressure PMv as a value representing the engine load.

(Second Embodiment)

The second embodiment of the present invention will now be described referring to FIGS. 17 to 24. This embodiment aims at preventing a step from appearing in the engine power torque according to a difference which is produced between the virtual intake pressure PMv and the predicted intake pressure PMFWD at the time of changing the combustion mode due to a productional variation, a time-dependent change or the like in the throttle valve 23. The present embodiment prevents the step in the power torque by correcting the control values for operational control of the engine 11, such as the fuel injection amount, the ignition timing and the throttle angle, and differs from the first embodiment only in the fuel injection amount control, the ignition timing control and the throttle angle control. Therefore, only the portions of the embodiment that differ from those of the first embodiment will be discussed and the detailed description of the portions that are the same as those of the first embodiment will be omitted.

In the description of this embodiment, the procedures of switching the combustion mode of the engine 11 will be discussed more specifically than done for the first embodiment. At the time of changing the combustion mode of the engine 11, the fuel injection control, the ignition timing control, the throttle angle control, the EGR control and so forth are switched between the controls for the stratified charge combustion and the controls for the homogeneous charge combustion. The switching of the fuel injection control and the ignition timing control according to the combustion mode is executed based on an injection/ignition command mode FMODEI, and the switching of the throttle angle control and the EGR control according to the combustion mode is executed based on a valve command mode FMODEB. For example, the injection/ignition command mode FMODEI and the valve command mode FMODEB express the stratified charge combustion by "0" and express the homogeneous charge combustion by "1".

When the injection/ignition command mode FMODEI becomes 0, therefore, the fuel injection control and ignition timing control are changed to those for the stratified charge combustion, and when the same mode FMODEI becomes 1, fuel injection control and ignition timing control are changed to those for the homogeneous charge combustion. When the valve command mode FMODEB becomes 0, the throttle angle control and EGR control are changed to those for the stratified charge combustion, and when the same mode FMODEB becomes 1, the throttle angle control and EGR control are changed to those for the homogeneous charge combustion.

At the time the combustion mode of the engine 11 is changed between stratified charge combustion and homogeneous charge combustion, the ECU 92 first instructs the switching of the valve command mode FMODEB between 0 and 1. As the valve command mode FMODEB is switched between 0 and 1, the ECU 92 controls the throttle valve 23 and the EGR valve 43 to the degrees of opening that match with the switched combustion mode. Such control allows the throttle angle TA and the EGR amount to become values suitable for the switched combustion mode.

After a predetermined time passes since the issuance of the instruction of switching the valve command mode FMODEB, the ECU 92 instructs the switching of the injection/ignition command mode FMODEI between 0 and 1. As the injection/ignition command mode FMODEI is switched between 0 and 1, the ECU 92 controls the fuel injection valve 40 and the igniter 41a according to the switched combustion mode. Such control allows the fuel injection amount, the fuel injection timing and the ignition timing to become values suitable for the switched combustion mode.

As mentioned above, the instruction of switching the injection/ignition command mode FMODEI is given after a predetermined time passes since the issuance of the instruction of switching the valve command mode FMODEB. At the time of changing the combustion mode, therefore, the switch instructing timing deviates between both the modes FMODEB and FMODEI. The deviation in the switch instructing timing between both the modes FMODEB and FMODEI is given because a change in the running state of the engine 11 based on the changes in the degrees of opening of the throttle valve 23 and the EGR valve 43 responds more slowly than a change in the running state of the engine 11 based on the changes in the fuel injection amount, the fuel injection timing and the ignition timing.

That is, at the time the valve command mode FMODEB changes, thus changing, for example, the throttle angle, a change in the amount of intake air with respect to the angle change has a response delay. At the time the injection/ignition command mode FMODEI changes, thus changing, for example, the fuel injection amount, by way of contrast, the fuel injection amount changes in good response to the change in injection/ignition command mode FMODEI.

By shifting the switch instructing timing of both modes FMODEB and FMODEI in the above-described manner, a change in the running state of the engine 11 based on the change in injection/ignition command mode FMODEI occurs at almost the same timing as a change in the running state of the engine 11 based on the change in valve command mode FMODEB, thus ensuring good switching of the combustion mode.

Figure 17:
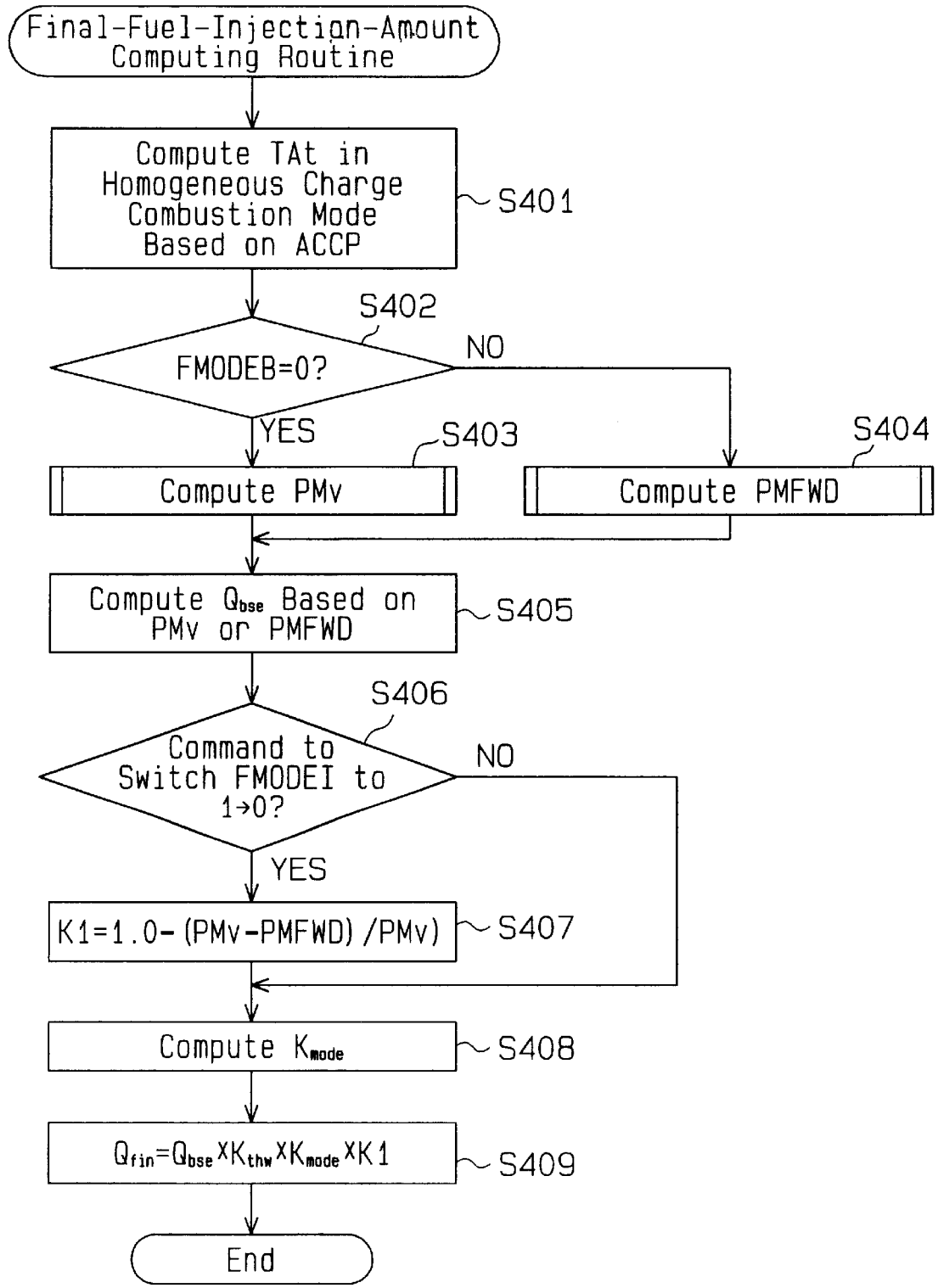
FIG. 17 is a flowchart illustrating procedures of computing a final fuel injection amount according to a second embodiment.

The procedures of computing the final fuel injection amount Qfin according to the present embodiment will be discussed referring to FIG. 17. FIG. 17 is a flowchart illustrating a final-fuel-injection-amount computing routine. This final-fuel-injection-amount computing routine is executed in an interruption of, for example, every predetermined time through the ECU 92.

The process of step S401 is equivalent to the process of step S101 in FIG. 3. In the process of step S401, the ECU 92 computes the target throttle angle TAt in homogeneous charge combustion mode by referring to a well-known map based on the acceleration depression amount ACCP.

In the process of the subsequent step S402, the ECU 92 determines whether or not the valve command mode FMODEB is 0 (stratified charge combustion). When FMODEB=0, the flow goes to step S403, and when FMODEB=0 is not met, the flow goes to step S404. The processes of steps S403 to S405 are equivalent to the processes of steps S103 to S105 in FIG. 3.

In the process of step S404, the ECU 92 computes the predicted intake pressure PMFWD or the intake pressure at the time of closing the intake valve 19 based on the real intake pressure PMr, the real throttle angle TAr, the engine speed NE, etc. In the process of step S403, the ECU 92 computes the virtual intake pressure PMv whose value corresponds to the predicted intake pressure PMFWD at the time of executing homogeneous charge combustion with the acceleration depression amount ACCP in stratified charge combustion mode. The virtual intake pressure PMv is acquired based on the target throttle angle TAt, etc. The virtual throttle angle TAv is equivalent to the real throttle angle at the time of executing homogeneous charge combustion with the acceleration depression amount ACCP in homogeneous charge combustion mode.

Subsequently, in the process of step S405, the ECU 92 computes the basic fuel injection amount Qbse by the equation (1) of the first embodiment using the virtual intake pressure PMv or the predicted intake pressure PMFWD as the intake pressure PM. Based on the basic fuel injection amount Qbse, the final fuel injection amount Qfin is computed in the process of step S409 to be discussed later. The ECU 92 controls the actuation of the fuel injection valve 40 in a separate process in such a way as to inject fuel whose quantity corresponds to the final fuel injection amount Qfin.

In the engine 11, the throttle valve 23 may have a productional variation or a time-dependent change or a foreign matter may be stuck in the intake passage 32, in which case the predicted intake pressure PMFWD and the virtual intake pressure PMv take different values, for example, at the time of switching the combustion mode. This is because the virtual intake pressure PMv is computed irrespective of the real intake pressure PMr or the like whereas the predicted intake pressure PMFWD is computed based on the real intake pressure PMr or the like that changes in accordance with the productional variation or the like of the throttle valve 23.

If the predicted intake pressure PMFWD and the virtual intake pressure PMv take different values before or after the switching of the combustion mode, for example, a step occurs in the basic fuel injection amount Qbse before or after the switching of the combustion mode. When a step occurs in the power torque of the engine 11 due to the step in the basic fuel injection amount Qbse, the step in the torque drops the drivability.

According to the present embodiment, the control values for the engine 11, such as the fuel injection amount, the ignition timing and the throttle angle, are corrected in such a way as to cancel the step in the engine torque at the time of switching the combustion mode. Such correction can prevent a step from occurring in the engine torque at the time of switching the combustion mode or the like, thus preventing the step-originated falling of the drivability.

When the homogeneous charge combustion is switched to stratified charge combustion, the fuel injection amount correction is executed based on the predicted intake pressure PMFWD and the virtual intake pressure PMv in order to prevent a step from occurring in the engine torque. When the stratified charge combustion is switched to homogeneous charge combustion, on the other hand, either the ignition timing delayed angle correction or the correction of the opening of the throttle angle is selectively executed as correction to prevent a step from occurring in the engine torque, depending on whether the predicted intake pressure PMFWD is greater or smaller than the virtual intake pressure PMv. That is, when the predicted intake pressure PMFWD is greater than the virtual intake pressure PMv, the ignition timing delayed angle correction is performed based on the intake pressures PMFWD and PMv, and when the predicted intake pressure PMFWD is smaller than the virtual intake pressure PMv, the correction of the opening of the throttle angle is performed based on the intake pressures PMFWD and PMv.

Now, the description of the final-fuel-injection-amount computing routine will be given again. After the basic fuel injection amount Qbse is computed in the process of step S405, the flow proceeds to step S406. The processes of steps S406 and S407 serve to prevent the occurrence of a step in the engine torque caused by a difference between the predicted intake pressure PMFWD and the virtual intake pressure PMv, when the difference occurs at the time of switching the combustion mode from homogeneous charge combustion to stratified charge combustion.

In the process of step S406, the ECU 92 determines whether or not switching of the injection/ignition command mode FMODEI from 1 (homogeneous charge combustion) to 0 (stratified charge combustion) has been instructed. When the decision is NO in the process of step S406, the flow goes to step S408. The process of step S408 is equivalent to the process of step S107 in FIG. 3 and computes the mode correcting coefficient Kmode.

When the decision is YES in the process of step S406, on the other hand, the flow goes to step S407. From the following equation (9), the ECU 92 computes an injection-amount correcting coefficient K1 which is used to prevent the occurrence of a step in the engine torque.

$$K1 = 1.0 - (PMv - PMFWD)/PMv \qquad (9)$$

In the equation (9), the predicted intake pressure PMFWD is the predicted intake pressure PMFWD immediately before the valve command mode FMODEB is switched from 1

(homogeneous charge combustion) to 0 (stratified charge combustion) and the virtual intake pressure PMv is the latest value computed in the process of the step S403. As apparent from the equation (9), the injection-amount correcting coefficient K1 becomes smaller with respect to 1.0 or the reference value as the virtual intake pressure PMv becomes greater than the predicted intake pressure PMFWD, and becomes greater with respect to 1.0 as the virtual intake pressure PMv becomes smaller than the predicted intake pressure PMFWD.

As the following process of step S408, the ECU 92 computes the mode correcting coefficient Kmode. Further, in the process of step S409, the ECU 92 computes the final fuel injection amount Qfin by multiplying the basic fuel injection amount Qbse by the coolant-temperature correcting coefficient Kthw, the mode correcting coefficient Kmode and the injection-amount correcting coefficient K1, and then temporarily terminates the final-fuel-injection-amount computing routine.

The fuel injection control based on the final fuel injection amount Qfin undergoes correction with the injection-amount correcting coefficient K1 that is computed based on the predicted intake pressure PMFWD and the virtual intake pressure PMv. When the homogeneous charge combustion is switched to stratified charge combustion, therefore, even if the predicted intake pressure PMFWD becomes different from the virtual intake pressure PMv, the difference-originated occurrence of a step in the engine torque is prevented by the fuel injection amount correction based on the injection-amount correcting coefficient K1.

Figure 18:
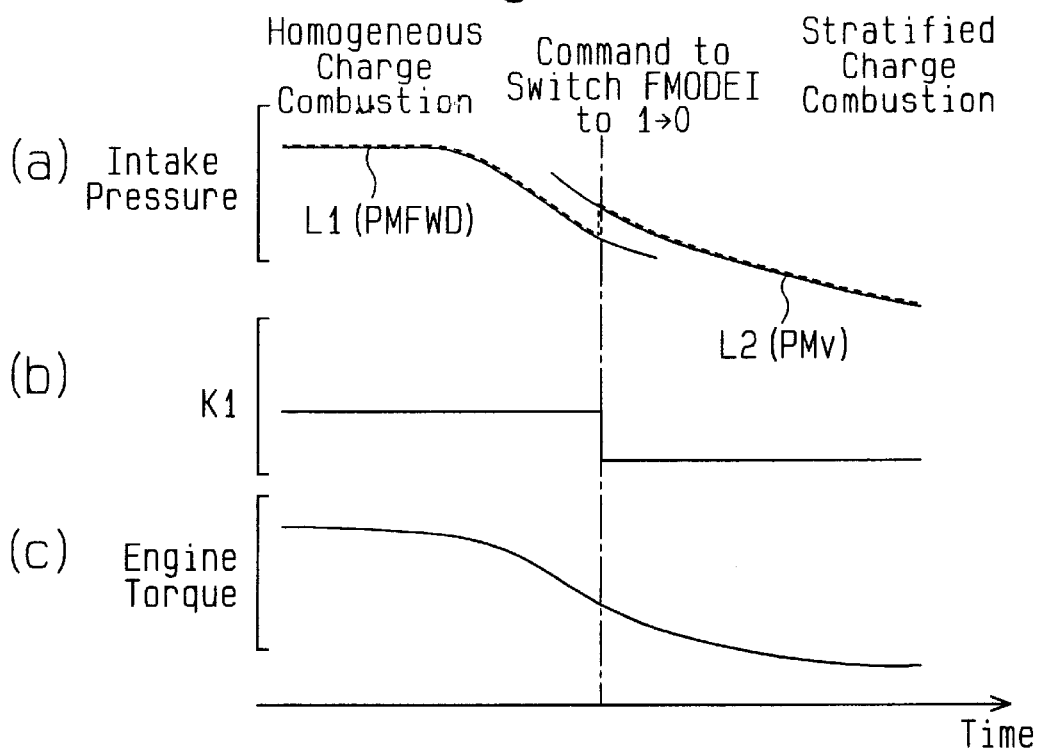
FIG. 18 is a time chart showing the transitions of a predicted intake pressure, a virtual intake pressure, a fuel-injection-amount correcting coefficient and an engine torque when homogeneous charge combustion is switched to stratified charge combustion.
Figure 19:
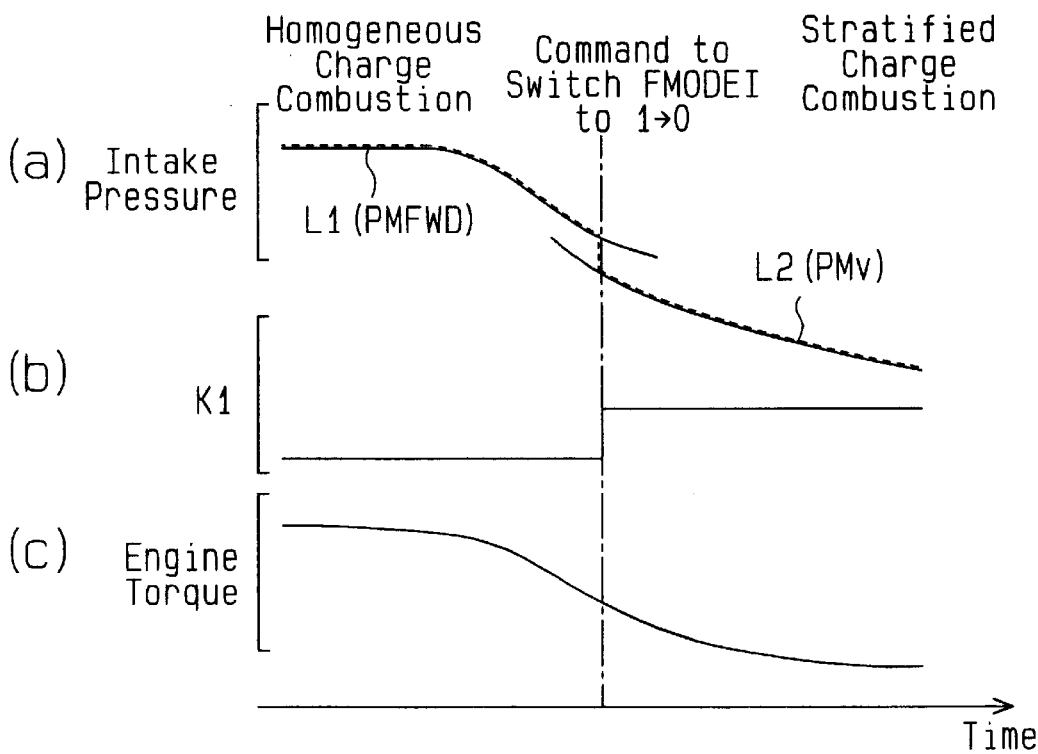
FIG. 19 is a time chart showing the transitions of a predicted intake pressure, a virtual intake pressure, a fuel-injection-amount correcting coefficient and an engine torque when homogeneous charge combustion is switched to stratified charge combustion.

The time charts in FIGS. 18 and 19 show changes in the predicted intake pressure PMFWD, the virtual intake pressure PMv, the injection-amount correcting coefficient K1 and the engine torque when homogeneous charge combustion is switched to stratified charge combustion.

In the graph (a) in FIG. 18 and the graph (a) in FIG. 19, a solid line L1 indicates the transition of the predicted intake pressure PMFWD and a solid line L2 indicates the transition of the virtual intake pressure PMv.

When switching of, for example, the injection/ignition command mode FMODEI from 1 (homogeneous charge combustion) to 0 (stratified charge combustion) has been instructed, as shown in the graph (a) in FIG. 18, the virtual intake pressure PMv may become larger than the predicted intake pressure PMFWD. In this case, the value of the intake pressure that is used in computing the basic fuel injection amount Qbse changes as indicated by the broken line in the graph (a) in FIG. 18. When switching of the injection/ignition command mode FMODEI from 1 to 0 has been instructed, therefore, the value of the intake pressure increases suddenly. In accordance with the increase in the value of the intake pressure, the basic fuel injection amount Qbse increases sharply.

When switching of the injection/ignition command mode FMODEI from 1 to 0 has been instructed, as shown in the graph (b) in FIG. 18, the injection-amount correcting coefficient K1 changes to a smaller value. The fuel injection amount correction based on the injection-amount correcting coefficient K1 can prevent a step from occurring in the engine torque on the increasing side when switching of the injection/ignition command mode FMODEI from 1 to 0 has been instructed. As a result, the engine torque changes smoothly as shown in the graph (c) in FIG. 18 when homogeneous charge combustion is switched to the stratified charge combustion.

When switching of the injection/ignition command mode FMODEI from 1 to 0 has been instructed, as shown in the graph (a) in FIG. 19, the virtual intake pressure PMv may become smaller than the predicted intake pressure PMFWD. In this case, the value of the intake pressure that is used in computing the basic fuel injection amount Qbse changes as indicated by the broken line in the graph (a) in FIG. 19. When switching of the injection/ignition command mode FMODEI from 1 to 0 has been instructed, therefore, the value of the intake pressure decreases suddenly. In accordance with the decrease in the value of the intake pressure, the basic fuel injection amount Qbse decreases sharply.

When switching of the injection/ignition command mode FMODEI from 1 to 0 has been instructed, as shown in the graph (b) in FIG. 19, the injection-amount correcting coefficient K1 changes to a larger value. The fuel injection amount correction based on the injection-amount correcting coefficient K1 can prevent a step from occurring in the engine torque on the decreasing side when switching of the injection/ignition command mode FMODEI from 1 to 0 has been instructed. As a result, the engine torque changes smoothly as shown in the graph (c) in FIG. 19 when homogeneous charge combustion is switched to the stratified charge combustion.

If an attempt is made to adjust the engine torque by the correction of the ignition timing in stratified charge combustion mode, the alteration of the ignition timing may cause ignition to take place when the air-fuel mixture with a rich fuel concentration is not present around the ignition plug. This makes the combustion state unstable, which may cause misfire. In this respect, the fuel injection amount is corrected to prevent the occurrence of a step in the engine torque when homogeneous charge combustion is switched to stratified charge combustion.

Referring now to FIGS. 20 to 24, a description will be given of ignition timing control and throttle angle control for preventing a step from occurring in the engine torque when stratified charge combustion is switched to homogeneous charge combustion. When the predicted intake pressure PMFWD is greater than the virtual intake pressure PMv at the time of switching the combustion mode, the occurrence of a step in the engine torque is prevented by the ignition timing control. When the predicted intake pressure PMFWD is smaller than the virtual intake pressure PMv, the occurrence of a step in the engine torque is prevented by the throttle angle control.

Figure 20:
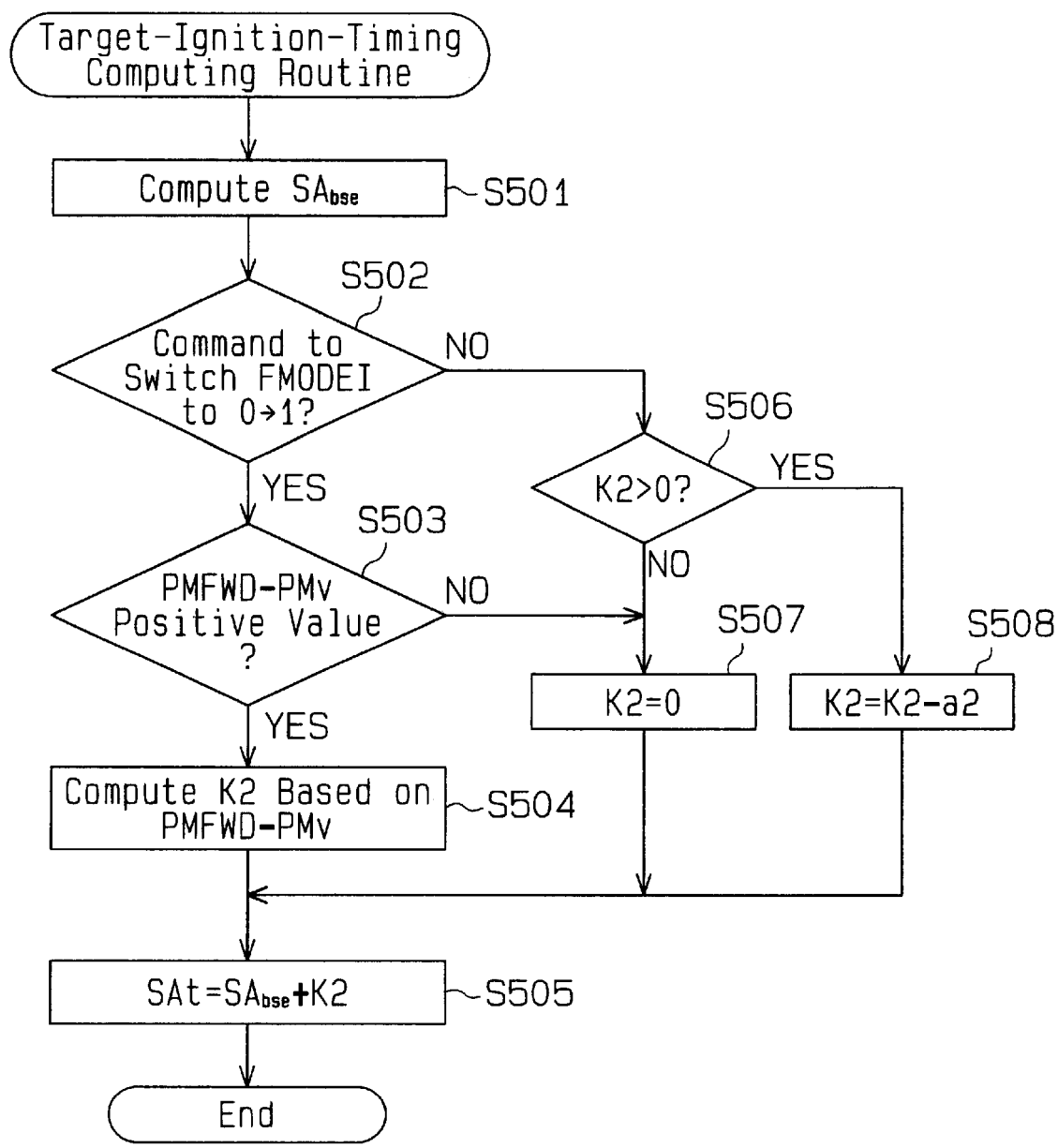
FIG. 20 is a flowchart illustrating procedures of computing a target ignition timing according to the second embodiment.

FIG. 20 is a flowchart illustrating a routine of computing the target ignition timing that is used in the ignition timing control. This routine is executed in an interruption of every predetermined time through the ECU 92.

In the process of step S501, the ECU 92 computes a basic ignition timing SAbse. The basic ignition timing SAbse is computed based on the predicted intake pressure PMFWD and the engine speed NE in homogeneous charge combustion mode, and is computed based on the basic fuel injection amount Qbse and the engine speed NE in stratified charge combustion mode. The basic ignition timing SAbse is used in computing a target ignition timing SAt in the process of step S505 to be discussed later. When the target ignition timing SAt is computed, the ECU 92 controls in a separate process in such a way that the real ignition timing becomes the target ignition timing SAt.

After the process of the step S501 is performed, the flow proceeds to step S502. The processes of steps S502 to S505 serve to prevent the occurrence of a step in the engine torque on the increasing side caused by a shift in the predicted intake pressure PMFWD in the direction of becoming greater than the virtual intake pressure PMv when the shift occurs at the time stratified charge combustion is switched to homogeneous charge combustion.

In the process of step S502, the ECU 92 determines whether or not switching of the injection/ignition command mode FMODEI from 0 (stratified charge combustion) to 1 (homogeneous charge combustion) has been instructed. When the decision is YES, the flow goes to step S503. In the process of step S503, the ECU 92 determines whether the virtual intake pressure PMv subtracted from the predicted intake pressure PMFWD (PMFWD−PMv) is positive or not. When PMFWD−PMv is positive, i.e., when the predicted intake pressure PMFWD is shifted in the direction of becoming greater than the virtual intake pressure PMv, the flow proceeds to step S504.

In the process of step S504, the ECU 92 computes an ignition-timing correcting amount K2 based on PMFWD−PMv. The greater PMFWD−PMv becomes, the larger the ignition-timing correcting amount K2 becomes. In the process of the next step S505, the ECU 92 computes the target ignition timing SAt by adding the ignition-timing correcting amount K2 to the basic ignition timing SAbse, then temporarily terminates the target-ignition-timing computing routine.

The ignition timing control based on the target ignition timing SAt undergoes correction toward the angle delaying side with the ignition-timing correcting amount K2. If the predicted intake pressure PMFWD shifts in the direction of becoming greater than the virtual intake pressure PMv at the time stratified charge combustion is switched to homogeneous charge combustion, therefore, the shift-originated occurrence of a step in the engine torque on the increasing side is prevented by the ignition-timing-delay-angle correction.

When it is determined in the process of the step S503 that PMFWD−PMv is not positive, the ignition-timing correcting amount K2 is set to 0 in the process of step S507, and then the flow proceeds to step S505. When the predicted intake pressure PMFWD is equal to or smaller than the virtual intake pressure PMv, therefore, the ignition-timing-delay-angle correction is not executed.

When the decision in the process of step S502 is NO, the flow proceeds to step S506. The processes of steps S506 and S508 cause the ignition-timing correcting amount K2 to gradually approach 0.

In the process of step S506, the ECU 92 determines whether or not the ignition-timing correcting amount K2 is greater than 0. When K2>0, a value obtained by subtracting a predetermined value a2 from the ignition-timing correcting amount K2 is set as a new ignition-timing correcting amount K2 in the process of step S508, and then the flow goes to step S505. When K>0 is not met, the ignition-timing correcting amount K2 is set to 0 in the process of step S507, then the flow proceeds to step S505.

After the ignition-timing correcting amount K2 is set to a value greater than 0 in the process of step S504 in order to prevent the occurrence of a step in the engine torque when stratified charge combustion is switched to homogeneous charge combustion, the ignition-timing correcting amount K2 is made to gradually approach 0.

The time chart in FIG. 21 shows changes in the predicted intake pressure PMFWD, the virtual intake pressure PMv, the ignition-timing correcting amount K2 and the engine torque when stratified charge combustion is switched to homogeneous charge combustion.

In the graph (a) in FIG. 21, a solid line L1 indicates the transition of the predicted intake pressure PMFWD and a solid line L2 indicates the transition of the virtual intake pressure PMv.

When switching of, for example, the injection/ignition command mode FMODEI from 0 (stratified charge combustion) to 1 (homogeneous charge combustion) has been instructed, as shown in the graph (a) in FIG. 21, the predicted intake pressure PMFWD may become larger than the virtual intake pressure PMv. In this case, the value of the intake pressure that is used in computing the basic fuel injection amount Qbse changes as indicated by the broken line in the graph (a) in FIG. 21. When switching of the injection/ignition command mode FMODEI from 0 to 1 has been instructed, therefore, the value of the intake pressure increases suddenly. In accordance with the increase in the value of the intake pressure, the basic fuel injection amount Qbse increases sharply.

When switching of the injection/ignition command mode FMODEI from 0 to 1 has been instructed, as shown in the graph (b) in FIG. 21, the ignition-timing correcting amount K2 changes to a larger value. The ignition-timing-delay-angle correction based on the ignition-timing correcting amount K2 can prevent a step from occurring in the engine torque on the increasing side. As a result, the engine torque changes smoothly as shown in the graph (c) in FIG. 21 when stratified charge combustion is switched to the homogeneous charge combustion.

After switching of the injection/ignition command mode FMODEI to 1 is instructed, the ignition-timing correcting amount K2 becomes gradually smaller until 0 as shown in the graph (b) in FIG. 21.

A description will now be given of the throttle angle control for preventing the occurrence of a step in the engine torque when stratified charge combustion is switched to homogeneous charge combustion.

Figure 23:
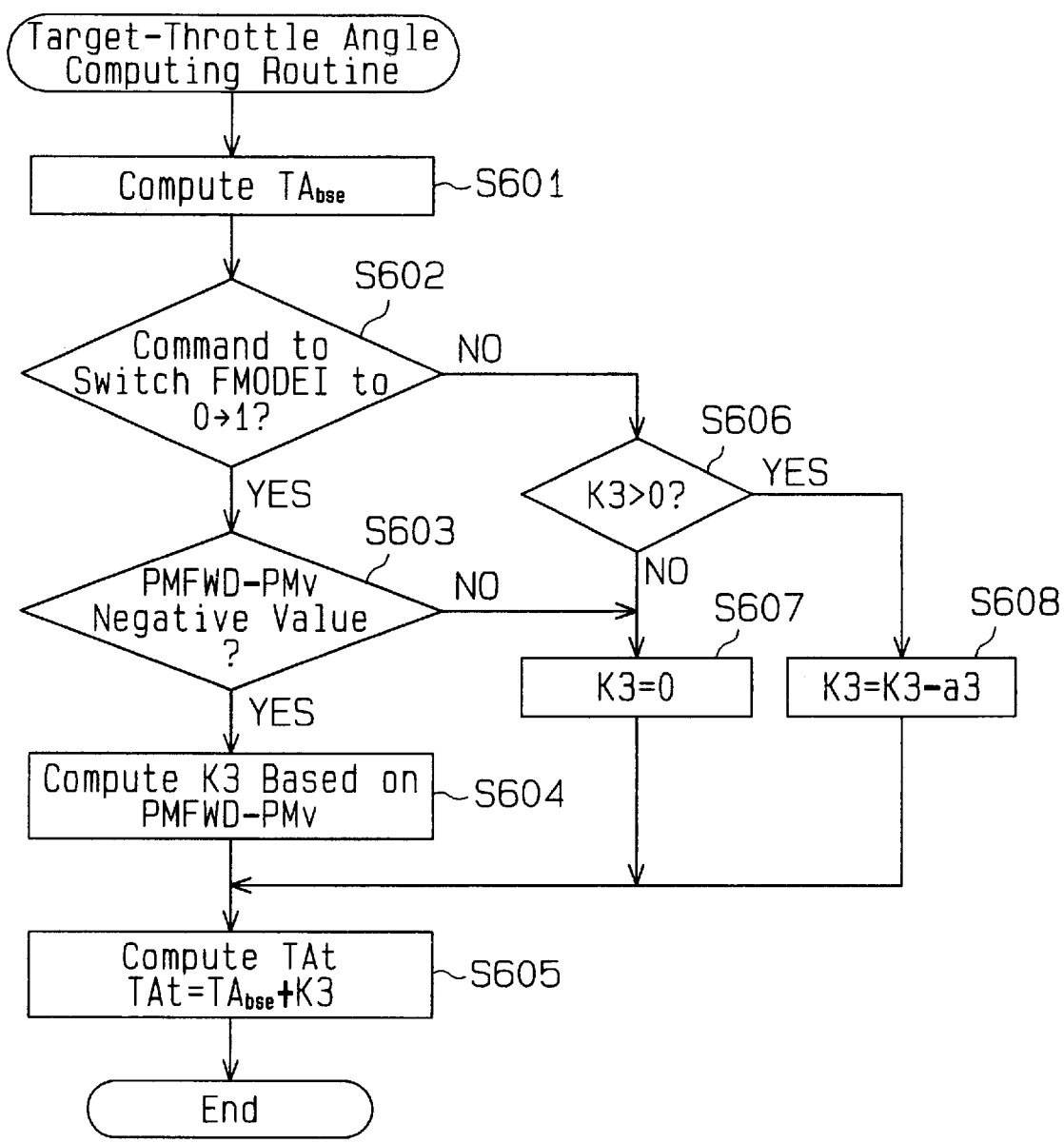
FIG. 23 is a flowchart illustrating procedures of computing a target throttle angle according to the second embodiment.

FIG. 23 is a flowchart illustrating a routine of computing the target throttle angle. This routine is executed in an interruption of every predetermined time through the ECU 92.

In the process of step S601, the ECU 92 computes a basic throttle angle TAbse. The basic throttle angle TAbse is computed based on the acceleration depression amount ACCP in homogeneous charge combustion mode, and is computed based on the basic fuel injection amount Qbse in stratified charge combustion mode. The basic throttle angle TAbse is used in computing the target throttle angle TAt in the process of step S605 to be discussed later. When the target throttle angle TAt is computed, th e ECU 92 controls in a separate process in such a way that the real throttle angle TAr becomes the target throttle angle TAt.

After the process of the step S601 is performed, the flow proceeds to step S602. The processes of steps S602 to S605 serve to prevent the occurrence of a step in the engine torque on the decreasing side caused by a shift in the predicted intake pressure PMFWD in the direction of becoming smaller than the virtual intake pressure PMv when the shift occurs at the time stratified charge combustion is switched to homogeneous charge combustion.

In the process of step S602, the ECU 92 determines whether or not switching of the injection/ignition command mode FMODEI from 0 (stratified charge combustion) to 1 (homogeneous charge combustion) has been instructed. When the decision is YES, the flow goes to step S603. In the process of step S603, the ECU 92 determines whether the virtual intake pressure PMv subtracted from the predicted intake pressure PMFWD (PMFWD−PMv) is negative or not. When PMFWD−PMv is negative, i.e., when the predicted intake pressure PMFWD is shifted in the direction of becoming smaller than the virtual intake pressure PMv, the flow proceeds to step S604.

In the process of step S604, the ECU 92 computes a throttle-opening correcting amount K3 based on PMFWD−

PMv. The smaller PMFWD−PMv becomes, the greater the throttle-opening correcting amount K3 becomes. In the process of the next step S605, the ECU 92 computes the target throttle angle TAt by adding the throttle-opening correcting amount K3 to the basic throttle angle TAbse, then temporarily terminates the target-throttle-angle computing routine.

The throttle angle control based on the target throttle angle TAt performs a correction, in the direction of opening the throttle, using the throttle-opening correcting amount K3 that is computed based on the predicted intake pressure PMFWD and the virtual intake pressure PMv. This correction increases the amount of intake air to the engine 11 and increases the fuel injection amount. As a result, the amount of the air-fuel mixture to be filled in the combustion chamber 16 becomes greater, thus increasing the engine torque. Even if the predicted intake pressure PMFWD shifts in the direction of becoming smaller than the virtual intake pressure PMv at the time stratified charge combustion is switched to homogeneous charge combustion, therefore, the shift-originated occurrence of a step in the engine torque on the decreasing side is prevented.

When it is determined in the process of the step S603 that PMFWD−PMv is not negative, the throttle-opening correcting amount K3 is set to 0 in the process of step S607, and then the flow proceeds to step S605. When the predicted intake pressure PMFWD is equal to or greater than the virtual intake pressure PMv, therefore, the correction of the opening of the throttle angle is not executed.

When the decision in the process of step S602 is NO, the flow proceeds to step S606. The processes of steps S606 and S608 cause the throttle-opening correcting amount K3 to gradually approach 0.

In the process of step S606, the ECU 92 determines whether or not the throttle-opening correcting amount K3 is greater than 0. When K3>0, a value obtained by subtracting a predetermined value a3 from the throttle-opening correcting amount K3 is set as a new throttle-opening correcting amount K3 in the process of step S608, and then the flow goes to step S605. When K>0 is nbt met, the throttle-opening correcting amount K3 is set to 0 in the process of step S607, then the flow proceeds to step S605.

After the throttle-opening correcting amount K3 is set to a value greater than 0 in the process of step S604 in order to prevent the occurrence of a step in the engine torque when stratified charge combustion is switched to homogeneous charge combustion, the throttle-opening correcting amount K3 is made to gradually approach 0.

The time chart in FIG. 22 shows changes in the predicted intake pressure PMFWD, the virtual intake pressure PMv, the throttle-opening correcting amount K3 and the engine torque when stratified charge combustion is switched to homogeneous charge combustion.

In the graph (a) in FIG. 22, a solid line L1 indicates the transition of the predicted intake pressure PMFWD and a solid line L2 indicates the transition of the virtual intake pressure PMv.

When switching of, for example, the injection/ignition command mode FMODEI from 0 (stratified charge combustion) to 1 (homogeneous charge combustion) has been instructed, as shown in the graph (a) in FIG. 22, the predicted intake pressure PMFWD may become smaller than the virtual intake pressure PMv. In this case, the value of the intake pressure that is used in computing the basic fuel injection amount Qbse changes as indicated by the broken line in the graph (a) in FIG. 22. When switching of the injection/ignition command mode FMODEI from 0 to 1 has been instructed, therefore, the value of the intake pressure decreases suddenly. In accordance with the reduction in the value of the intake pressure, the basic fuel injection amount Qbse decreases drastically.

When switching of the injection/ignition command mode FMODEI from 0 to 1 has been instructed, as shown in the graph (b) in FIG. 22, the throttle-opening correcting amount K3 changes to a larger value. The throttle-opening correction based on the throttle-opening correcting amount K3 increases the amount of the air-fuel mixture to be filled in the combustion chamber 16 of the engine 11, thus increasing the engine torque. When switching of the injection/ignition command mode FMODEI from 0 to 1 is instructed, therefore, it is possible to prevent a step from occurring in the engine torque on the decreasing side. As a result, the engine torque changes smoothly as shown in the graph (c) in FIG. 22 even when stratified charge combustion is switched to the homogeneous charge combustion.

After switching of the injection/ignition command mode FMODEI from 0 to 1 is instructed, the throttle-opening correcting amount K3 becomes gradually smaller until 0 as shown in the graph (b) in FIG. 22.

The increase in the amount of intake air based on the correction of the opening of the throttle angle delays due to the intake air resistance with respect to the timing of instructing the switching of the injection/ignition command mode FMODEI. The delayed increase in the amount of intake air may make it impossible to adequately prevent the occurrence of a step in the engine torque on the decreasing side.

According to the present embodiment, therefore, when throttle-opening correction is performed, the timing of switching the injection/ignition command mode FMODEI from 0 to 1 is actually delayed with respect to the timing of instructing the switching of the injection/ignition command mode FMODEI. As a result, the timing at which the combustion mode is switched to homogeneous charge combustion from stratified charge combustion is delayed. Even an increase in the amount of intake air is delayed with respect to the correction of the opening of the throttle angle, the timing of increasing the amount of intake air approximately coincides with the timing at which stratified charge combustion is switched to homogeneous charge combustion. This makes it possible to adequately prevent the occurrence of a step in the engine torque on the decreasing side.

Figure 24:
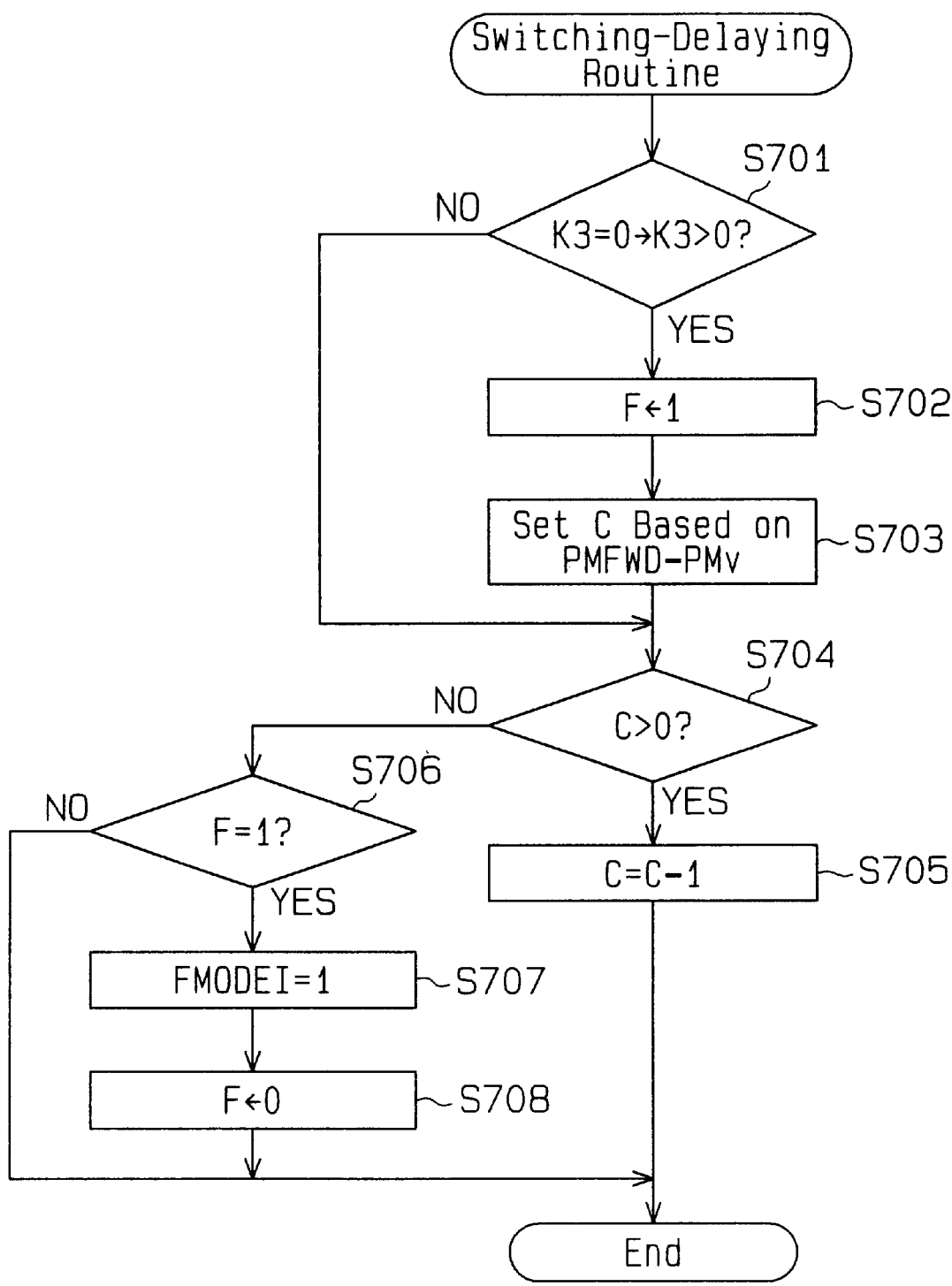
FIG. 24 is a flowchart illustrating procedures of a delay process at the time of switching stratified charge combustion to homogeneous charge combustion according to the second embodiment.

A process of delaying the switching from the stratified charge combustion to the homogeneous charge combustion will now be discussed referring to FIG. 24. FIG. 24 is a flowchart illustrating a routine of delaying the switching of the combustion mode at the time of correcting the opening of the throttle angle. The switching delaying routine is executed in an interruption of, for example, every predetermined time through the ECU 92.

In the process of step S701, the ECU 92 determines whether or not the throttle-opening correcting amount K3 has changed from 0 to a value larger than 0. When the decision is NO, the flow proceeds to step S704, and when the decision is YES, the flow proceeds to step S702. It is determined as YES in step S701 when switching of the injection/ignition command mode FMODEI from 0 (stratified charge combustion) to 1 (homogeneous charge combustion) is instructed in the process of step S602 in FIG. 23 and the correction of the opening of the throttle angle is executed.

In the process of step S702, the ECU 92 stores 1 in a predetermined area in the RAM 95 as a delay execution flag F. The delay execution flag F is for determining whether or not the actual switching of the injection/ignition command mode FMODEI should be delayed with respect to the timing of instructing the switching of the injection/ignition command mode FMODEI, i.e., whether or not the switching of the combustion mode from stratified charge combustion to homogeneous charge should be delayed. The delay execution flag F is used in executing the process of step S706 to be discussed later.

In the process of the subsequent step S703, the ECU 92 sets a switch-delay counter C based on the a value (PMFWD–PMv) obtained by subtracting the virtual intake pressure PMv from the predicted intake pressure PMFWD. The switch-delay counter C determines the delay time for the switching of the combustion mode, and becomes larger as PMFWD–PMv becomes smaller. The greater the switch-delay counter C becomes, the longer the delay time of the combustion mode becomes.

In the process of step S704, the ECU 92 determines whether or not the switch-delay counter C is larger than 0. Immediately after the throttle-opening correcting amount K3 becomes greater than 0, i.e., when the flow goes to step S704 from step S703, the switch-delay counter C is greater than 0 so that it is determined as YES in the process of step S704 and the flow goes to step S705. In the process of step S705, the ECU 92 sets 1 subtracted from the switch-delay counter C as a new switch-delay counter C, and then temporarily terminates the switching delaying routine.

When the process of step S705 causes the switch-delay counter C to gradually approach 0 and C=0, it is determined as NO in the process of step S704 and the flow proceeds to step S706. In the process of step S706, the ECU 92 determines whether or not 1 is stored in a predetermined area in the RAM 95 as the delay execution flag F. When F=1, the injection/ignition command mode FMODEI is switched to 1 (homogeneous charge combustion) in the process of step S707.

Delaying the actual switching of the injection/ignition command mode FMODEI by the switch-delay counter C this way delays the switching of the combustion mode from stratified charge combustion to homogeneous charge combustion. Subsequently, the ECU 92 stores 0 in a predetermined area in the RAM 95 as the delay execution flag F in the process of step S708, then temporarily terminates the switching delaying routine.

The delay execution flag F is normally 0 and is kept at 1 until the injection/ignition command mode FMODEI is switched to 1 after the throttle-opening correcting amount K3 becomes greater than 0. In the normal state of the engine 11 where switching of the combustion mode or the like does not take place, F=0 and it is determined as NO in the process of step S706, and the switching delaying routine is temporarily terminated.

The present embodiment specifically discussed above has the following advantages in addition to the advantages of the embodiment in FIGS. 1 to 16.

When a productional variation or a time-dependent change occurs in the throttle valve 23, the predicted intake pressure PMFWD and the virtual intake pressure PMv may differ from each other at the time of, for example, switching the combustion mode, and the difference produces a step in the engine torque at the time of switching the combustion mode. The occurrence of a step in the engine torque can be adequately prevented by correcting the fuel injection amount, the ignition timing or the throttle angle. This results in an improvement of the drivability.

At the time of correcting the throttle angle on the open side in order to prevent the occurrence of a step in the engine torque, the timing of switching the combustion mode is delayed. Even if a change in the actual amount of intake air with respect to the correction of the opening of the throttle angle is delayed, therefore, it is possible to adequately prevent the occurrence of a step in the engine torque.

(Third Embodiment)

The third embodiment of the present invention will now be described referring to FIGS. 25 to 29. Like the embodiment in FIGS. 17 to 24, this embodiment aims at preventing a step from occurring in the power torque of the engine 11 due to a difference between the virtual intake pressure PMv and the predicted intake pressure PMFWD.

The present embodiment differs from the embodiment in FIGS. 17 to 24 in that the virtual intake pressure PMv is computed in homogeneous charge combustion mode as well as stratified charge combustion mode and the fuel injection amount is corrected based on the predicted intake pressure PMFWD in homogeneous charge combustion mode and the virtual intake pressure PMv. As the prevention of a step in the power torque is executed only by the correction of the fuel injection amount in the present embodiment, the throttle angle control and the ignition timing control are the same as those in the embodiment in FIGS. 1 to 16. Therefore, only the portions of the embodiment that differ from those of the individual embodiments in FIGS. 1 to 24 will be discussed and the detailed description of the portions that are the same as those of the embodiments in FIGS. 1 to 24 will be omitted.

To begin with, the outline of the fuel injection control according to the present embodiment will be discussed with reference to FIGS. 25 and 26.

Figure 25:
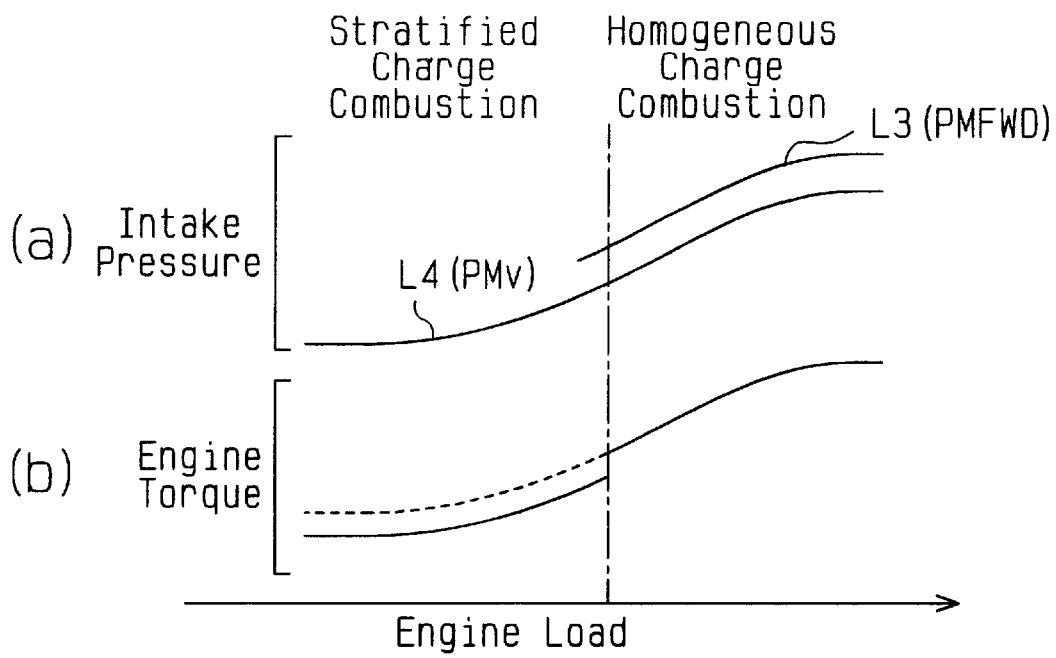
FIG. 25 is a graph showing the transitions of a predicted intake pressure, a virtual intake pressure and an engine torque in accordance with a change in engine load at stratified charge combustion and homogeneous charge combustion.
Figure 26:
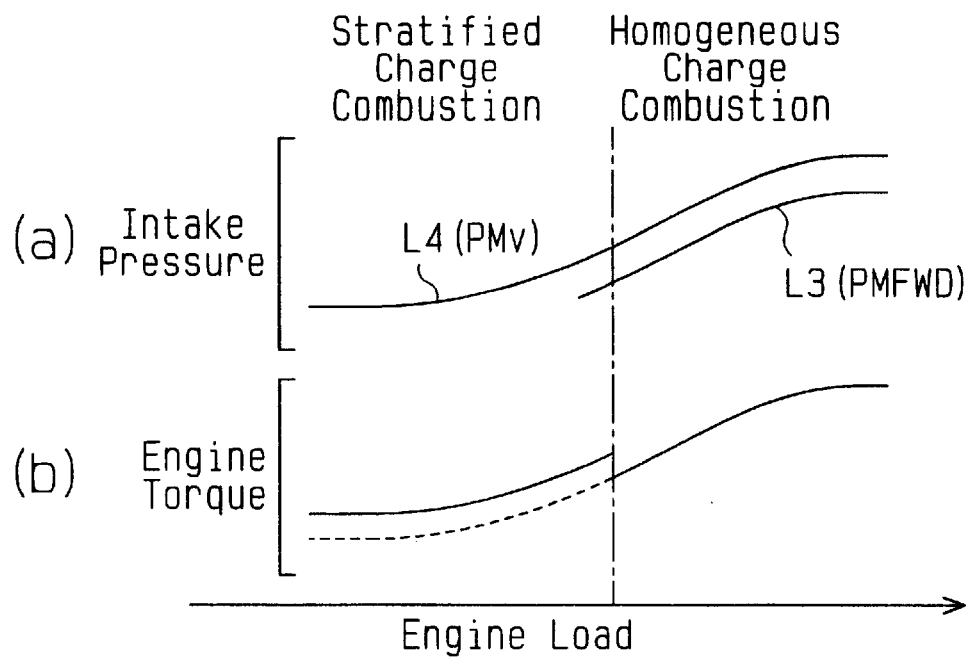
FIG. 26 is a graph showing the transitions of a predicted intake pressure, a virtual intake pressure and an engine torque in accordance with a change in engine load at stratified charge combustion and homogeneous charge combustion.

In a graph (a) in FIG. 25 and a graph (a) in FIG. 26, a solid line L3 indicates the transition of the predicted intake pressure PMFWD with respect to a change in engine load, and a solid line L4 indicates the transition of the virtual intake pressure PMv with respect to a change in engine load. The predicted intake pressure PMFWD is computed based on the real intake pressure PMr, etc., and the virtual intake pressure PMv is computed regardless of the real intake pressure PMr or the like.

As mentioned above, if the throttle valve 23 has a productional variation or a time-dependent change or a foreign matter is stuck in the intake passage 32, the values of the predicted intake pressure PMFWD and the virtual intake pressure PMv may become different from each other. When the values of the predicted intake pressure PMFWD and the virtual intake pressure PMv, which are used in computing the basic fuel injection amount Qbse, become different from each other, for example, before or after the combustion mode is switched, a step occurs in the basic fuel injection amount Qbse before or after the combustion mode is switched. The step in basic fuel injection amount Qbse produces a step in the power torque of the engine 11 as indicated by solid lines in a graph (b) in FIG. 25 and a graph (b) in FIG. 26.

According to the embodiment, therefore, the virtual intake pressure PMv is computed not only in stratified charge combustion mode but also in homogeneous charge combustion mode. Then, the fuel injection amount is corrected in stratified charge combustion mode based on the predicted intake pressure PMFWD in homogeneous charge combustion mode and the virtual intake pressure PMv. This correction eliminates a step in the engine torque and improves the drivability.

The graph (a) in FIG. 25 shows an example where the virtual intake pressure PMv becomes smaller than the predicted intake pressure PMFWD in homogeneous charge combustion mode. In this case, the engine torque in stratified charge combustion mode becomes smaller than the engine torque in homogeneous charge combustion mode at the time of switching the combustion mode, as indicated by the solid line in the graph (b) in FIG. 25.

According to the present embodiment, therefore, the final fuel injection amount Qfin in stratified charge combustion mode is corrected on the increasing side based on the predicted intake pressure PMFWD and the virtual intake pressure PMv. The correction of the fuel injection amount increases the engine torque in stratified charge combustion mode, thus preventing the occurrence of a step in the engine torque at the time of switching the combustion mode, so that the engine torque smoothly changes as indicated by the broken line in the graph (b) in FIG. 25.

The graph (a) in FIG. 26 shows an example where the virtual intake pressure PMv becomes larger than the predicted intake pressure PMFWD in homogeneous charge combustion mode. In this case, the engine torque in stratified charge combustion mode becomes greater than the engine torque in homogeneous charge combustion mode at the time of switching the combustion mode, as indicated by the solid line in the graph (b) in FIG. 26.

According to the embodiment, therefore, the final fuel injection amount Qfin in stratified charge combustion mode is corrected on the decreasing side based on the predicted intake pressure PMFWD and the virtual intake pressure PMv. The correction of the fuel injection amount increases the engine torque in stratified charge combustion mode, thus preventing the occurrence of a step in the engine torque at the time of switching the combustion mode, so that the engine torque smoothly changes as indicated by the broken line in the graph (b) in FIG. 26.

Figure 27:
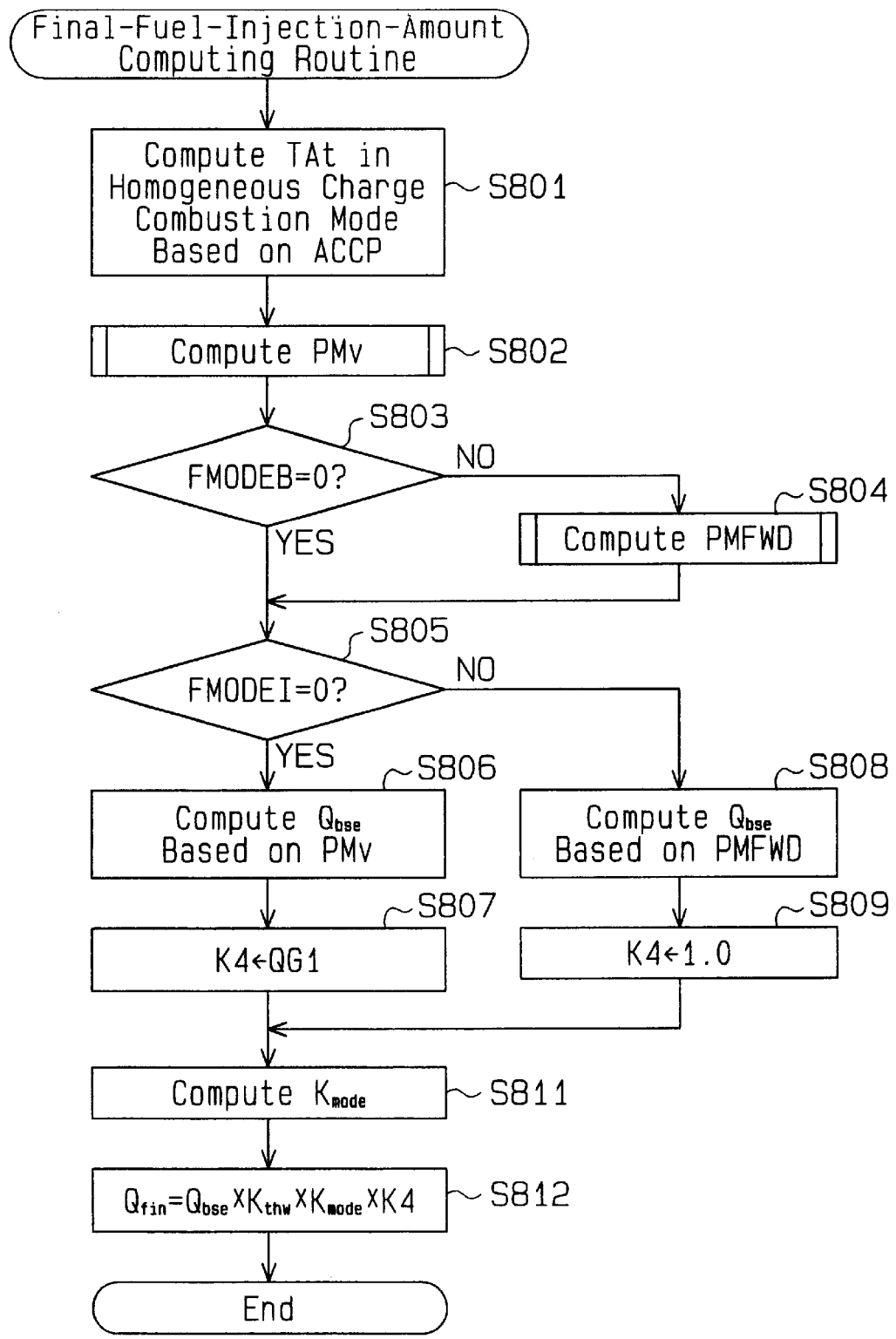
FIG. 27 is a flowchart illustrating procedures of computing a final fuel injection amount according to a third embodiment.

The control procedures for the fuel injection amount will now be discussed by referring to FIG. 27. FIG. 27 is a flowchart illustrating a final-fuel-injection-amount computing routine according to the present embodiment. This routine is executed in an interruption of, for example, every predetermined time through the ECU 92.

The processes of steps S801, S802, S803 and S804 are equivalent to the processes of steps S401, S403, S402 and 404.

The ECU 92 computes the target throttle angle TAt in homogeneous charge combustion mode based on the acceleration depression amount ACCP in the process of step S801, and computes the virtual intake pressure PMv in the process of step S802. Then, the ECU 92 determines whether or not the valve command mode FMODEB is 0 (stratified charge combustion) in the process of step S803. According to the present embodiment, the virtual intake pressure PMv is computed in the process of step S802, regardless of whether FMODEB=0 or not. Therefore, the virtual intake pressure PMv is computed in homogeneous charge combustion mode as well as in stratified charge combustion mode.

When it is determined in the process of step S803 that FMODEB=0, the flow proceeds to step S805, and when it is not determined that FMODEB=0, the flow proceeds to step S805 after the predicted intake pressure PMFWD is computed in the process of step S804. Therefore, the predicted intake pressure PMFWD is computed only when FMODEB is 1 (homogeneous charge combustion).

In the process of step S805, the ECU 92 determines whether the injection/ignition command mode FMODEI is 0 (stratified charge combustion) or not. When FMODEI=0, the basic fuel injection amount Qbse is computed based on the virtual intake pressure PMv, and the like in the process of step S806. The ECU 92 sets a learned value QG1 to be discussed later as an injection-amount correcting coefficient K4 in the process of the subsequent step S807, then goes to step S811.

The processes of steps S811 and S812 are equivalent to the processes of steps S408 and S409. The ECU 92 computes the mode correcting coefficient Kmode in the process of step S811. Next, the final fuel injection amount Qfin is computed by multiplying the basic fuel injection amount Qbse by the coolant-temperature correcting coefficient Kthw, the mode correcting coefficient Kmode and the injection-amount correcting coefficient K4 in the process of step S812, after which the final-fuel-injection-amount computing routine is temporarily terminated.

When the final fuel injection amount Qfin is computed, the ECU 92 controls the actuation of the fuel injection valve 40 in a separate process and injects the fuel whose quantity corresponds to the final fuel injection amount Qfin. The fuel injection amount is corrected with the injection-amount correcting coefficient K4 (learned value QG1), and this correction regulates the engine torque.

The learned value QG1 is a value which is increased or decreased in accordance with a differential pressure DPMK between the predicted intake pressure PMFWD in homogeneous charge combustion mode and the virtual intake pressure PMv. That is, the learned value QG1 is set to a small value when the virtual intake pressure PMv is excessively larger than the predicted intake pressure PMFWD. In this case, the injection-amount correcting coefficient K4 (learned value QG1) reduces the final fuel injection amount Qfin in stratified charge combustion mode, thereby lowering the engine torque. As a result, the engine torque smoothly changes even at the time of switching the combustion mode.

The learned value QG1 is set to a large value when the virtual intake pressure PMv is excessively smaller than the predicted intake pressure PMFWD. In this case, the injection-amount correcting coefficient K4 (learned value QG1) increases the final fuel injection amount Qfin in stratified charge combustion mode, thereby increasing the engine torque. Consequently, the engine torque smoothly changes even at the time of switching the combustion mode.

When it is determined in the process of step S805 that the injection/ignition command mode FMODEI is 1 (homogeneous charge combustion), on the other hand, the flow goes to step S808. The ECU 92 computes the basic fuel injection amount Qbse based on the predicted intake pressure PMFWD, and the like in the process of step S808, sets the injection-amount correcting coefficient K4 to 1.0 in the process of step S809, and then executes processes after step S811 inclusive. As the injection-amount correcting coefficient K4 is set to 1.0 in homogeneous charge combustion mode in the process of step S809, correction of the fuel injection amount based on this coefficient K4 (learned value QG1) does not take place.

Figure 28:
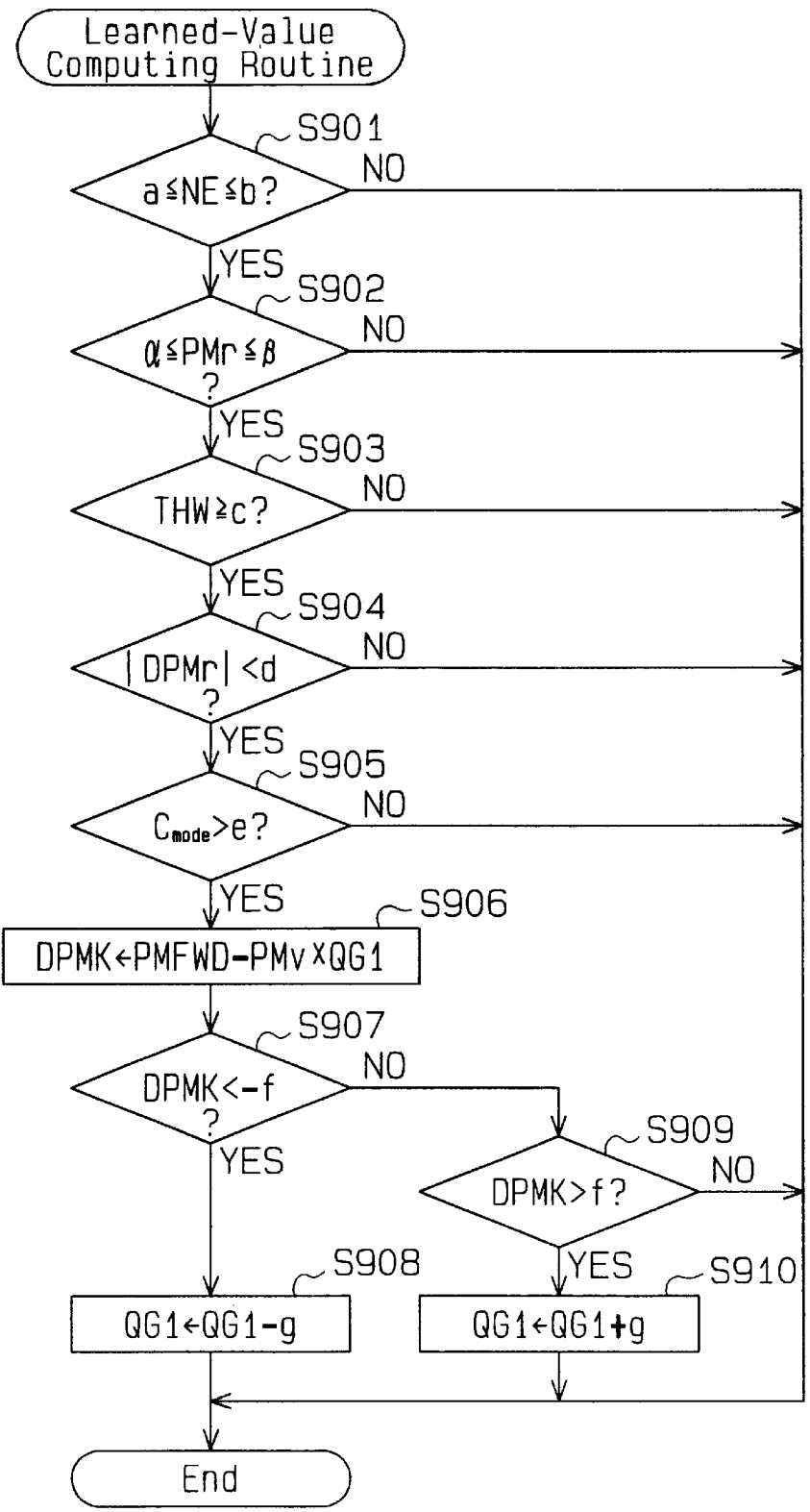
FIG. 28 is a flowchart illustrating procedures of computing a learned value according to the third embodiment.

The procedures of computing the learned value QG1 will be described by referring to FIG. 28. FIG. 28 is a flowchart illustrating a routine of computing the learned value QG1. This routine is executed in an interruption of every predetermined time through the ECU 92.

The processes of steps S901 to S905 are for determining whether or not the running state of the engine 11 is suitable for the computation of the learned value QG1. The ECU 92 determines whether or not the engine speed NE takes a value lying between a predetermined value a and a predetermined value b in the process of step S901, and determines whether or not the real intake pressure PMr takes a value lying between a predetermined value α and a predetermined value β in the process of step S902. One running state of the engine 11 under which the decisions in the processes of the steps S901 and S902 are both YES is the running area of the engine 11 where homogeneous charge combustion is executed, i.e., when the engine 11 is running at a relatively low speed and under a light load.

Subsequently, in the process of step S903, the ECU 92 determines whether or not the coolant temperature is equal to or higher than a predetermined value c, i.e., whether or not the warm-up of the engine 11 has been completed. Further, in the process of step S904, the ECU 92 determines whether or not the absolute value of a change DPMr in the real intake pressure PMr per unit time is smaller than a predetermined value d, i.e., whether or not a change in the real intake pressure PMr is sufficiently small. In the process of the subsequent step S905, the ECU 92 determines whether or not a homogeneous charge combustion counter Cmode representing the execution period of the homogeneous charge combustion is greater than a predetermined value e, i.e., whether or not a predetermined time has passed since the initiation of the stratified charge combustion.

Figure 29:
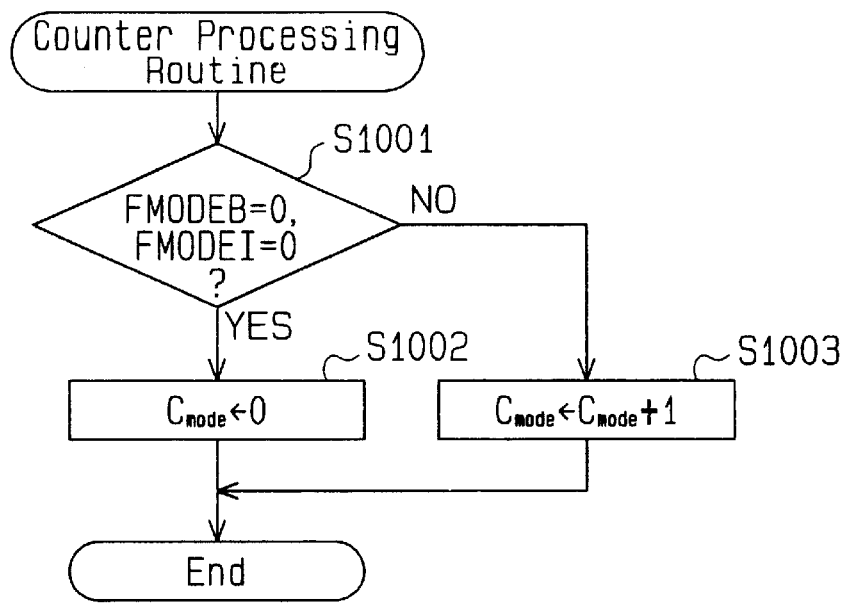
FIG. 29 is a flowchart illustrating procedures of processing a homogeneous charge combustion counter according to the third embodiment.

With reference to a flowchart in FIG. 29, a description will now be given of a counter processing routine for counting up and resetting the homogeneous charge combustion counter Cmode. This counter processing routine is executed in an interruption of every predetermined time through the ECU 92.

In the process of step S1001, the ECU 92 determines whether or not the valve command mode FMODEB and the injection/ignition command mode FMODEI are 0 (stratified charge combustion). When both modes FMODEB and FMODEI are 0 (stratified charge combustion), the homogeneous charge combustion counter Cmode is set to 0 in the process of step S1002. When both modes FMODEB and FMODEI are 1 (homogeneous charge combustion), the homogeneous charge combustion counter Cmode is incremented by 1 in the process of step S1003. After executing either one of the processes of those steps S1002 and S1003, the ECU 92 then temporarily terminates the counter processing routine. The homogeneous charge combustion counter Cmode is counted up while homogeneous charge combustion is being executed. It is therefore possible to adequately know the time passed since the execution of homogeneous charge combustion based on the homogeneous charge combustion counter Cmode.

One running state of the engine 11 under which the decisions in the processes of the steps S903 to S905 in FIG. 28 are all YES is when homogeneous charge combustion has been executed for a predetermined time when the warm-up of the engine 11 is completed and a change in the real intake pressure PMr is small. When the decision in any one of the processes of the steps S901 to S905 is NO, the learned-value computing routine is temporarily terminated, but when all the decisions are YES, the flow goes to step S906.

In the process of step S906, the ECU 92 computes the differential pressure DPMK by subtracting a value, obtained by multiplying the virtual intake pressure PMv by the learned value QG1, from the predicted intake pressure PMFWD. Then, the flow proceeds to step S907. The processes of step S907 and subsequent steps are for computing the learned value QG1, which is used in the process of step S807 in FIG. 27, in accordance with differential pressure DPMK.

In the process of step S907, the ECU 92 determines whether or not the differential pressure DPMK is smaller than a predetermined value −f (f>0). When it is determined that DPMK<−f or that the value obtained by multiplying the virtual intake pressure PMv by the learned value QG1 is excessively larger than the predicted intake pressure PMFWD, a predetermined value g subtracted from the current learned value QG1 is set as a new learned value QG1 in the process of step S908, after which the learned-value computing routine is temporarily terminated.

When the virtual intake pressure PMv is excessively larger than the predicted intake pressure PMFWD, the learned value QG1 is made gradually smaller in the process of step S908 in the above manner. Further, the injection-amount correcting coefficient K4 that is set in accordance with the learned value QG1 is also made gradually smaller in the process of step S807 in FIG. 27. As a result, the final fuel injection amount Qfin in stratified charge combustion mode is corrected on the decreasing side based on the injection-amount correcting coefficient K4. Even when the virtual intake pressure PMv becomes excessively larger than the predicted intake pressure PMFWD, therefore, the engine torque smoothly changes at the time of switching the combustion mode or the like.

When DPMK<−f is not met in the process of the step S907, the flow goes to step S909. In the process of step S909, the ECU 92 determines whether or not the differential pressure DPMK is larger than a predetermined value f. When it is determined that DPMK>f or that the value obtained by multiplying the virtual intake pressure PMv by the learned value QG1 is excessively smaller than the predicted intake pressure PMFWD, the predetermined value g added to the current learned value QG1 is set as a new learned value QG1 in the process of step S910, after which the learned-value computing routine is temporarily terminated. When DPMK>f is not met in the process of step S909, the learned-value computing routine is also temporarily terminated.

When the virtual intake pressure PMv is excessively smaller than the predicted intake pressure PMFWD, the learned value QG1 is made gradually larger in the process of step S910 in the above manner. Further, the injection-amount correcting coefficient K4 that is set in accordance with the learned value QG1 is also made gradually larger in the process of step S807 in FIG. 27. As a result, the final fuel injection amount Qfin in stratified charge combustion mode is corrected on the increasing side based on the injection-amount correcting coefficient K4. Even when the virtual intake pressure PMv becomes excessively smaller with respect to the predicted intake pressure PMFWD, therefore, the power torque of the engine 11 smoothly changes at the time of switching the combustion mode or the like.

The present embodiment specifically discussed above has the following advantage in addition to the advantages of the embodiment in FIGS. 1 to 16.

Even when the predicted intake pressure PMFWD and the virtual intake pressure PMv become different when switching the combustion mode, correcting the fuel injection amount in stratified charge combustion mode can adequately prevent the occurrence of a step in the engine torque. This results in an improved drivability.

(Fourth Embodiment)

The fourth embodiment of the invention will now be described referring to FIGS. 30 to 33. The embodiment differs from the embodiment in FIGS. 25 to 29 in that the throttle angle is corrected based on the predicted intake pressure PMFWD in homogeneous charge combustion mode and the virtual intake pressure PMv. Because prevention of a step in the power torque is done only by the correction of the throttle angle in this embodiment, fuel injection amount control is carried out in the same control manner as that of the embodiment in FIGS. 1 to 16.

Therefore, only the portions of the embodiment that differ from those of the individual embodiments in FIGS. 1 to 29 will be discussed and the detailed description of the portions that are the same as those of the embodiments in FIGS. 1 to 29 will be omitted.

First, the outline of the throttle angle control according to this embodiment will be described referring to FIGS. 32 and 33.

In a graph (a) in FIG. 32 and a graph (a) in FIG. 33, a solid line L3 indicates the transition of the predicted intake pressure PMFWD with respect to a change in engine load, and a solid line L4 indicates the transition of the virtual intake pressure PMv with respect to a change in engine load. The predicted intake pressure PMFWD is computed based on the real intake pressure PMr, and the like, and the virtual intake pressure PMv is computed regardless of the real intake pressure PMr, etc.

The graph (a) in FIG. 32 shows an example where the virtual intake pressure PMv becomes smaller than the predicted intake pressure PMFWD in homogeneous charge combustion mode. In this case, the basic fuel injection amount Qbse in stratified charge combustion mode that is computed based on the virtual intake pressure PMv, for example, at the time of switching the combustion mode, becomes smaller than the basic fuel injection amount Qbse in homogeneous charge combustion mode that is computed based on the predicted intake pressure PMFWD. As a result, the engine torque in stratified charge combustion mode becomes smaller than the engine torque in homogeneous charge combustion mode at the time of switching the combustion mode.

According to the present embodiment, therefore, the target throttle angle TAt in homogeneous charge combustion mode is corrected on the closing side as indicated by the broken line in the graph (b) in FIG. 32 based on the predicted intake pressure PMFWD and the virtual intake pressure PMv. This correction reduces the fuel injection amount, thus making the engine torque in homogeneous charge combustion mode smaller. This prevents the occurrence of a step in the engine torque at the time of switching the combustion mode, so that the engine torque smoothly changes as shown in the graph (c) in FIG. 32.

The graph (a) in FIG. 33 shows an example where the virtual intake pressure PMv becomes larger than the predicted intake pressure PMFWD in homogeneous charge combustion mode. In this case, the basic fuel injection amount Qbse in stratified charge combustion mode that is computed based on the virtual intake pressure PMv, for example, at the time of switching the combustion mode, becomes smaller than the basic fuel injection amount Qbse in homogeneous charge combustion mode that is computed based on the predicted intake pressure PMFWD. As a result, the engine torque in stratified charge combustion mode becomes greater than the engine torque in homogeneous charge combustion mode at the time of switching the combustion mode.

According to the present embodiment, therefore, the target throttle angle TAt in homogeneous charge combustion mode is corrected on the open side as indicated by the broken line in the graph (b) in FIG. 33 based on the predicted intake pressure PMFWD and the virtual intake pressure PMv. This correction increases the fuel injection amount, thus increasing the engine torque in homogeneous charge combustion mode. This prevents the occurrence of a step in the engine torque at the time of switching the combustion mode, so that the engine torque smoothly changes as shown in the graph (c) in FIG. 33.

Figure 30:
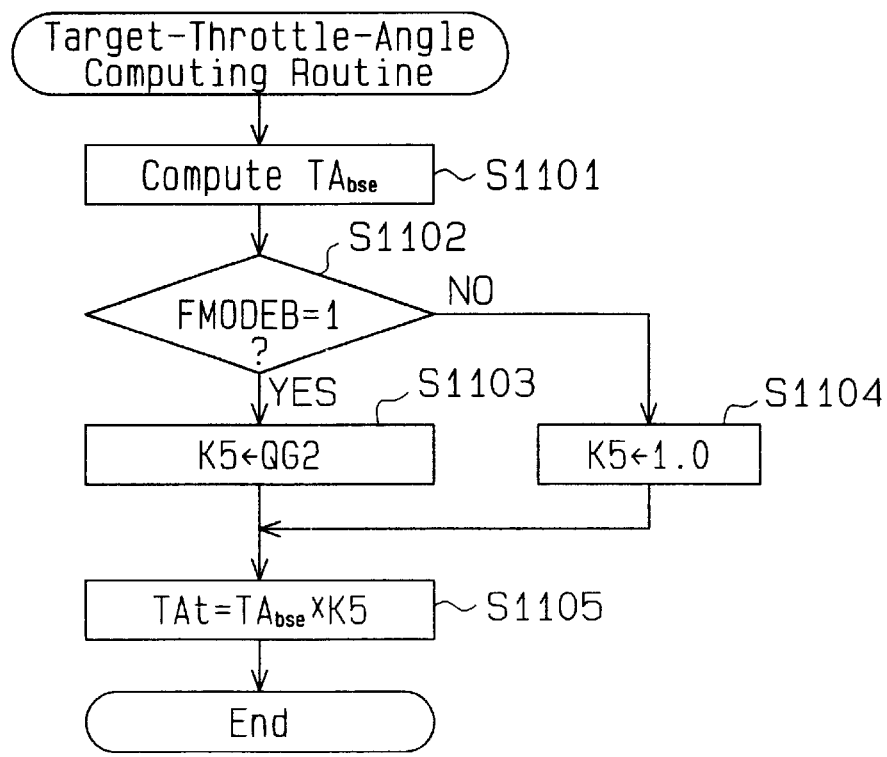
FIG. 30 is a flowchart illustrating procedures of computing a target throttle angle according to a fourth embodiment.

Next, control procedures for the throttle angle will be discussed by referring to FIG. 30. FIG. 30 is a flowchart illustrating a routine of computing the target throttle angle TAt. This routine is executed in an interruption of, for example, every predetermined time through the ECU 92.

In the process of step 1101, the ECU 92 computes the basic throttle angle TAbse. This basic throttle angle TAbse is computed based on the acceleration depression amount ACCP in homogeneous charge combustion mode, and is computed based on the basic fuel injection amount Qbse in stratified charge combustion mode. In the process of step S1102, the ECU 92 determines whether or not the valve command mode FMODEB is 1 (homogeneous charge combustion). When FMODEB=1, a learned value QG2 to be discussed later is set as a throttle correcting coefficient K5 in the process of step S1103, after which the flow proceeds to step S1105.

After computing the target throttle angle TAt by multiplying the basic throttle angle TAbse by the throttle correcting coefficient K5 in the process of step S1105, the ECU 92 temporarily terminates this routine. As the target throttle angle TAt is computed this way, the ECU 92 controls the driving of the throttle motor 24 based on the signal from the throttle position sensor 44 in a separate process, thereby controlling the throttle angle to the target throttle angle TAt. Based on the correction of the throttle angle with the throttle correcting coefficient K5 (learned value QG2), the fuel injection amount is so changed as to demonstrate the suitable engine torque.

The learned value QG2 is a value that is increased or decreased in accordance with a differential pressure DPMK between the predicted intake pressure PMFWD in homogeneous charge combustion mode and the virtual intake pressure PMv. That is, the learned value QG2 is set to a large value when the virtual intake pressure PMv is excessively larger than the predicted intake pressure PMFWD. In this case, the throttle correcting coefficient K5 (learned value QG2) increases the target throttle angle TAt in homogeneous charge combustion mode. Therefore, the engine torque in homogeneous charge combustion mode is increased, so that the engine torque smoothly changes even at the time of switching the combustion mode.

The learned value QG2 is set to a small value when the virtual intake pressure PMv is excessively smaller than the predicted intake pressure PMFWD. In this case, the throttle correcting coefficient K5 (learned value QG2) reduces the target throttle angle TAt in homogeneous charge combustion mode. Therefore, the engine torque in homogeneous charge combustion mode is decreased, so that the engine torque smoothly changes even at the time of switching the combustion mode.

When it is determined in the process of step S1102 that the valve command mode FMODEB is 0 (stratified charge combustion), on the other hand, the flow goes to step S1104. The ECU 92 sets the throttle correcting coefficient K5 to 1.0 in the process of step S1104, then executes the process of step S1105. As the throttle correcting coefficient K5 is set to 1.0 in stratified charge combustion mode, correction of the throttle angle based on this coefficient K5 does not take place.

Figure 31:
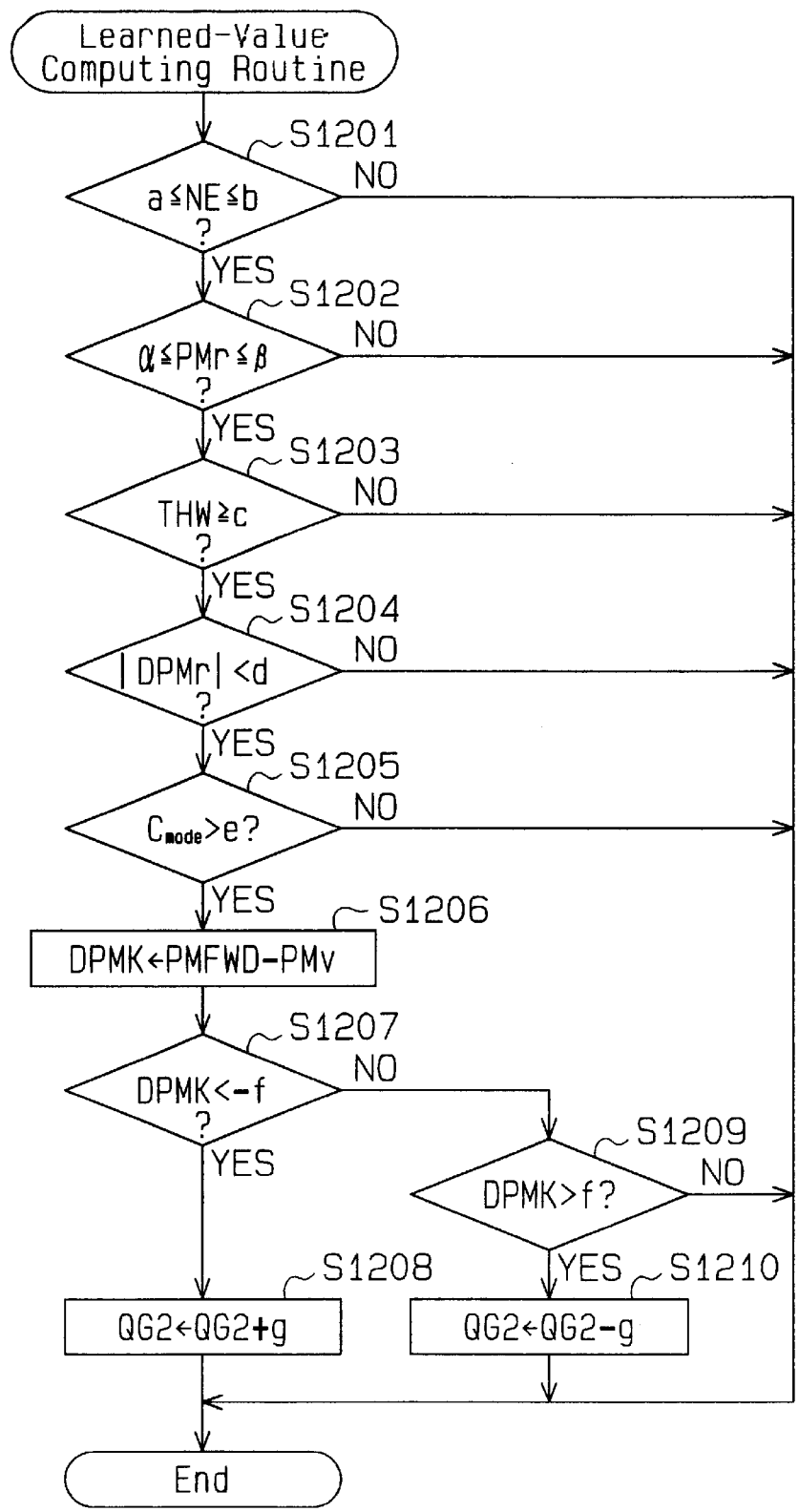
FIG. 31 is a flowchart illustrating procedures of computing a learned value according to the fourth embodiment.

The procedures of computing the learned value QG2 will be described by referring to FIG. 31. FIG. 31 is a flowchart illustrating a learned-value computing routine of computing the learned value QG2. The routine of FIG. 31 differs from the routine in FIG. 28 in the processes of steps S1208 and S1210 that are equivalent to steps S908 and S910 in FIG. 28. The predetermined value g is added in step S1208 in FIG. 31 whereas the predetermined value g is subtracted in step S908 in FIG. 28. The predetermined value g is subtracted in step S1210 in FIG. 31 whereas the predetermined value g is added in step S910 in FIG. 28. The learned-value computing routine in FIG. 31 is also executed in an interruption of every predetermined time through the ECU 92.

The processes of steps S1201 to S1205 are for determining whether or not the running state of the engine 11 is suitable for the computation of the learned value QG2. In the processes of steps S1201 to S1205 are the same in the processes of steps S901 to S905, their description will be omitted.

When the decision in any one of the processes of the steps S1201 to S1205 is NO, the learned-value computing routine is temporarily terminated, but when all the decisions are YES, the flow goes to step S1206. In the process of step S1206, the ECU 92 computes the differential pressure DPMK by subtracting the virtual intake pressure PMv from the predicted intake pressure PMFWD. After computing the differential pressure DPMK, the flow proceeds to step S1207. The processes of step S1207 and subsequent steps serve to compute the learned value QG2, which is used in the process of step S1103 in FIG. 30, in accordance with the differential pressure DPMK.

In the process of step S1207, the ECU 92 determines whether or not the differential pressure DPMK is smaller than the predetermined value −f (f>0). When it is determined that DPMK<−f or that the virtual intake pressure PMv is excessively larger than the predicted intake pressure PMFWD, the predetermined value g added to the current learned value QG2 is set as a new learned value QG2 in the process of step S1208, after which the learned-value computing routine is temporarily terminated.

When the virtual intake pressure PMv is excessively larger than the predicted intake pressure PMFWD, the learned value QG2 is made gradually larger in the process of step S1208 in the above manner. Further, the throttle correcting coefficient K5 that is set in accordance with the learned value QG2 is also made gradually larger in the process of step S1103 in FIG. 30. As a result, the target throttle angle TAt in homogeneous charge combustion mode is corrected on the open side based on the throttle correcting coefficient K5. The fuel injection amount is increased based on the correction of the throttle angle, and the engine torque in homogeneous charge combustion mode is increased. Even when the virtual intake pressure PMv becomes excessively larger with respect to the predicted intake pressure PMFWD, therefore, the engine torque smoothly changes at the time of switching the combustion mode.

When DPMK<−f is not met in the process of the step S1207, the flow goes to step S1209. In the process of step S1209, the ECU 92 determines whether or not the differential pressure DPMK is larger than a predetermined value f. When it is determined that DPMK>f or that the virtual intake pressure PMv is excessively smaller than the predicted intake pressure PMFWD, the predetermined value g subtracted from the current learned value QG2 is set as a new learned value QG2 in the process of step S1210, after which the learned-value computing routine is temporarily terminated. When DPMK>f is not met in the process of step S1209, the learned-value computing routine is also temporarily terminated.

When the virtual intake pressure PMv is excessively smaller than the predicted intake pressure PMFWD, the learned value QG2 is made gradually smaller in the process of step S1210 in the above manner. Further, the throttle correcting coefficient K5 that is set in accordance with the learned value QG2 is also made gradually smaller in the process of step S1103 in FIG. 30. As a result, the target throttle angle TAt in homogeneous charge combustion mode is corrected on the closing side based on the throttle correcting coefficient K5. The fuel injection amount is reduced based on the correction of the throttle angle, and the engine torque in homogeneous charge combustion mode falls. Even when the virtual intake pressure PMv becomes excessively smaller with respect to the predicted intake pressure PMFWD, therefore, the engine torque smoothly changes at the time of switching the combustion mode.

The embodiment specifically discussed above has the following advantage in addition to the advantages of the embodiment in FIGS. 1 to 16.

Even when the predicted intake pressure PMFWD and the virtual intake pressure PMv become different from each other at the time of switching the combustion mode, correcting the throttle angle in homogeneous charge combustion mode can adequately prevent the occurrence of a step in the engine torque. Therefore, the drivability is improved.

(Fifth Embodiment)

Figure 34:
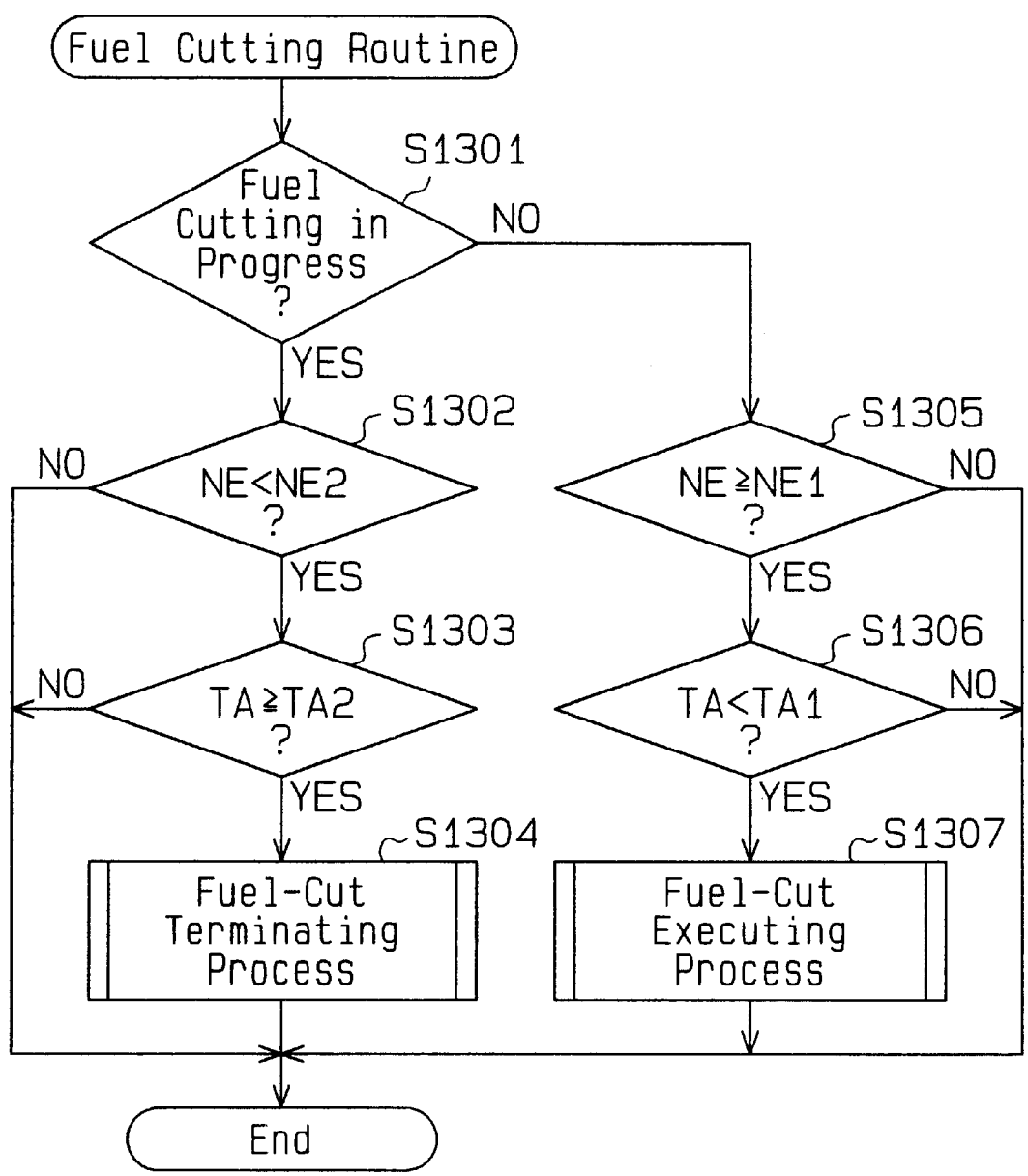
FIG. 34 is a flowchart illustrating procedures for fuel-cut control according to a fifth embodiment.

The fifth embodiment of the present invention will now be described referring to FIG. 34. This embodiment differs from the individual embodiments in FIGS. 1 to 33 in that the virtual throttle angle TAv is used in fuel-cut control as well as in computing various control values. Therefore, only the portions of the present embodiment that differ from those of the individual embodiments in FIGS. 1 to 33 will be discussed and the detailed description of the portions that are the same as those of the embodiments in FIGS. 1 to 33 will be omitted.

First, the procedures of executing the fuel-cut control will be discussed referring to FIG. 34. The fuel-cut control cuts fuel to be supplied to the combustion chamber 16 when the engine 11 is in the running state that does not require fuel, such as the deceleration mode of the vehicle, thereby improving the fuel efficiency. FIG. 34 is a flowchart illustrating a fuel-cutting routine for performing execution/termination of fuel cutting based on the engine speed NE and the throttle angle TA. This routine is executed in an interruption of, for example, every predetermined time through the ECU 92.

In the process of step S1301, the ECU 92 determines whether or not fuel cutting is currently underway. When the decision is affirmative, the processes of steps S1302 to S1304 are executed, and when the decision is negative, the processes of steps S1305 to S1307 are executed.

The processes of steps S1305 to S1307 are for executing fuel cutting when the engine speed NE is sufficiently high or the like in the mode of decelerating the vehicle on a down slope. The reason for executing fuel cutting in such a situation is that, in the deceleration mode of the vehicle, fuel for positively running the vehicle is not required and, even when fuel is cut, the engine speed NE is high and the engine 11 is unlikely to stop. As the vehicle attempts to perform positive driving, the load of the engine 11 becomes high, so that it is possible to determine if the vehicle is decelerating based on whether the engine load is a value close to 0 or not. In this case, for example, the throttle angle TA is used as a value representing the engine load. It is determined whether the vehicle is decelerating based on whether or not the throttle angle TA is smaller than a first angle TA1, which is slightly larger than 0.

The processes of the steps S1302 to S1304 are for terminating fuel cutting when fuel cutting has excessively dropped the engine speed NE or when active running is attempted. Whether or not active running is attempted is determined based on the throttle angle TA reaching a second angle TA2, which is greater than the first angle TA1.

When fuel cutting is not executed, a negative decision is made in the process of step S1301 and the flow goes to step S1305. The process of the step S1305 is for determining whether or not the engine speed NE is high enough for the engine 11 not to stop even when fuel cutting is performed. In the process of step S1305, the ECU 92 determines whether or not the engine speed NE is equal to or higher than a first speed NE1. The first speed NE1 is equivalent to the engine speed NE at which the engine 11 is unlikely to stop even when fuel cutting is performed.

When it is determined in the process of step S1305 that NE≧NE1, the flow goes to step S1306. The process of the step S1306 is for determining whether or not the engine load takes a value close to 0. In the process of step S1306, the ECU 92 determines whether or not the throttle angle TA is smaller than the first angle TA1. When it is determined that TA<TA1 or the value of the engine load is close to 0, the flow proceeds to step S1307.

The ECU 92 performs a fuel-cutting execution process in step S1307, and then temporarily terminates the fuel-cutting routine. Specifically, the ECU 92 stops fuel supply to the combustion chamber 16 by controlling the fuel injection valve 40 and initiates fuel cutting. Even when a negative decision is made in either of the processes of the steps S1305 and S1306, the fuel-cutting routine is temporarily terminated. In this case, the process of the step S1307 is not performed.

When fuel cutting is initiated in the above manner, a positive decision is made in the process of step S1301 and the flow goes to step S1302. The process of the step S1302 is for determining whether or not the engine speed NE has excessively dropped. In the process of step S1302, the ECU 92 determines whether or not the engine speed NE is smaller than a second speed NE2. The second speed NE2 is set to a value smaller than the first speed NE1 and larger a value at which the engine 11 may stop.

When it is determined in the process of step S1302 that NE<NE2, the flow goes to step S1303. The process of the step S1303 is for determining whether or not the vehicle makes active running for acceleration or the like, i.e., the engine load has increased to a certain degree from the value close to 0. In the process of step S1303, the ECU 92 determines whether or not the throttle angle TA is equal to or greater than the second angle TA2. When it is determined that TA≧TA2 or the value of the engine load has increased to a certain degree from to 0, the flow proceeds to step S1304.

The ECU 92 performs a fuel-cutting termination process in step S1304, and then temporarily terminates the fuel-cutting routine. Specifically, the ECU 92 resumes fuel supply to the combustion chamber 16 by controlling the fuel injection valve 40 and terminates fuel cutting. Even when a negative decision is made in either of the processes of the steps S1302 and S1303, the fuel-cutting routine is temporarily terminated. In this case, the process of the step S1304 is not performed.

In the decision processes of the steps S1306 and S1303, the real throttle angle TAr is used as the throttle angle TA in homogeneous charge combustion mode and the virtual throttle angle TAv is used as the throttle angle TA in stratified charge combustion mode. As apparent from the above, in either the homogeneous charge combustion mode or the stratified charge combustion mode, the same parameter, the throttle angle TA, representing the amount of intake air is used to determine the engine load. This simplifies experiments or the like for optimizing two threshold values (first angle TA1 and second angle TA2) that are used in deciding the engine load. That is, because the optimal first angle TA1 and second angle TA2 with respect to the throttle angle TA have only to be obtained by experiments or the like, it is unnecessary to perform experiments or the like for each parameter as in the case where parameters to be used as the engine load differ between the stratified charge combustion mode and the homogeneous charge combustion mode.

(Sixth Embodiment)

Figure 35:
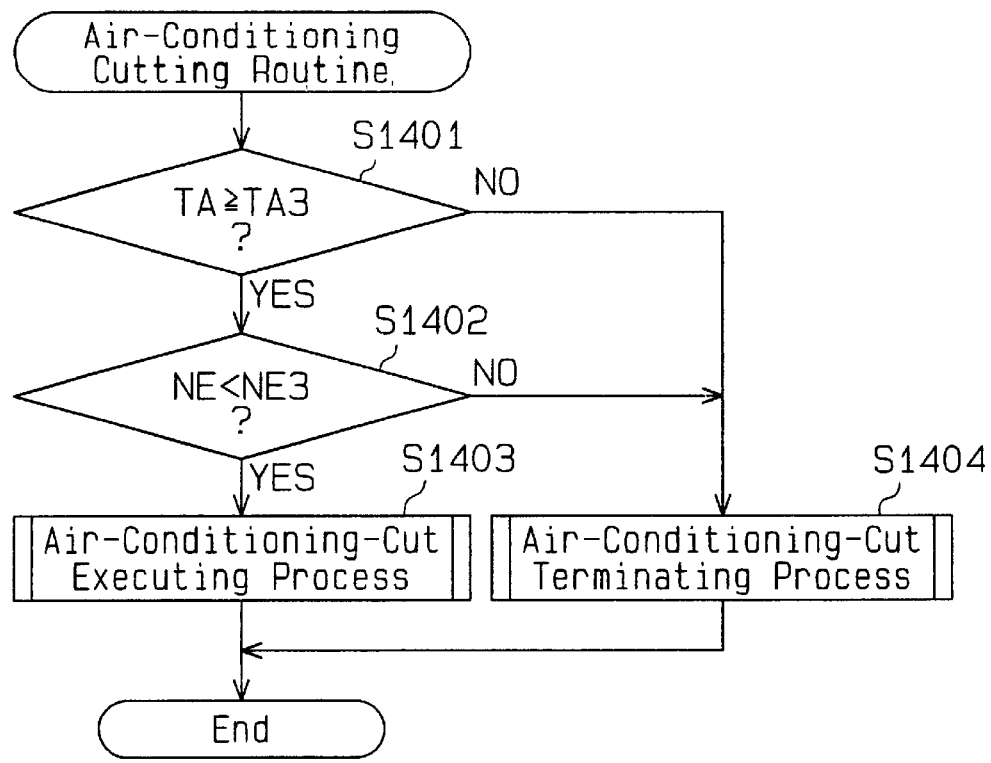
FIG. 35 is a flowchart illustrating procedures for air-conditioning-cut control according to a sixth embodiment.

The sixth embodiment of the present invention will now be described referring to FIG. 35. The embodiment differs from the individual embodiments in FIGS. 1 to 33 in that the virtual throttle angle TAv is used in air-conditioning cutting control as well as in the computation of various control values. Therefore, only the portions of this embodiment that differ from those of the individual embodiments in FIGS. 1 to 33 will be discussed and the detailed description of the portions that are the same as those of the embodiments in FIGS. 1 to 33 will be omitted.

In the engine 11 of the present embodiment, an air conditioner 45 as an accessory is coupled to the crankshaft 14 (see FIG. 1). The air conditioner 45 is connected to the output interface circuit 99 of the ECU 92 (see FIG. 2). The air conditioner 45 is driven based on the rotation of the crankshaft 14 and air-conditions the interior of the vehicle. The air conditioner 45 is controlled by the ECU 92. The ECU 92 performs the air-conditioning cutting control in accordance with the engine load. Such air-conditioning cutting control is for stopping the driving of the air conditioner 45 to provide high engine power in the acceleration mode or the like where a high engine power torque is demanded.

The procedures of executing the air-conditioning cutting control will be discussed referring to FIG. 35. FIG. 35 is a flowchart illustrating an air-conditioning cutting routine for performing execution/termination of air-conditioning cutting based on the engine speed NE and the throttle angle TA. This air-conditioning cutting routine is executed in an interruption at, for example, predetermined times through the ECU 92.

The process of the step S1401 is for determining whether or not a high engine power torque is demanded. When a high engine power torque is demanded as in the acceleration mode of the vehicle, the load of the engine 11 becomes high. It is therefore possible to determine whether or not a high engine power torque is demanded by checking whether or not the engine load is equal to or higher than a predetermined value. In this case, the throttle angle TA, for example, is used as the value that represents the engine load. It is decided that whether or not a high engine power torque is demanded depending on whether or not the throttle angle TA is equal to or greater than a predetermined decision angle TA3 which is close to, for example, a full open state. That is, the ECU 92 determines whether or not the throttle angle TA is equal to or greater than the decision angle TA3 in the process of step S1401, and proceeds to step S1402 when it is determined that TA≧TA3.

The process of the step S1402 is for determining whether or not the demand of a high engine power torque is fulfilled. When the engine speed NE is a value which matches the current throttle angle TA, the demand of a high engine power torque is fulfilled. In the process of step S1402, the ECU 92 determines whether or not the engine speed NE is lower than a predetermined decision speed NE3. When NE<NE3 or when it is determined that the demand of a high engine power torque is not fulfilled, the flow proceeds to step S1403. The decision speed NE3 is a theoretical value for the engine speed NE which is acquired on the assumption that a normal state is provided at the current throttle angle TA.

The ECU 92 performs the air-conditioning cutting process in step S1403, or stops the air conditioner 45, and temporarily terminates this routine. When air-conditioning cutting is carried out, the loss of the engine power of the air conditioner 45 is gone and the demand of a high engine power torque is fulfilled promptly, so that the engine speed NE rises to the decision speed NE3.

When a negative decision is made in either step S1401 or S1402, the flow proceeds to step S1404. The situations to proceed to the step S1404 include the case where acceleration of the vehicle is finished and the throttle angle TA becomes smaller than the decision angle TA3 and the case where the engine speed NE raises to the decision speed NE3 due to air-conditioning cutting. The ECU 92 executes the termination of air-conditioning cutting or restarts driving the air conditioner 45 in step S1404, and then temporarily terminates the routine.

In the decision process of the step S1401, the real throttle angle TAr is used as the throttle angle TA in homogeneous charge combustion mode and the virtual throttle angle TAv is used as the throttle angle TA in stratified charge combustion mode. As apparent from the above, in either the homogeneous charge combustion mode or the stratified charge combustion mode, the same parameter, the throttle angle TA, representing the amount of intake air is used to make a decision on the engine load (engine power torque). This simplifies experiments or the like for optimizing a threshold value (decision angle TA3) that is used in deciding the engine load (engine power torque). That is, because the optimal decision angle TA3 with respect to the throttle angle TA has only to be obtained by experiments or the like, it is unnecessary to perform experiments or the like for each parameter as in the case where parameters to be used as the engine load differ between the stratified charge combustion mode and the homogeneous charge combustion mode.

(Seventh Embodiment)

Figure 36:
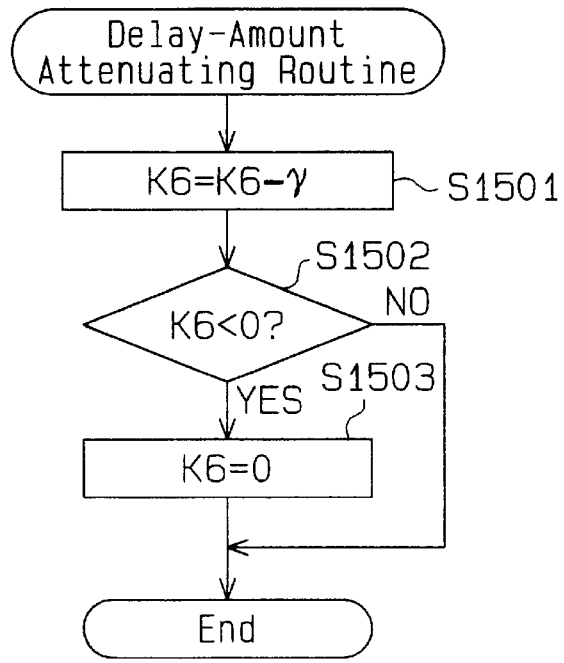
FIG. 36 is a flowchart illustrating procedures for air-conditioning-cut control according to a seventh embodiment.
Figure 37:
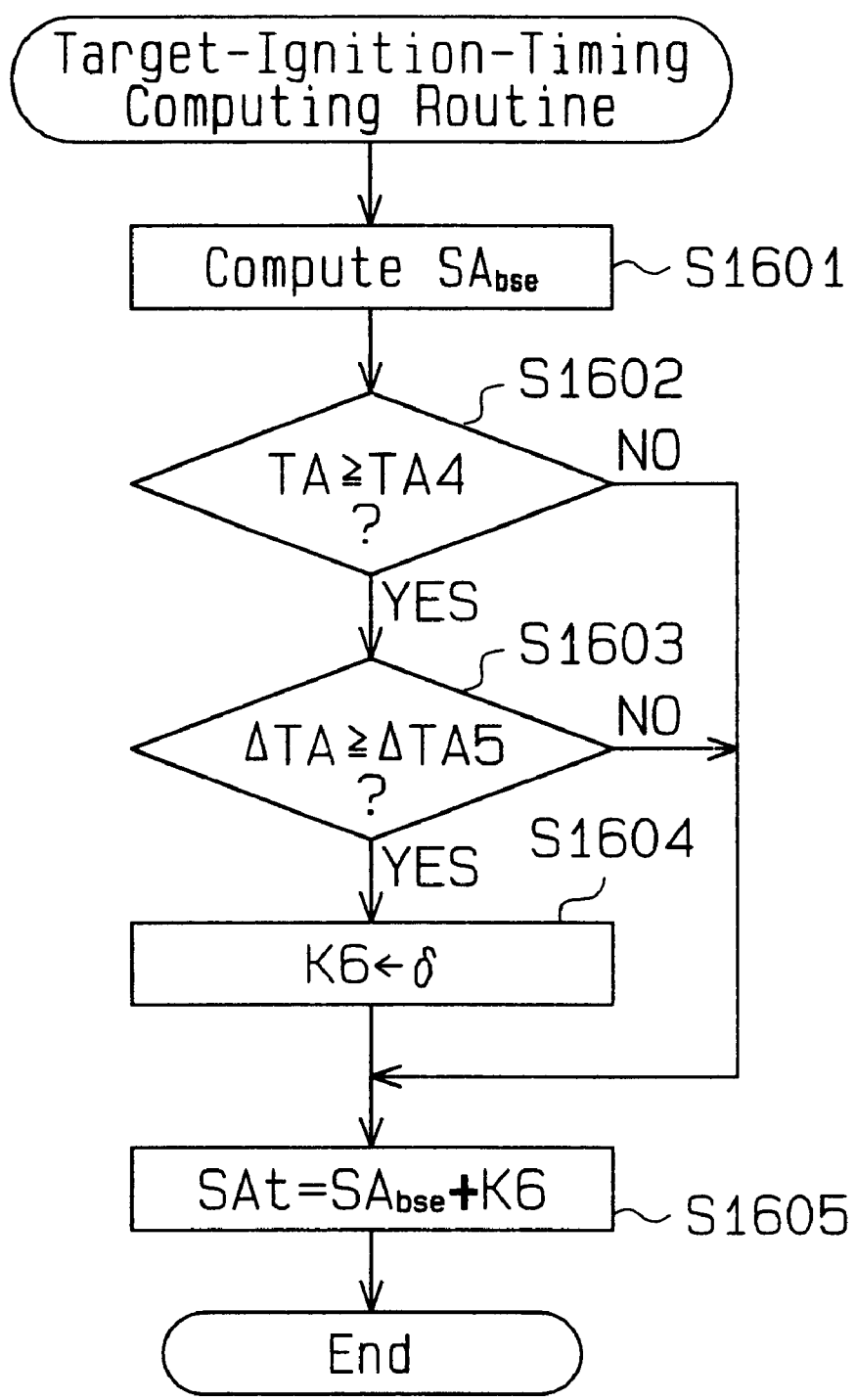
FIG. 37 is a flowchart illustrating procedures of computing a target ignition timing according to the seventh embodiment.

The seventh embodiment of the present invention will now be described referring to FIGS. 36 and 37. This embodiment differs from the individual embodiments in FIGS. 1 to 33 in that the virtual throttle angle TAv is used in torque-down control at the time of accelerating a vehicle as well as in the computation of various control values. Therefore, only the portions of this embodiment that differ from those of the individual embodiments in FIGS. 1 to 33 will be discussed and the detailed description of the portions that are the same as those of the embodiments in FIGS. 1 to 33 will be omitted.

In the engine 1 of the embodiment, ignition-timing delay control for delaying the ignition timing is executed as the torque-down control in acceleration mode. As the ignition-timing delay control is performed in acceleration mode, the torque is reduced in acceleration mode, thereby preventing a torque shock originated from the acceleration.

The procedures of the ignition-timing delay control will be discussed referring to FIG. 37. FIG. 37 is a flowchart illustrating a target-ignition-timing computing routine. In the process of step S1601, the ECU 92 computes the basic ignition timing SAbse. This basic ignition timing SAbse is computed based on the predicted intake pressure PMFWD and the engine speed NE in homogeneous charge combustion mode and is computed based on the basic fuel injection amount Qbse and the engine speed NE in stratified charge combustion mode. The basic ignition timing SAbse is used in computing the target ignition timing SAt in the process of step S1605 to be discussed later. As the target ignition timing SAt is computed, the ECU 92 performs such control as to make the real ignition timing to become the target ignition timing SAt in a separate process.

After the process of the step S1601 is executed, the flow proceeds to step S1602. The process of the step S1602 is for determining whether the vehicle is accelerating or not based on the throttle angle TA. That is, the ECU 92 determines whether or not the throttle angle TA is equal to or greater than a predetermined decision angle TA4 in the process of step S1602. The decision angle TA4 is set to a value based on which it is possible to surely determine that the vehicle is accelerating. In the process of step S1602, the real throttle angle TAr is used as the throttle angle TA in homogeneous charge combustion mode and the virtual throttle angle TAv is used as the throttle angle TA in stratified charge combustion mode.

When $TA \geq TA4$ is not met in the process of step S1602, the flow goes to step S1605, and when $TA \geq TA4$ in the process of the step S1602, the flow goes to step S1603. The process of the step S1603 is for determining whether or not the engine power torque is in a transient state, specifically, whether or not an increase in engine power torque in acceleration mode is excessively large. When an increase in engine power torque in acceleration mode is excessively large, the amount of an increase in engine load per unit time increases. Whether or not an increase in engine power torque in acceleration mode is excessive large can be decided depending on whether or not the amount of an increase in engine load per unit time is equal to or greater than a predetermined value.

In this case, the throttle angle TA, for example, is used as a value representing the engine load. It is determined whether or not an increase in engine power torque in acceleration mode is excessively large depending on whether or not the amount of a change in engine load per unit time, $\Delta TA$, is equal to or greater than a predetermined decision value $\Delta TA5$. That is, the ECU 92 determines whether or not the amount of the change amount $\Delta TA$ is equal to or greater than the decision value $\Delta TA5$ in the process of step S1603, and when it is determined that $\Delta TA \geq \Delta TA5$, the flow proceeds to step S1604.

In the process of step S1603, the amount of a change in real throttle angle TAr per unit time is used as the change amount $\Delta TA$ in homogeneous charge combustion mode, and a change in virtual throttle angle TAv per unit time is used as the change amount $\Delta TA$ in stratified charge combustion mode. As apparent from the above, in either the homogeneous charge combustion mode or the stratified charge combustion mode, the same parameter, the amount of a change in the same parameter per unit time, representing the amount of intake air is used to make a decision on the transient state of the engine load (engine power torque). This simplifies experiments or the like for optimizing a threshold value (decision angle $\Delta TA5$) that is used in deciding the transient state of the engine load (engine power torque). That is, because the optimal decision value $\Delta TA5$ with respect to $\Delta TA$ which is the amount of a change in throttle angle TA per unit time has only to be obtained by experiments or the like, it is unnecessary to perform experiments or the like for each parameter as in the case where parameters to be used as the engine load differ between the stratified charge combustion mode and the homogeneous charge combustion mode.

As the flow proceeds to step S1604 described above, the ECU 92 sets an ignition-timing delay amount K6 which is used in the process of step S1605 to be discussed later to a predetermined value δ. The ECU 92 computes the target ignition timing SAt by adding the delay amount K6 to the basic ignition timing SAbse in the process of the subsequent step S1605, and then temporarily terminates this routine. When a negative decision is made in either step S1602 or S1603, the process of step S1605 is executed without going through the process of step S1604, after which this routine is temporarily terminated.

When the delay amount K6 is set to the predetermined value δ in the process of step S1604, the target ignition timing SAt is delayed by the predetermined value δ in the process of step S1605 and delay control for the ignition timing is carried out. Executing such delay control for the ignition timing provides torque down in acceleration mode and can prevent a torque shock from occurring due to an excessive increase in the engine power torque in the acceleration mode. In the delay control for the ignition timing, the ignition timing is temporarily delayed by the delay amount K6 (predetermined value δ), and then the delay amount K6 is made gradually closer to 0, so that the ignition timing is gradually returned to the original one.

The procedures of returning the delayed ignition timing to the original one will be discussed by referring to FIG. 36. FIG. 36 is a flowchart illustrating a delay-amount attenuating routine to make the delay amount K6 gradually approach 0. This flowchart is executed in an interruption of, for example, every predetermined time through the ECU 92.

In the process of step S1501, the ECU 92 sets a predetermined value γ subtracted from the current delay amount K6 as a new delay amount K6. The process of step S1501 gradually reduces the delay amount K6. In the process of the next step S1502, the ECU 92 determines whether or not the delay amount K6 is less than 0, and temporarily terminates the routine if K6<0 is not met. When K6<0, the delay amount K6 is set to 0 in the process of step S1503, after which the routine is temporarily terminated. As apparent from the above, after set to the predetermined value δ, the delay amount K6 is made gradually smaller and is kept at 0 after it reaches 0.

The individual embodiments may be modified as follows.

A valve characteristic varying mechanism other than the valve timing varying mechanism 27, such as a valve-lift-amount varying mechanism which changes the valve lift amount of the intake valve 19, may be provided in the engine 11 in FIG. 1. In this case, it is preferable to compute the virtual intake pressure PMv in consideration of a change in the valve characteristic of the intake valve 19 which is made by the valve-lift-amount varying mechanism.

The present invention may be adapted to the engine 11 which is not equipped with the valve timing varying mechanism 27. In this case, as the valve timing of the intake valve 19 need not be considered in computing the virtual intake pressure PMv, the control load on the ECU 92 is reduced.

To compute the final fuel injection amount Qfin, a parameter representing the amount of intake air other than the intake pressure, for example, the amount of intake air itself, may be used.

The invention may be adapted to an engine which switches four types of combustion modes, stratified charge combustion, light stratified charge combustion, homogeneous charge lean combustion and homogeneous charge stoichiometric combustion. In this case, the mode correcting coefficient Kmode is set to a different value for each combustion mode. That is, in the combustion mode where the air-fuel ratio of the air-fuel mixture is large, the mode correcting coefficient Kmode is set to a small value. The homogeneous charge lean combustion is the combustion mode where with the fuel in the air-fuel mixture blended uniformly with the air, the air-fuel mixture is burned at an air-fuel ratio larger than the stoichiometric air-fuel ratio. The light stratified charge combustion is a combustion mode between the homogeneous charge lean combustion and stratified charge combustion.

In the embodiment in FIGS. 17 to 24, after the injection-amount correcting coefficient K1 is computed based on the difference between the predicted intake pressure PMFWD and the virtual intake pressure PMv, the injection-amount correcting coefficient K1 may be made to gradually approach 1.0. In this case, as the injection-amount correcting coefficient K1 is returned to 1.0, correcting the fuel injection amount can adequately prevent the occurrence of a step in the engine torque even when the difference between the predicted intake pressure PMFWD and the virtual intake pressure PMv differs depending on the operation area of the engine 11.

The rate of a change at the time of making the injection-amount correcting coefficient K1 gradually approach 1.0 may be changed in accordance with, for example, the difference between the predicted intake pressure PMFWD and the virtual intake pressure PMv. In this case, it is possible to more adequately prevent the occurrence of a step in the engine torque.

In the embodiment in FIGS. 17 to 24, the rates of a change at the time of making the ignition-timing correcting amount K2 and the throttle-opening correcting amount K3 gradually approach 0 may be varied in accordance with, the difference between the predicted intake pressure PMFWD and the virtual intake pressure PMv in order to more adequately prevent the occurrence of a step in the engine torque. In this case, the predetermined value a2 used in the process of step S508 in FIG. 20 and the predetermined value a3 used in the process of step S608 in FIG. 23 are changed in accordance with the difference between the predicted intake pressure PMFWD and the virtual intake pressure PMv.

Although the ignition timing and the throttle angle are corrected in such a way as to cancel a step in the engine torque in the embodiment in FIGS. 17 to 24, the fuel injection amount may be corrected instead of or in addition to the correction, thereby eliminating a step in the engine torque.

In the embodiment in FIGS. 17 to 24, the switch-delay counter C may be set to a fixed value.

The virtual throttle angle TAv may be used in transmission control, auto-drive control for keeping the vehicle speed steady or so-called VSC control or the like for anti-slip or the like of wheels. In place of the virtual throttle angle TAv, the virtual intake pressure PMv may be used in various kinds of engine controls as a value representing the engine load.

What is claimed is:

1. A control device for an engine that produces power by burning a mixture of air and fuel in a combustion chamber, wherein the engine has an acceleration pedal and a throttle valve for adjusting an amount of intake air to the combustion chamber, and the engine switches a combustion mode between homogeneous charge combustion and stratified charge combustion, the control device comprising:

a controller that controls the engine in accordance with a load acting on the engine, wherein, when homogeneous charge combustion is executed, the controller uses an intake parameter representing the amount of intake air as a value representing an engine load; and a computer for computing, as a virtual parameter, a value equivalent to the intake parameter presuming homogeneous charge combustion is executed with an amount of manipulation of the acceleration pedal when executing stratified charge combustion, wherein, when stratified charge combustion is executed, the controller uses the virtual parameter as a value representing the engine load.

2. The control device according to claim 1, wherein the computer computes the virtual parameter in consideration of a response delay of the intake parameter with respect to manipulation of the acceleration pedal when executing homogeneous charge combustion.

3. The control device according to claim 1, wherein, when homogeneous charge combustion is executed, the controller computes a control value to be set in accordance with an engine load based on the intake parameter, wherein, when stratified charge combustion is executed, the controller computes the control value based on the virtual parameter, and wherein the controller controls the engine based on the computed control value.

4. The control device according to claim 3, wherein the control value is a fuel injection amount.

5. The control device according to claim 4, wherein the controller computes the fuel injection amount in consideration of the difference between a combustion efficiency of stratified charge combustion and a combustion efficiency of homogeneous charge combustion.

6. The control device according to claim 5, wherein the controller corrects the computed fuel injection amount based on atmospheric pressure.

7. The control device according to claim 3, wherein the intake parameter is acquired based on a value actually measured, the difference between the intake parameter and the virtual parameter corresponds to the difference between an engine torque of homogeneous charge combustion and an engine torque of stratified charge combustion, and the controller corrects the control value to eliminate the difference between the respective engine torques of the combustion modes.

8. The control device according to claim 7, wherein the controller corrects the control value based on the difference between the intake parameter and the virtual parameter when the combustion mode is switched between homogeneous charge combustion and stratified charge combustion.

9. The control device according to claim 7, wherein, when homogeneous charge combustion is executed, the controller computes, in addition to the intake parameter, the virtual parameter based on an amount of manipulation of the acceleration pedal, and wherein the controller corrects the control value based on the difference between the computed virtual parameter and the intake parameter.

10. The control device according to claim 1, wherein, when homogeneous charge combustion is executed, the controller determines whether or not the intake parameter is greater than a predetermined threshold value, wherein, when stratified charge combustion is executed, the controller determines whether or not the virtual parameter is greater than a predetermined threshold value, and wherein the controller controls the engine based on results of those determinations.

11. The control device according to claim 1, wherein an accessory to be driven by the engine is coupled to the engine, wherein, when homogeneous charge combustion is executed, the controller determines whether or not the intake parameter is greater than a predetermined threshold value, wherein, when stratified charge combustion is executed, the controller determines whether or not the virtual parameter is greater than a predetermined threshold value, and wherein the controller controls the accessory based on results of those determinations.

12. The control device according to claim 1, wherein, when homogeneous charge combustion is executed, the controller determines whether or not a change in the intake parameter is greater than a predetermined threshold value, wherein, when stratified charge combustion is executed, the controller determines whether or not a change in the virtual parameter is greater than a predetermined threshold value, and wherein the controller controls the engine based on results of those determinations.

13. The control device according to claim 1, wherein the intake parameter is a throttle angle indicating a degree of opening of the throttle valve, and the computer computes a virtual throttle angle as the virtual parameter based on an amount of manipulation of the acceleration pedal when executing stratified charge combustion.

14. The control device according to claim 1, wherein the intake parameter is an intake pressure indicating the pressure of air drawn into the combustion chamber, and the computer computes a virtual intake pressure as the virtual parameter based on an amount of manipulation of the acceleration pedal when executing stratified charge combustion.

15. The control device according to claim 14, wherein the computer computes, as a virtual throttle angle, a degree of opening of the throttle valve presuming homogeneous charge combustion is executed with the amount of manipulation of the acceleration pedal when executing stratified charge combustion, and the computer further computes the virtual intake pressure based on the virtual throttle angle.

16. The control device according to claim 14, wherein the engine has an intake valve and a variable mechanism for changing a valve characteristic of the intake valve, wherein the computer computes, as a virtual valve characteristic, the valve characteristic presuming homogeneous charge combustion is executed with the amount of manipulation of the acceleration pedal when executing stratified charge combustion, and wherein the computer computes the virtual intake pressure in consideration of the virtual valve characteristic.

17. A control method for an engine that produces power by burning a mixture of air and fuel in a combustion chamber, wherein the engine has an acceleration pedal and a throttle valve for adjusting an amount of intake air to the combustion chamber, and the engine switches a combustion mode between homogeneous charge combustion and stratified charge combustion, the control method comprising:

controlling the engine in accordance with a load acting on the engine;

using an intake parameter representing the amount of intake air as a value representing an engine load when homogeneous charge combustion is executed;

computing, as a virtual parameter, a value equivalent to the intake parameter presuming homogeneous charge combustion is executed with an amount of manipulation of the acceleration pedal when executing stratified charge combustion; and using the virtual parameter as a value representing the engine load when stratified charge combustion is executed.

* * * * *